United States Patent Office 3,792,033
Patented Feb. 12, 1974

3,792,033
ACTH-TYPE HORMONES WHOSE FIRST AMINO-ACID IS OF D-CONFIGURATION
Beat Iselin, Riehen, Heini Kappeler, Wuerenlos, Bernhard Riniker, Frenkendorf, and Werner Rittel, Basel, Switzerland, assignors to Ciba-Geigy Corporation, Ardsley, N.Y.
No Drawing. Continuation-in-part of application Ser. No. 667,078, Sept. 12, 1967, which is a continuation-in-part of application Ser. No. 592,745, Nov. 8, 1966, which in turn is a continuation-in-part of application Ser. No. 478,409, Aug. 9, 1965, all now abandoned. This application May 6, 1969, Ser. No. 822,327
Int. Cl. C07c 103/52
U.S. Cl. 260—112.5
29 Claims

ABSTRACT OF THE DISCLOSURE

Adrenocorticotropically active peptides containing 16 to 39, especially 18 to 25 aminoacid residues and having as the first aminoacid at the aminoend a D-aminoacid. In these peptides some aminoacides of the natural sequence may have been exchanged for others, provided that the ACTH-activity remains substantially unaffected as is the case, for example, when the second aminoacid, tyrosine, is replaced by phenylalanine. Also the first aminoacid—which according to the invention is present in the D-configuration (or as the racemic D,L-acid)—may be the D-form of a natural α-aminoacid other than serine, above all, for example, D-alanine, D-proline or D-threonine. Of the new peptides, special mention is deserved by those which contain 18-25 aminoacids, but differ from the sequence of the first 18 to 25 aminoacids to ACTH in that the first aminoacid is D-serine, and particularly those in which the first aminoacid is D-serine and in which the arginine $^{17,18}$-radicals are replaced by ornithine or lysine radicals and/or the serine$^3$-radical is replaced by glycyl, and/or the glutamyl$^5$-radical by glutaminyl. The new peptides have an enhanced adrenocorticotropic activity.

CROSS-REFERENCES TO RELATED APPLICATIONS

This is a continuation-in-part of our application Ser. No. 667,078, filed Sept. 12, 1967 (now abandoned). which itself is a continuation-in-part of our application Ser. No. 592,745, filed Nov. 8, 1966 (now abandoned), which in turn is a continuation-in-part of our application Ser. No. 478,409, filed Aug. 9, 1965, now abandoned.

It is known that the peptide chain of β-corticotropin can be substantially modified, especially at the carboxyl end, without loss of the adrenocorticotropic action. Thus, for example, the activity referred to 1 mg. of peptide (about 100 international units per mg.) remains unaffected when the aminoacids up to the 20th aminoacid are split off from the carboxyl end of natural ACTH. Further splitting off causes an increasing drop in activity. Thus, $\beta^{1-19}$-corticotropin still possesses about 30% of the ACTH activity per mg. and $\beta^{1-16}$-corticotropin displays about 1%/mg. At the amino end the first aminoacid, serine$^1$, could be replaced by glycine without impairing the activity (Dixon, Biochem. J. 84, page 462 [1962]). Other, relatively slight modifications reduce the activity. Taking $\beta^{1-23}$-corticotropin-23-amide (which contains about 100 international units per mg. and has thus substantially the same activity per mg. as natural β-corticotropin or as $\beta^{1-24}$-corticotropin [cf. U.S. Pats. 3,228,839 and 3,228,926] as reference substance, it is found that the removal of the first aminoacid, serine$^1$, reduces the activity by 50%. Replacement of the third aminoacid, serine$^3$, by alanine likewise reduces the activity by 50%, whereas replacement of the second aminoacid, tyrosine, by phenylalanine, reduces the activity to ⅔ (cf. Z. Naturf. 19b, pages 858–860 [1964]). To date it has not been possible ever to raise the activity, referred to 1 mg. of peptide, over that of natural ACTH by modifying the sequence of ACTH.

In a fragment of ACTH that had MSH-activity but no ACTH-activity, namely in the pentapeptide of the aminoacid sequence 6–10 of cortocotropin H-His-Phe-Arg-Try-Gly-OH the natural aminoacids L-histidine, L-phenylalanine, L-arginine and L-tryptophan have been replaced by corresponding D-aminoacids: the pentapeptide obtained in this manner did not display any MSH-activity (cf. Hano et al., Biochem. Biphys, Acta 90, page 201 [1964]).

Surprisingly, it has now been observed that peptides which differ from ACTH-active peptides having at least towards the N-terminus a complete ACTH-sequence in which however some aminoacids may be exchanged for other natural α-aminoacids provided that the ACTH-activity remains substantially unaffected, only in that they contain as the first aminoacid in aminoacid with D-configuration, are more active than the corresponding peptides that contain no D-aminoacid in the N-terminal 1-position. Moreover, they have a long-lasting action.

It is another advantage of the new peptides that they are cheaper to synthesize than the peptides in which L-serine is the first aminoacid.

Accordingly, the present invention provides peptides that differ from ACTH-active peptides having at least towards the N-terminus a complete ACTH-sequence in which however some aminoacids may have been exchanged for other natural α-aminoacids, only in that they contain as the first aminoacid an aminoacid having the D-configuration, as well as acid addition salts, derivatives and complexes, especially metal complexes such as zinc complexes, of the peptides referred to and pharmaceutical preparations containing these compounds and processes for the manufacture of the compounds.

The ACTH-active peptides, from which the new peptides differ by the above-mentioned changed configuration, are (all-L)-peptides, for example, peptides that contain the first 16 to 39, especially the first 18 to 25, aminoacids of the ACTH-molecule. In these peptides some aminoacids of the natural sequence may have been exchanged for others, provided that the ACTH-activity remains substantially unaffected.

As known ACTH-active (all-L)-peptides may be mentioned the natural adrenocorticotropic hormones, more especially beef-ACTH ($\alpha_b$-ACTH), sheep-ACTH ($\alpha_s$-ACTH), porcine-ACTH (β-corticotropin) and human ACTH ($\alpha_h$-ACTH) which contain 39 aminoacids and which differ only with respect to the sequence 25–33. Known ACTH-active (all-L)-peptides with a shorter and/or modified aminoacid sequence as compared with natural ACTH are for instance those which contain a sequence of 16-31 aminoacids counted from the N-terminal of natural ACTH and which may be modified with respect to the aminoacids in one or more of the positions 1–5, 17, 18 and 25. Thus, for instance, the second aminoacid, tyrosine, may be replaced by phenylalanine, or the third aminoacid, serine by glycine, or the fourth aminoacid, methionine, by norvaline, norleucine, leucine, or α-aminobutyric acid, or the fifth aminoacid, glutamic acid, by glutamine, or the 17th and 18th aminoacid, arginine, by ornithine or lysine or the 25th aminoacid by valine.

Examples of such known peptides are inter alia, $\beta^{1-16}$-Arg$^{17}$ - amide, $\beta^{1-18}$ - corticotropin, $\beta^{1-18}$ - corticotropin-Arg$^{18}$-amide, Gln$^5$-$\beta^{1-19}$-corticotropin, $\beta^{1-19}$-corticotropin-Pro$^{19}$-amide, $\beta^{1-20}$-corticotropin-Val$^{20}$-amide, Abu$^4$-$\beta^{1-20}$-corticotropin-Val$^{20}$-amile, $\beta^{1-21}$-corticotropin-Lys$^{21}$-amide, $\beta^{1-22}$ - corticotropin - Val$^{22}$ - amide, $\beta^{1-23}$ - corticotropin, $\beta^{1-23}$-corticotropin-Tyr$^{23}$ - amide, Ala$^3$ - $\beta^{1-23}$ - corticotropin - Tyr$^{23}$ - amide, Phe$^2$ - $\beta^{1-23}$ - corticotropin - Tyr$^{23}$-amide, $\beta^{1-24}$ - corticotropin, $\beta^{1-24}$ - corticotropin - Pro$^{24}$-amide, Nle$^4$ - $\beta^{1-24}$ - corticotropin, Val$^{25}$ - $\beta^{1-25}$-corticotropin-Val$^{25}$-amide, Nva$^4$ - Val$^{25}$ - $\beta^{1-25}$ - corticotropin-Val$^{25}$-amide, Nle$^4$-Val$^{25}$-$\beta^{1-25}$-corticotropin - Val$^{25}$-amide, Nle$^4$-Lys$^{17,18}$-Val$^{25}$-$\beta^{1-25}$-corticotropin-Val$^{25}$-amide, $\beta^{1-26}$-corticotropin, $\beta^{1-28}$-corticotropin and $\beta^{1-31}$-corticotropin.

Also the first aminoacid—which according to the invention is present in the D-configuration (or as the racemic D,L-acid)—may be the D-form of a natural α-aminoacid other than serine, above all, for example, D-alanine, D-proline or D-threonine. Of the new peptides, special mention is deserved by those which contain 18 to 25 aminoacids, but differ from the sequence of the first 18 to 25 aminoacids of ACTH in that the first aminoacid is D-serine and in which the arginine$^{17,18}$-radicals are replaced by ornithyl or lysyl and/or the serine$^3$-radical is replaced by glycl, and/or the methionyl radical by norvalyl, norleucyl, leucyl or α-aminobutyryl and/or the glutamyl$^5$-radical by glutaminyl and/or the radical of the 19th or 25th aminoacid by valyl. Special embodiments of the invention are peptides having in the 17- and 18-position lysyl radicals and peptides having in 3-position glycyl and in 17- and 18-position lysyl, especially such peptides which have 18–25 aminoacids and their N-unsubstituted C-terminal amides.

Acid addition salts are primraly salts of therapeutically acceptable acids such as hydrochloric or acetic acid, or above all sparingly soluble salts such as sulfates, phosphates, sulfonates, or higher alkanoates such as stearates.

Relevant derivatives are, e.g. esters such as lower alkyl esters, e.g. methyl, ethyl, propyl or tertiary butyl ester, or benzyl ester which may be unsubstituted or substituted, e.g. by nitro groups, halogen atoms, lower alkyl or lower alkoxy groups; furthermore hydrazides and amides, especially N-unsubstituted peptide amides in which the C-terminal carboxyl group is amidated. "Complexes" are here intended to mean complex-like compounds whose structure has not so far been explored and which are found when certain inorganic or organic substances are added to peptides having an adrenocorticotropic action, primarily those which impart a prolonged action to the peptides. Such inorganic substances are compounds derived from metals, such as calcium, magnesium, aluminum, cobalt, and especially zinc, primarily sparingly soluble salts, such as phosphates, pyrophosphates, polyphosphates, as well as hydroxides of these metals; polyphosphates may also be those of alkali metals. Organic substances which prolong the activity of the peptides are, for example, non-antigenic gelatine, for example oxypolygelatine, polyvinylpyrrolidone and carboxymethyl cellulose, also sulfonic acid esters, or phosphoric acid esters of alginic acid, dextrous, polyphenols and polyhydric alcohols, above all polyphloretine phosphate and phytinic acid, as well as polymers and copolymers of aminoacids, for example, protamine, and especially of aminoacids, containing a preponderance of acid α-aminoacids such as polyglutamic acid or polyaspartic acid.

As mentioned above, the new compounds have a considerably greater ACTH-activity than the corresponding compounds with L-configuration at the first aminoacid. They are therefore intended for use in human and veterinary medicine, e.g. instead of the natural hormone. Special mention deserve D-Ser$^1$-Lys$^{17,18}$-$\beta^{1-18}$-corticotropin-Lys$^{18}$-amide, D-Ser$^1$-Gly$^3$-Lys$^{17,18}$ - $\beta^{1-18}$ - corticotropin - Lys$^{18}$-amide, D-Ser$^1$-$\beta^{1-19}$-corticotropin, D-Ser$^1$-$\beta^{1-24}$-corticotropin, D-Ser$^1$ -Orn$^{17,18}$-$\beta^{1-24}$-corticotropin, D-Ser$^1$-Gly$^3$-$\beta^{1-24}$-corticotropin, D-Ser$^1$-Lys$^{17,18}$-$\beta^{1-24}$-corticotropin and D-Ser$^1$-Gly$^3$-Lys$^{17,18}$-$\beta^{1-24}$-corticotropin, because of their strong and prolonged ACTH-action.

In the test on human beings whose hypophysis function was blocked by the Hedner method (Acta endocrinol. 42, 499, 1963) by the oral administration of dexamethasone, a single intravenous injection of 0.1 mg. of D-Ser$^1$-$\beta^{1-24}$ corticotropin increases the plasma cortisol level in substantially the same way as a single intravenous injection of 0.25 mg. of $\beta^{1-24}$-corticotropin. In the test on human beings whose hypophysis function had not been blocked, one ntramuscular injection of 2 mg. D-Ser$^1$-Lys$^{17,18}$-$\beta^{1-18}$-corticotropin-Lys$^{18}$-amide or of D-Ser$^1$-Orn$^{17,18}$-$\beta^{1-24}$-corticotropin or of D-Ser$^1$-Gly$^3$ - Lys$^{17,18}$ - $\beta^{1-24}$ - corticotropin caused a significantly greater secretion of total plasma corticol (with respect to the amount and the duration of secretion) than $\beta^{1-24}$-corticotropin.

The new peptides are manufactured by the methods known for the manufacture of long-chain peptides, especially the carbodiimide method, the activated ester method, the azide method or the mixed anhydride method, with the use of a D-aminoacid as N-terminal aminoacid, linking the aminoacids together in the indicated sequence either as such or after first having formed small peptide units. For example: one of the aminoacid or peptide molecules in the form of an ester may be linked with a further aminoacid or peptide molecule containing a protected amino group, in the presence of a condensing agent such as a carbodiimide or a phosphorous acid ester halide; or the aminoacid or peptide ester containing a free amino group may be reacted with an aminoacid or a peptide containing an activated carboxyl group (and a protected amino group) e.g. an acid halide, azide, anhydride, imidazolide, isoxazolide (e.g. from N-ethyl-5-phenyl-isoxazolium-3'-sulfonate; see Woodward et al., J. Am. Chem. Soc. 89, page 1011 [1961]) or with an activated ester such as cyanomethyl ester, carboxymethyl thiol ester or nitrophenyl ester. Conversely an aminoacid or a peptide containing a free carboxyl group (and a protected amino group) may be reacted with an aminoacid or a peptide containing an activated amino group (and a protected carboxyl group) e.g. a phosphite amide.

Any free, functional groups not participating in the reaction are advantageously protected, especially by means of radicals that are easy to eliminate by hydrolysis or reduction, the carboxyl group advantageously by esterification e.g. with methanol, tertiary butanol, benzyl alcohol or para-nitrobenzyl alcohol, or amide formation or the amino group e.g. by introducing the tosyl, trityl, formyl, trifluoroacetyl, phthalyl or carbobenzoxy group or colored protective groups such as the para-phenylazo-benzyloxy-carbonyl group or the para-(para'-methoxy-phenylazo)-benzyloxycarbonyl group, or especially the tertiary butyl-oxycarbonyl radical. The guanidino grouping of arginine can be protected by the nitro group, though it is not absolutely necessary for this group of arginine to be protected during the reaction. The imidazolyl group of histidine can be protected by the benzyl or trityl radical.

The conversion of a protected amino or imino group into a free group and the conversion of a functionally modified carboxyl group into a free carboxyl group in the course of the present process is performed in the known manner by treatment with a hydrolyzing or, respectively, reducing agent.

According to a preferred process the tripeptide containing the first 3 aminoacids, e.g. H-D-Ser-Tyr-Ser-OH (the abbreviated forms indicate the L-aminoacids, unless D is specifically shown) or the tetrapeptide, which further contains the 4th aminoacid, is condensed with the heptapeptide or hexapeptide of the following aminoacids up to aminoacid 10, preferably by the azide method, whereupon the decapeptide is condensed with the whole of the residual peptide sequence, thus e.g. for the manufacture of the hexadecapeptide with the hexapeptide of aminoacids 11–16, the nonadecaptide with the nonapeptide of aminoacids 11–19, the eicosapeptide with the decapeptide of aminoacids 11–20, the heneicosapeptide with the undecapeptide of aminoacids 11–21, the docosapeptide with the dodecapeptide of aminoacids 1–22, the tricosapeptide with the tridecapeptide of aminoacids 11–23, the tetracosapeptide with the tetradecapeptide of aminoacids 11–24, the pentacosapeptide with the pentadecapeptide of aminoacids 11–25, the octacosapeptide with the octadecapeptide of aminoacids 11–28, the nonatriacontapeptide with the nonacosapeptide of aminoacids 11–39 or the corresponding peptides having a constitution which differs from that of the natural ACTH-sequence only as far as the kind of some aminoacids is concerned.

The coupling method employed in the afore-mentioned condensation is preferably the carbodiimide method or the method of the activated esters, above all by means of para-nitrophenyl ester. In the latter case the para-nitrophenyl ester of the decapeptide need not be isolated as such but can be formed during the actual condensation from the decapeptide containing a free carboxyl group, para-nitrophenol and dicyclohexyl carbodiimide. Thus, the decapeptide takes the form of an α-amino protected peptide having a free carboxyl group or a para-nitrophenyl ester group. The α-amino group of the decapeptide is preferably protected by the tertiary butyloxycarbonyl group. In the peptide fragment to be condensed with the decapeptide the terminal carboxyl group is preferably in the form of the tertiary butyl ester group or it is an amide group. The side-chain amino groups present in the peptide fragments to be condensed are advantageously protected by the tertiary butyloxycarbonyl group, and the side-chain carboxyl groups by the tertiary butyl ester group. In the last stage of the process these protective groups can be eliminated by means of trifluoroacetic acid.

According to another preferred process the tetrapeptide containing the first four aminoacids, above all H-D-Ser-Tyr-Ser-Met-OH, is condensed with the whole of the residual peptide sequence, thus, e.g. for the manufacture of the nonadecapeptide with the pentadecapeptide of aminoacids 5–19, the eicosapeptide with the hexadecapeptide of amino acids 5–20, the heneicosapeptide with the heptadecapeptide of aminoacids 5–21, the docosapeptide with the octadecapeptide of aminoacids 5–22, the tricosapeptide with the nonadecapeptide of aminoacids 5–23, the tetracosapeptide with the eicosapeptide of aminoacids 5–24, the pentacosapeptide with the heneicosapeptide of aminoacids 5–25, etc., or with the corresponding peptides modified in the sequence as to the nature of some aminoacids. The coupling method employed in this condensation is advantageously the azide method. The α-amino group of the tetrapeptide hydrazide or azide is preferably protected by the tertiary butyloxycarbonyl group. The peptide which is to be condensed with the tetrapeptide may be the free peptide or an ester, especially the tertiary butyl ester or the ω-amide. In this peptide the side-chain amino groups are preferably protected by the tertiary butyloxycarbonyl group, while side-chain carboxyl groups are protected by the tertiary butyl ester group.

After having formed by condensation of the peptide fragments the whole peptide (hexadecapeptide, heptadecapeptide, etc. up to the nonatriacontapeptide), whose α-amino group and side-chain amino groups are protected by the tertiary butyloxycarbonyl group and whose terminal carboxyl group and side-chain carboxyl groups are protected by the tertiary butyl ester group, all these protective groups may be eliminated simultaneously by acid hydrolysis, for example with trifluoroacetic acid. If the terminal carboxylic group is not the tertiary butyl ester group but an amide group, then peptide amides are obtained. Peptide hydrazides are obtained, for example, by treating a peptide containing a terminal lower alkyl ester group with hydrazine hydrate.

The invention further includes any varient of the present process in which an intermediate obtained at any stage of the process is used as starting material and any remaining steps are carried out or the process is discontinued at any stage thereof, as well as the intermediates thus obtained.

Depending on the reaction conditions used the new compounds are obtained in the form of bases or of their salts. The bases can be obtained from the salts in the usual manner. When bases are reacted with acids capable of forming therapeutically acceptable salts, they form salts, e.g. salts with inorganic acids such as hydrohalic acids, e.g. hydrochloric or hydrobromic acid, perchloric, nitric or thiocyanic acid, or sulfuric or phosphoric acids; or organic acids such as formic, acetic, propionic, glycolic, lactic, pyruvic, oxalic, malonic, succinic, maleic, fumaric, malic, tartaric, citric, ascorbic, hydroxymaleic, dihydroxy maleic, benzoic, phenylacetic, 4-aminobenzoic, 4-hydroxbenzoic, anthranilic, cinnamic, mandelic, salicyclic, 4-aminosalicylic, 2-phenoxybenzoic, 2-acetoxybenzoic, methanesulfonic, ethanesulfonic, hydroxyethanesulfonic, benzenesulfonic, para-toluenesulfonic, naphthalenesulfonic or sulfanilic acid.

The peptides obtained by the process may be used in the form of pharmaceutical preparations containing the peptides in conjunction or admixture with an organic or inorganic pharmaceutical excipient suitable for enteral or parenteral administration. Suitable excipients are substances that do not react with the polypeptides, e.g. gelatin, lactose, glucose, sodium chloride, starches, magnesium stearate, talcum, vegetable oils, benzyl alcohols, gums, polyalkyleneglycols, white petroleum jelly, cholesterol or other known medicinal excipients. The pharmaceutical preparations may be, for example, lyophilizates or in liquid form soltuions, suspensions or emulsions. They may be sterilized and/or contain assistants such as preserving, stabilizing, wetting or emulsifying agents. They may also contain further therapeutically valuable substances.

Inter alia, they may be combined above all with the additives conventionally used in ACTH-therapy to prolong their action, e.g. oxypolygelatin, polyphloretin phosphate, carboxymethyl cellulose or the afore-mentioned sparingly soluble metal compounds, especially the phosphates, pyrophosphates or hydroxides of zinc.

For therapeutical purposes there are administered 0.01 to 3 mg. of the active peptide either in solution or in suspension, preferably in the form of a complex having depot properties (prolonged activity), for instance as zinc complex suspension or as gelatine solution or as polyphloretin phosphate solution, the volume of application being 0.1 to 5 ml., for instance, from 1 to three times daily to once a week intravenously, intramuscularly, subcutaneously or intranasally. The free peptides are preferably applied by the intravenous or intramuscular route, whereas the complexes, for instance zinc complexes, are applied intramuscularly or subcutaneously.

Furthermore, the activity of the new peptides can be prolonged by converting the peptides into their complexes with polymers or copolymers of aminoacids, especially those that have a preponderance of acid α-aminoacids, such as glutamic acid or aspartic acid of the L-, D-, or D,L-configuration. The polymers and copolymers mentioned have free carboxyl groups in their side chains, whereas the terminal carboxyl group may be free or functionally converted, for example, an ester group or an unsubstituted amide group or an amide group substituted by hydrocarbon radicals, primarily lower alkyl groups. The molecular weight of the polymers may be between 10,000 and 100,000, preferably 20,000–80,000. It is advantageous to use for the manufacture of the polyaminoacid preparations a water-soluble, physiologically tolerable salt, for example, the sodium or ammonium salt or a salt with an organic base, such as triethylamine, procain, dibenzylamine, or other tertiary nitrogen base.

The aminoacid polymers are known or can be prepared by a known process, for example, by that described by M. Idelson et al., J. A. Chem. Soc. 80, 4631 et seq. (1958). Thus, for example, glutamic acid-α-carboxylic anhydride-γ-benzyl ester or -tertiary butyl ester may be caused to react in dioxane with ammonia or an amine in a certain molecular ratio, for example 100:1 (depending on the desired degree of polymerization), and the protective groups split off when polymerization is complete, for example, the butyloxy group with hydrogen bromide in glacial acetic acid, the tertiary butyloxy group with trifluoroacetic acid. To obtain polymers with a uniform, defined chain length, the polymers can be synthesized by the methods known in peptide chemistry (carbodiimide method, azide method, activated ester method, etc.).

The concentration of the polymers in the pharmaceutical preparations depends on the solubility of the salt concerned and on the viscosity of the polymer. The polymer should be present in the preparations in the dissolved state and it should be injectable.

The following examples illustrate the invention.

In the thin-layer chromatography the following systems were used:

System 40—n-butanol+ethanol+water (40:40:20)
System 43A—tertiary amyl alcohol+isopropanol+water (100:40:10)
System 43C—tertiary amyl alcohol+isopropanol+water (100:40:55)
System 45—secondary butanol+3% ammonia (100:44)
System 52—n-butanol+glacial acetic acid+water (100:10:30)
System 52A—n-butanol+glacial acetic acid+water (67;10:23)
System 54—secondary butanol+isopropanol+9% aqueous monochloro acetic acid (58:8:34)
System 100—ethyl acetate+pyridine+glacial acetic acid+water (62:21:6:11)
System 101—n-butanol+pyridine+glacial acidic acid+water (30:20:6:24)
System 101E—n-butanol+pyridine+glacial acetic acid+water (44:24:2:30)
System 102—ethyl acetate+methylethylketone+formic acid+water (50:30:10:10)
System 110—ethyl acetate+n-butanol+pyridine+glacial acetic acid+water (80:40:40:12:19)
System 112E—n-butanol+pyridine+formic acid+water (59:26.8:2.2:22)

The abbreviations have the following meanings:

Z=carbobenzoxy
BOC=tertiary butyloxycarbonyl
tBu=tertiary butyl

EXAMPLE 1

(1) Tertiary butyloxycarbonyl-D-serine hydrate

A solution of 10.5 g. (0.1 mol) of D-serine in 50 ml. of 2 N-sodium hydroxide solution is mixed with a solution of 15.7 g. (0.11 mol) of tertiary butyloxycarbonyl azide in 50 ml. of methanol, whereupon 11.1 g. (0.11 mol) of triethylamine in 100 ml. of methanol are stirred in dropwise at 40° C. within 4 hours. The batch is stirred for another 2 hours at 40° C. and then overnight at room temperature, then adjusted to pH 6 to 7 by adding 2 N-hydrochloric acid and freed from methanol under vacuum at 30° C. The aqueous solution is covered with ethyl acetate and at 0° C. concentrated hydrochloric acid is stirred in to establish a pH of 1 to 2. The ethyl acetate phase is quickly separated, repeatedly washed with saturated sodium chloride solution, dried and evaporated under vacuum. The resulting oil (19.8 g.) crystallizes as the monohydrate on being pasted with a small amount of water at 0° C. Yield: 15.95 g. (=71% of theory). Melting at 50 to 52° C. After recrystallization from a small amount of water the melting point remains unchanged. $[\alpha]_D^{20}=+9.1°\pm1°$ (c.=1.1 in water). According to its thin-layer chromatogram the product is unitary: $Rf_{43}=0.31$; $Rf_{100}=0.65$.

(2) Tertiary butyloxycarbonyl-D-seryl-L-tyrosyl-L-seryl-L-methionine methyl ester 8.26 g. (20 millimols) of L-tyrosyl-L-seryl-L-methionine methyl ester are dissolved at 70° C. in a mixture of 150 ml. of acetonitrile and 10 ml. of dimethylformamide, cooled to room temperature, and mixed with 4.46 g. (20 millimols) of tertiary butyloxycarbonyl-D-serine. The solution is cooled to −5° C., a solution of 4.53 g. (22 millimols) of dicyclohexyl carbodiimide in 10 ml. of acetonitrile is stirred in and the whole is stirred for one hour at −5° C. and then overnight at 0° C. 0.15 ml. of glacial acetic acid are added and the reaction mixture is stirred for 30 minutes at 0° C., the precipitated dicyclohexylurea filtered off and the filtrate evaporated under 0.1 mm. Hg pressure. The residue is taken up in ethyl acetate, the solution washed at 0° C. with N-hydrochloric acid, N-sodium bicarbonate solution and water, dried and evaporated under vacuum. On trituration with ether the residue turns solid. Yield: after recrystallization from methanol+ether: 9.1 g. (=76% of theory). Melting at 152 to 155° C. $[\alpha]_D^{20}=-7.0\pm1°$ (c.=0.9 in methanol). The thin-layer chromatogram of the substance contains the following Rf values: Rf=0.29 in chloroform+methanol (9:1); $Rf_{43}=0.78$; $Rf_{100}=0.85$.

(3) Tertiary butyloxycarbonyl-D-seryl-L-tyrosyl-L-seryl-L-methionine hydrazide

A solution of 12 g. (20 millimols) of tertiary butyloxycarbonyl-D-seryl-L-tyrosyl-L-seryl - L - methionine methyl ester in 50 ml. of methanol is mixed with 5 ml. (0.1 mol) of hydrazine hydrate and left to itself at room temperature. After 3 hours the precipitated crystalline hydrazide is filtered off and washed with water and ethanol; to yield 9.82 g. (=82% of theory), melting at 148–152° C., after recrystallization from methanol at 150 to 153° C. $[\alpha]_D^{20}=-6.3°\pm1°$ (c.=1 in methanol). According to its thin - layer chromatogram the substance is unitary: $Rf_{43}=0.65$; $Rf_{52}=0.57$; $Rf_{100}=0.51$.

(4) Tertiary butyloxycarbonyl-D - seryl - L - tyrosyl - L-seryl-L-methionyl-(γ - tertiary - butyl) - L - glutamyl-L-histidyl-L-phenylalanyl-L - arginyl - L - tryptophyl-glycine 1.43 g. (2.4 millimols) of tertiary butyloxycarbonyl-D-seryl-L-tyrosyl-L-seryl-L-methionine hydrazide are suspended at −10° C. in 15 ml. of dimethylformamide and mixed at this temperature with 1.58 ml. of ice-cold 6 N-hydrochloric acid. 0.5 ml. of ice-cold 5 N-sodium nitrite solution are dropped in at −8° C. and the batch is allowed to react for 25 minutes at −5 to −8° C. At the same time a solution of 1.65 g. of γ-tertiary butyl-L-glutamyl-L-histidyl-L - phenylalanyl - L - arginyl - L - tryptophyl-glycine (1.9 millimols) [see British patent specification No. 992,957 of Robert Schwyzer et al. allowed Mar. 25, 1965] in 5 ml. of warm dimethylformamide is cooled to −10° C. and mixed with 1.85 ml. of triethylamine. At −15° C. the ice-cold solution of the BOC-tetrapeptide azide is introduced, the whole stirred for one hour at −10° C. and then allowed to react further overnight at 0° C. A small amount of an inorganic salt settles out from the reaction solution; it is filtered off and the resulting solution concentrated to a small volume in a high vacuum. The crude, amorphous BOC-decapeptide is precipitated with 100 ml. of 2 N-ammonium hydroxide solution, suctioned off and washed neutral with water. After drying, there are obtained 1.88 g. of crude decapeptide derivative which on crystallization from 50 ml. of 90% methanol yields 1.2 g. of pure BOC-decapeptide melting at 208° C. with decomposition. The thin-layer chromatograms on silica gel in the systems 52 and 101 reveal only one spot each with Pauly-Ehrlich and Reindel-Hoppe reagents. $Rf_{52}=0.2$ and $Rf_{101}=0.6$. $[\alpha]_D=-16°\pm1°$ (c.=0.9 in 50% pyridine).

(5) Tertiary butyloxycarbonyl-D-seryl - L - tyrosyl - L-seryl-L-methionyl-(γ-tertiary butyl) - L - glutamyl - L-histidyl-L-phenylalanyl-L-arginyl-L-tryptophyl - glycyl-tertiary butyl-oxycarbonyl-L-lysyl-L-prolyl - L - valyl-glycyl-tertiary butyloxycarbonyl-L-lysyl - tertiary butyl-oxycarbonyl-L-lysyl-L-arginyl-L-arginyl - L - prolyl - L-valyl-tertiary butyloxycarbonyl-L-lysyl - L - valyl - L-tyrosyl-L-proline tertiary butyl ester 0.725 g. of tertiary butyloxycarbonyl-D-seryl-L-tyrosyl-L-seryl-L-methionyl-(γ-tertiary butyl)-L - glutamyl-L-histidyl-L-phenylalanyl-L-arginyl-L-tryptophyl - glycine (0.5 millimol) and 1.11 g. (0.5 millimol) of ε-tertiary butyloxycarbonyl-L-lysyl-L-prolyl-L-valyl-glycyl-tertiary butyloxycarbonyl-L-lysyl-tertiary butyloxycarbonyl - L-lysyl-L-arginyl-L-arginyl-L-prolyl-L-valyl - tertiary butyloxycarbonyl-L-lysyl-L-valyl-L - tyrosyl-L - proline-tertiary butyl ester trihydrochloride are stirred in 5 ml. of 90% pyridine for one hour at 50° C. under nitrogen, whereup 175 mg. (0.85 millimol) of dicyclohexyl carbodiimide are added and five hours later the identical amount of dicyclohexyl-carbodiimide is again added. The batch is allowed to react for 24 hours at 50° C., the precipitated dicyclohexyl-urea is filtered off (161 mg.) and the crude reaction product is precipitated with a large amount of ethyl acetate (1.77 g.). The hydrochloride is converted into the triacetate on an ion exchange resin, Amberlite IR-4B (acetate form) (diameter 16 mm., height 27 cm.). For purification the totality of the protected tetracosapeptide in 50% tertiary butanol is chromatographed on a carboxymethyl cellulose column (diameter 16 mm., height 17 cm.) by means of 50% tertiary butanol containing increasing proportions of 2 N acetic acid. Apart from the fringe fractions, the pure protected tetracosapeptide ester can be eluted with 50% tertiary butanol+2 N+acetic acid (96:4). Yield: 740 mg.

The thin-layer chromatogram of this fraction in the system 101 displays only one spot with Pauly, Reindel-Hoppe or ninhydrin reagent, $Rf=0.6$ $[\alpha]_D=49°\pm2°$ (c.=0.62 in methanol). Ultraviolet spectrum in 0.1 N sodium hydroxide solution in methanol: $\lambda_{max.}$ 283mμ, $\epsilon=8600$ and $\lambda_{max.}$ 289mμ, $\epsilon=8950$. Ratio Tyr:Try=1.9.

(6) D-seryl - L - tyrosyl-L-seryl-L-methionyl-L-glutamyl-L-histidyl - L - phenylalanyl - L-arginyl-L-tryptophyl-glycyl - L-lysyl-L-prolyl-L-valyl-glycyl-L-lysyl-L-lysyl-L-arginyl - L-arginyl-L-prolyl-L-valyl-L - lysyl-L-valyl-L-tyrosyl-L-proline hexaacetate 500 mg. of protected tetracosapeptide tertiary butyl ester are split with 5.5 ml. of 90% trifluoroacetic acid during 30 minutes at room temperature. The trifluoroacetate is precipitated with a large amount of peroxide-free ether, filtered off and washed with a large amount of ether and finally with petroleum ether. The amorphous residue is dissolved in water and the trifluoroacetate converted into the acetate on an ion exchange resin column of Amberlite IR-45. Yield: 450 mg. of thin-layer chromatographically pure tetracosapeptide; $Rf_{101}=0.5$ (on alumina). $[\alpha]_D=-85°\pm1.5°$ (c.=0.62 in 1% acetic acid).

Ultraviolet spectrum in 0.1 N sodium hydroxide solution: $\lambda_{max.}$ 283mμ, $\epsilon=8300$ and 288 mμ, $\epsilon=8600$.

The peptide cannot be split with leucine amino peptidase. In the Sayers test (Endocrinology 42, 379 [1948]) it has about 750 international units/mg., whereas the corresponding L-seryl analog, $\beta^{1-24}$-corticotropin, shows about 100 I.U./mg.

EXAMPLE 2

(1) BOC-D-alanine 5 g. (56.2 millimols) of D-alanine in 30 ml. of water are mixed with 3.2 g. (39 millimols) of magnesium oxide and a solution of 12.4 ml. (90 millimols) of tertiary butyl-oxycarbonyl azide in 30 ml. of dioxane and the batch is allowed to react for 16 hours at 45° C. while being well stirred. The reaction mixture is mixed with 30 ml. of water, the insoluble product filtered off and the filtrate is concentrated to a small volume under vacuum. The concentrated solution is then extracted twice with ethyl acetate, the organic phases are washed with sodium bicarbonate and water, and the combined aqueous solutions are cooled to 0° C. The solution is adjusted to pH=4 with 10% citric acid solution, and the BOC-alanine is extracted with a large amount of ethyl acetate. The ethyl acetate phases are washed with saturated sodium chloride solution, dried over sodium sulfate and evaporated under vacuum. Yield: 4.5 g.; melting at 83 to 84° C. $[\alpha]_D^{22}=+25°\pm0.3°$ (c.=2.65 in methanol). The compound displays the following Rf values in the thin-layer chromatogram on silica gel: $Rf_{43C}=0.35$, $Rf_{101}=0.75$.

(2) BOC-D-Ala-Tyr-Ser-Met-OCH₃

3 g. (7.2 millimols) of H-Tyr-Ser-Met-OCH₃ are dissolved in a mixture of 2.7 ml. of dimethylformamide and 50 ml. of acetonitrile; 1.37 g. (7.2 millimols) of BOC-D-alanine and then at —5° C. 1.65 g. (7.9 millimols) of dicyclohexyl carbodiimide are added. The whole is stirred for 2 hours at —5° C. and then kept for 13 hours at 0° C. In addition to dicyclohexylurea, the BOC-tetrapeptide ester precipitates from the reaction solution. The precipitate is filtered off and while still moist digested with 3×7.5 ml. of warm dimethylformamide, the solvent is evaporated under a high vacuum and the residue crystallized from methanol. Yield: 2.01 g. of protected tetrapeptide methyl ester melting at 186 to 187° C. $[\alpha]_D^{22}=-2°\pm1°$ (c.=1.05 in methanol). The thin-layer chromatogram of the compound on silica gel contains the following Rf values:

$Rf_{43C}=0.7$
Rf (chloroform+methanol 9:1)=0.4

It gives a positive reaction with Javell-Reindel-Hoppe reagent, Pauly reagent and potassium iodoplatinate.

(3) BOC-D-Ala-Tyr-Ser-Met-NH-NH₂

1.7 g. (2.9 millimols) of BOC tetrapeptide ester are dissolved with heating in 12 ml. of methanol, the solution is cooled to room temperature and stirred with 0.73 ml. of hydrazine hydrate for 16 hours at room temperature, whereupon the hydrazide settles out as a thick, white precipitate. The batch is diluted with 12 ml. of water, stirred on for one hour, cooled in an ice bath, and the partially crystalline precipitate is filtered off, thoroughly washed with water and dried over phosphorus pentoxide and sulfuric acid in a high vacuum. Yield: 1.42 g. of protected tetrapeptide hydrazide; it melts at 176 to 177° C. $[\alpha]_D^{22}=+16°\pm1°$ (c.=1.03 in glacial acetic acid). In the thin-layer chromatogram on silica gel the following Rf values are found:

Rf (100)=0.65
Rf (chloroform+methanol 9:1)=0.2

The substance gives a positive reaction with Javelle-Reindel-Hoppe reagent, Pauly reagent and potassium iodoplatinate.

(4) BOC-D-Ala-Tyr-Ser-Met-Glu(OtBu)-His-Phe-Arg-Try-Gly-OH

The decapeptide derivative is manufactured from 1.32 g. of BOC-D-Ala-Tyr-Ser-Met-hydrazide and 1.61 g. of H-Glu(OtBu)-His-Phe-Arg-Try-Gly-OH as described in Example 1(4). Yield: 1.9 g. of crude BOC-decapeptide. Crystallization from 90% methanol furnishes 700 mg. of crystalline peptide derivative melting at 206° C. with decomposition, accompanied by 720 mg. of undissolved amorphous product melting at 210° C. According to their thin-layer chromatograms on silica gel (systems 52 and 101) the two fractions are unitary and identical. $Rf_{101}=0.75$; $Rf_{52}=0.25$. $[\alpha]_D^{22}=-8°\pm1°$ (c.=1.06 in 50% pyridine.)

11

(5) BOC - D - Ala - Tyr - Ser-Met-Glu(OtBu)-His-Phe-Arg-Try-Gly-Lys(BOC)-Pro - Val - Gly - Lys(BOC)-Lys(BOC) - Arg-Arg-Pro-Val-Lys(BOC)-Val-Tyr-Pro-OtBu 370 mg. (0.25 millimol) of BOC-D-Ala-Tyr-Ser-Met-Glu(OtBu)-His-Phe-Arg-Try-Gly-OH and 55 mg. of H-Lys(BOC)-Pro-Val-Gly-Lys(BOC) - Lys(BOC)-Arg-Arg-Pro-Val-Lys(BOC)-Val-Tyr-Pro-OtBu are stirred under nitrogen in 5 ml. of 80% pyridine for one hour at 45° C., then mixed with 80 mg. of dicyclohexyl carbodiimide and after 5 hours another 80 mg. of dicyclohexyl carbodiimide are added. The batch is allowed to react for 20 hours for 45° C., cooled to room temperature, the precipitated dicyclohexylurea is filtered off and the crude reaction product is precipitated with much ethyl acetate. Yield: 880 mg. of crude protected tetracosapeptide ester which is still contaminated with starting material; it is purified by counter-current distribution according to Craig in the system chloroform+carbon tetrachloride+methanol+buffer (5:2:8:4)

over 550 stages. (Buffer=28.5 ml. of glacial acetic acid+19.25 g. of sodium acetate per liter of water.)

From fractions 69–90 there are obtained 400 mg. of pure protected D-Ala$^1$-β$^{1-24}$-corticotropin tertiary butyl ester. $[\alpha]_D^{22}$=−48°±2° (c.=0.52 in methanol). The ultraviolet spectrum of the compound in 0.1 N methanolic sodium hydroxide solution contains maxima at λ283 (ϵ=9300) and 289 mμ (=9600).

(6) D - Ala - Tyr - Ser - Met-Glu-His-Phe-Arg-Try-Gly-Lys - Pro - Val-Gly-Lys-Lys-Arg-Arg-Pro-Val-Lys-Val-Tyr-Pro-OH, 6.CH$_3$.COOH (D-Ala$^1$-β$^{1-24}$-corticotropin The pure protected 24-peptide derivative is converted into the pure tetracosapeptide hexaacetate with 90% trifluoroacetic acid as described in Example 1; its thin-layer chromatogram on alumina displays the Rf$_{101}$=0.6. In the Sayers test the peptide displays a high ACTH-activity (about 600 I.U./mg.).

EXAMPLE 3

(1) Z-Arg-Pro-OtBu 5.35 g. of Z-Arg-OH and 5 g. of proline tertiary butyl ester hydrochloride are suspended at room temperature in 70 ml. of absolute chloroform, 5.1 g. of dicyclohexyl carbodiimide are added and the mixture is heated to 50° C.; the starting materials dissolve and at the same time a new crystalline precipitate forms. After 5 hours the batch is cooled to 0° C., suctioned and the residue washed with chloroform. The mixture of dicyclohexylurea and dipeptide is dried, extracted with 100 ml. of boiling water, the insoluble urea derivative is suctioned off and the filtrate evaporated to dryness under vacuum. On crystallization from 30 ml. of isopropanol, the residue yields 7.2 g. of protected dipeptide ester hydrochloride melting at 178 to 180° C.; its thin-layer chromatogram on silica gel plates in the system 102 displays an Rf value of 0.62 (indicator: Sakaguchi reagent).

(2) Z-Arg-Arg-Pro-OtBu

A solution of 7.1 g. of Z-Arg-Pro-OtBu in 70 ml. of methanol and 6.8 ml. of 2.18 N hydrochloric acid is hydrogenated within 90 minutes in the presence of 700 mg. of palladium charcoal (10% Pd). The catalyst is then filtered off and the filtrate evaporated to dryness under vacuum. The residue, together with 5.4 g. of Z-Arg-OH, is dissolved in 17 ml. of dimethylformamide, mixed with 17 ml. of chloroform and cooled to 0° C. 4.5 g. of dicyclohexyl carbodiimide are stirred in and then 52 ml. of chloroform are added. The mixture is stirred overnight at 0° C. and then evaporated to dryness under vacuum. The residue is triturated with 100 ml. of water, the insoluble urea derivative suctioned off and washed with water and chloroform. The aqueous phase is separated, washed three times with chloroform and concentrated under vacuum.

12

The concentrated solution is filtered through 300 ml. of Amberlite IRA–400 (acetate form) and the diacetate of the peptide derivative is eluted with water. The eluate is collected fractionwise and tested in the thin-layer chromatogram in the system 102. The pure fractions (Rf=0.35) are combined and evaporated to dryness under vacuum. Yield: 10.2 g. (=97% of theory).

(3) H-Arg-Arg-Pro-OtBu 4.5 g. of Z-Arg-Arg-Pro-OtBu diacetate are hydrogenated in 25 ml. of methanol in the presence of 500 mg. of 10% palladium charcoal, the catalyst filtered off, the filtrate evaporated to dryness and the residue, together with 1 ml. of triethylamine, dissolved in 28 ml. of dimethylformamide. The solution is kept at 0° C. and then used as it is for the synthesis of the nonapeptide derivative.

(4) Z-Lys(BOC)-Pro-Val-Gly-Lys(BOC)-Lys(BOC)-Arg-Arg-Pro-OtBu 4.4 g. of Z - Lys(BOC) - Pro - Val - Gly - Lys(BOC)-Lys(BOC)-NHNH$_2$ [prepared, for example, as described in Belgian Pat. No. 635,618 of Heini Kappeler et al. allowed Jan. 31, 1964] are dissolved in 44 ml. of absolute dimethylformamide; 10.8 ml. of N-hydrochloric acid are dropped in at −20° C., and then 4.4 ml. of N-sodium nitrite solution are added, and the batch is stirred on for 20 minutes at −10° C. The above solution of H-Arg-Arg-Pro-OtBu is then added and the whole is kept overnight at 0° C. The dimethylformamide is distilled off under a high vacuum and the residue triturated with ether to form a powder which is dissolved in warm 1% acetic acid saturated with ethyl acetate and mixed with Amberlite IRA–400 (acetate form) until chlorine ions can no longer be identified. The ion exchange resin is then suctioned off, the filtrate extracted with 2× 100 ml. of ethyl acetate, and the organic phase is extracted twice more the 1% acetic acid. The combined aqueous solutions are evaporated to dryness under vacuum, the residue dissolved in 7:3 chloroform+methanol, chromatographed on 200 g. of silica gel, and eluted with 600 ml. of the above chloroform+methanol mixture and with 400 ml. of methanol, to yield 4.56 g. of the protected nonapeptide derivative (as the diacetate) which is unitary according to its thin-layer chromatogram (Rf=0.35 in the system 102).

(5) H-Lys(BOC) - Pro - Val-Gly-Lys(BOC)-Lys(BOC)-Arg-Arg-Pro-OtBu (a) Acetate.—A solution of 600 mg. of the above nonapeptide derivative in 12 ml. of methanol is hydrogenated in the presence of 60 mg. of 10% palladium charcoal. When the absorption of hydrogen has ceased, the catalyst is suctioned off and the filtrate evaporated to dryness under vacuum. Yield: 530 mg. (=96% of theory). The compound is unitary according to its thin-layer chromatogram (Rf=0.08 in the system 102).

(b) Hydrochloride.—300 mg. of the nonapeptide derivative acetate obtained under (a) are mixed with 5 ml. of pyridine and dissolved by adding 200 mg. of pyridine hydrochloride. The solution is evaporated to dryness and the residue freed from pyridine acetate by being dried for several hours under a high vacuum at 40° C. To remove the excess pyridine hydrochloride the product is then triturated with acetone, whereupon the nonapeptide hydrochloride is obtained as a powder which is insoluble in acetone.

(6) BOC - D - Ser - Tyr - Ser-Met-Glue(OtBu)-His-Phe-Arg - Try - Gly - Lys(BOC) - Pro-Val-Gly-Lys(BOC)-Lys(BOC)-Arg-Arg-Pro-OtBu 100 mg. of the above nonapeptide ester hydrochloride are dissolved in 2.2 ml. of absolute pyridine and mixed with 120 mg. of BOC-D-Ser-Tyr-Ser-Met-Glu(OtBu)-His-Phe-Arg-Try-Gly-OH (see Example 1). The mixture is stirred under nitrogen until all has dissolved. 100 mg. of dicyclohexyl carbodiimide are then added and the whole is stirred under nitrogen for 18 hours at 24° C. The precipitate formed is filtered off and the filtrate evaporated to dryness. The evaporation residue is triturated with ether and the resulting firm powder is subjected to a countercurrent distribution according to Craig over 120 stages in the system chloroform+carbon tetrachloride (5:2) +methanol+0.5 molar aqueous ammonium acetate solution (2:1)=1.1; phase volume 3 ml. The crude product is dissolved in 15 ml. of upper and lower phase and the solution distributed over the first 5 tubes of the distribution apparatus. Fractions 46 to 55 contain the pure protected nonadecapeptide ester (distribution number K=0.7); according to its thin-layer chromatogram on silica gel it is unitary ($Rf_{110}=0.42$).

(7) H - D - Ser - Tyr-Ser-Met-Glu-His-Phe-Arg-Try-Gly-Lys-Pro-Val-Gly-Lys-Lys-Arg-Arg-Pro-OH, hexaacetate A solution of 50 mg. of the protected nonadecapeptide ester in 3 ml. of 95% trifluoroacetic acid is kept for one hour at 22° C., then evaporated to dryness and the residue dissolved in 2 N-acetic acid and the trifluoroacetate ions are removed on a column of a weakly basic ion exchange resin (Merck II) in the acetate form. The eluate is lyophilized and furnishes 40 mg. of the free nonadecapeptide in the form of a colorless, amorphous powder. Paperelectrophoresis (pH 6.3; 1000 volts, 2 hours' migration) reveals the product to be unitary: travelling distance of 8.5 cm. (under identical conditions $\beta^{1-24}$-corticotropin travels 10.5 cm.); in thin-layer chromatography on an alumina plate ($Rf_{101}=0.50$) the product is likewise found to be unitary. In the Sayers test the activity of D-Ser$^1$-$\beta^{1-19}$-corticotropin is 330 I.U./mg., whereas $\beta^{1-19}$-corticotropin (all L-aminoacids) has 30 I.U./mg.

EXAMPLE 4

(1) Z-Pro-Val-Lys(BOC)-Val-Tyr-Pro-OtBu (a) 5.14 g. (6.75 millimols) of the pentapeptide ester H-Val-Lys(BOC)-Val-Tyr-Pro-OtBu [prepared, for example, according to the afore-mentioned Belgian Pat. No. 635,618] are dissolved in 10 ml. of dimethylformamide, and 3.01 g. (8.15 millimols) of benzyloxycarbonyl-L-proline-para-nitrophenyl ester are added. After 20 hours at room temperature the reaction mixture is worked up by dilution with 100 ml. of ethyl acetate and the solution is washed with 50 ml. of water, then with 4×25 ml. of molar potassium carbonate solution and with 2×25 ml. of water. The ethyl acetate layer is then cooled to 0° C. and extracted with 2×25 ml. of 1% aqueous citric acid solution, washed neutral and dried with sodium sulfate.

The protected hexapeptide ester is obtained in powder form by diluting the concentrated solution with dry ethyl ether. Yield: 97% of theory. According to its thin-layer chromatogram on silica gel the product is unitary in the following solvent systems:

methanol: R$f$=0.97
chloroform+methanol (95:5): R$f$=0.26
benzene+acetone (1:1): R$f$=0.47

The product is not crystalline; it melts at about 156 to 180° C. $[\alpha]_D^{21°}$=—94.5 (c.=1.09 in methanol); $[\alpha]_D^{23°}$=—46.4 (c.=1.01 in dimethylforamide).

(b) 7.61 g. (10 millimols) of the free pentapeptide ester H-Val-Lys(BOC)-Val-Tyr-Pro-OtBu are dissolved in 15 ml. of dimethylformamide, and 1.4 ml. of triethylamine are added. The mixture is cooled to —10° C. and mixed with 4.73 g. (12 millimols) of carbobenzoxy-L-proline-N-hydroxy-phthalimide ester [prepared according to Rec. Chim. Trav. Pays-Bas 81, page 683 (1962)]. The reaction mixture soon turns dark red and is worked up when all has passed into solution. The dissolution of the ester and the coupling take only 15 minutes. Working up consists in dilution with ethyl acetate, extraction with 60 ml. of water to remove the dimethylformamide, extraction with 4×25 ml. of saturated bicarbonate solution, one extraction with a 1% citric acid solution and washing until neutral. The solution is then dried with sodium sulfate, filtered, and the filtrate vigorously stirred into ½ liter of petroleum ether. The resulting suspension is diluted with ½ liter of petroleum ether, filtered and dried, to yield 9.83 g. (=99% of theory) of a chromatographically pure product which is identical with the product obtained in Example 1.

(2) H-Pro-Val-Lys(BOC)-Val-Tyr-Pro-OtBu (a) Free hexapeptide ester.—6.5 g. (6.55 millimols) of protected hexapeptide ester Z-Pro-Val-Lys(BOC)-Val-Tyr-Pro-OtBu are dissolved in 150 ml. of methanol and hydrogenated for 23.5 hours in the presence of 1.3 g. of palladium charcoal (10% Pd).

The methanolic solution is then filtered and the filtrate concentrated under vacuum.

A sample is kept at room temperature in an open vessel, whereupon crystals form which are used for seeding the main product. After 20 hours in an ice box the needles (1.41 g.) are filtered off and washed first with methanol+ether and then with ether. With ether another 3.25 g. of the peptide ester are obtained from the mother liquor; thus the total yield is 4.66 g. (=83% of theory). Melting point 174 to 176° C. $[\alpha]_D^{20°}$=—91°±0.5 (c.=1.87 in methanol).

The peptide ester is soluble in methanol, acetone, dimethylformamide and insoluble in ethyl acetate, ether and petroleum ether.

(b) Monoacetate.—2.5 g. (2.52 millimols) of the above protected hexapeptide ester are hydrogenated in glacial acetic acid+water (4:1) in the presence of 1.3 g. of palladium charcoal. The absorption of hydrogen ceases after 2½ hours. The catalyst is filtered off, the filtrate evaporated under vacuum at a bath temperature of 40° C. and the residue dried over sodium hydroxide under a high vacuum, to yield 2.34 g. (=100% of theory) of a colorless resin which is unitary according to its thin-layer chromatogram.

The compound reveals the following Rf values (developed with Reindel-Hoppe reagent) on silica gel plates: System chloroform+methanol (8:2):0.61; system 43A:0.50.

$N^\alpha$-benzyloxycarbonyl-$N^\delta$-tert.butyloxycarbonyl-L-ornithine 26 g. (112 millimols) of $N^\delta$-tertiary butyloxycarbonyl-L-ornithine (prepared according to British patent specification No. 957,892 of Robert Schwyzer et al. allowed Mar. 12, 1964) are carbobenzoxylated in the usual manner. To acidify the alkaline reaction solution extracted with ether the pH is adjusted at 0° C. to pH=3 with citric acid, once more extracted with ether, washed with water and dried, and the solvent distilled off, to yield 37.8 g. (=92% of theory) of a colorless oil.

1 g. of the above oil is dissolved in 5 ml. of ether and caused to crystallized by adding 600 mg. of dicyclohexylamine. The resulting salt is washed with ether. Yield: 1.28 g. (=85% of theory). Metling at 133° C.

The bulk of the product crystallizes on dissolution in 100 ml. of warm diisopropyl ether and cooling. There are obtained white crystals melting at 99° C., and after recrystallization from 100 ml. of hot diisopropyl ether with addition of 20 ml. of ethyl acetate, at 101° C. $[\alpha]_D^{21°}$=—3.2° (c.=2.45 in absolute methanol).

(4) $N^\alpha$-benzyloxycarbonyl-$N^\delta$-tert.butyloxycarbonyl-L-ornithine-para-nitrophenyl ester A solution of 14.6 g. (40 millimols) of $N^\alpha$-Z-$N^\delta$-BOC-Orn-OH and 6.72 g. of para-nitrophenol (48 millimols) in 75 ml. of ethyl acetate is cooled to —20° C. and mixed with 8.24 g. (40 millimols) of dicyclohexyl carbodiimide. The batch is kept for 2 hours at 0° C., then filtered, the filtrate evaporated to dryness and the crystalline residue diluted with 75 ml. of 10% acetonitrile in diisopropyl ether. After 24 hours at 0° C., the batch is filtered and washed with diisopropyl ether. The still moist material is dissolved in 50 ml. of ethanol and 25 ml. of diisopropyl ether are added. When the reaction mixture is kept for several hours in an ice box, small needles of the above para-nitrophenyl ester form (11.9 g.=61.5% of the theoretical yield), melting at 102° C. When the mother liquor is concentrated, it yields another 2.5 g. (=19% of theory) of this ester.

After recrystallization from a small amount of ethanol the ester melts at 103° C. $[\alpha]_D^{24°}=-26.7°$ (c.=5.01 in methanol).

The ester is soluble in dimethylformamide, acetone, methylenechloride, ether, ethyl acetate, ethanol and acetonitrile, and sparingly soluble in diisopropyl ether and petroleum ether.

(5) $N^\alpha$-Benzyloxycarbonyl-$N^\delta$-tert.butyloxycarbonyl-L-ornithine hydroxyphthalimide ester A solution of 3.66 g. (10 millimols) of $N^\alpha$-Z-$N^\delta$-BOC-L-Orn-OH in 5 ml. of anhydrous pyridine is cooled to —10° C. and mixed with a solution of 2.06 g. (10 millimols) of dicyclohexyl carbodiimide in 5 ml. of pyridine. After 5 minutes 1.96 g. of N-hydroxy-phthalimide are added and the mixture is kept for 16 hours at 0° C., then filtered and rinsed with pyridine. The filtrate is freed from pyridine under vacuum at 40° C., mixed with secondary butanol, once more evaporated to dryness and then taken up in a small amount of ether. After 48 hours at —8° C. the resulting crystals (4.5 g.=88% of the theoretical yield) are isolated; they melt at 125 to 127° C.

The crude crystallizate is dissolved with heating in acetonitrile, the residual dicyclohexylurea and hydroxyphthalimide are filtered off and the filtrate is caused to crystallize by adding diisopropyl ether, to yield 3.12 g. (=61% of theory) of pure product. After recrystallization from isopropyl alcohol it melts at 129° C. $[\alpha]_D^{27°}=-25.7°$ (c.=1 in methanol).

(6) Z-Orn(BOC)-Pro-Val-Lys(BOC)-Val-Tyr-Pro-OtBu (a) A solution of 2.3 g. (2.5 millimols) of H-Pro-Val-Lys(BOC)-Val-Tyr-Pro-OtBu acetate in 5 ml. of dimethylformamide is mixed with 1.71 g. (3.5 millimols) of Z-Orn(BOC)-ONP. After 24 hours the reaction mixture is diluted by vigorously stirring in 200 ml. of ether. Within 15 minutes a white precipitate forms; it is filtered off, washed with ether and dried. According to its thin-layer chromatogram the resulting heptapeptide derivative is unitary in the following solvent systems:

Benzene+acetone (1:1): Rf=0.37
Chloroform+methanol (9:1): Rf=0.47

After drying for 40 hours under vacuum there are obtained 2.73 g. (=90% of theory) of a white powder melting at 142 to 145° C.

$[\alpha]_D^{20°}=-38°\pm0.5$ (c.=2.061 in dimethylformamide); $=-90°\pm1°$ (c.=0.970 in methanol).

The product is soluble in dimethylformamide, acetic acid, alcohols and acetone, more sparingly soluble in acetonitrile and insoluble in ethyl acetate, ether, benzene and petroleum ether.

(b) A solution of 429 mg. (0.5 millimol) of H-Pro-Val-Lys-(BOC)-Val-Tyr-Pro-OtBu in 2 ml. of dimethylformamide is mixed with 305 mg. (0.60 millimol) of $N^\alpha$ - benzyloxycarbonyl - $N^\delta$-tertiary butyloxycarbonyl-L-ornithine hydroxyphthalimide ester. 0.14 ml. of triethylamine are added, whereupon the reaction mixture turns red and is worked up 15 minutes later. About 50 ml. of ether are stirred into the solution which is filtered half and hour later, to yield 536 mg. of the protected heptapeptide ester (=89% of theory) which is found to be analytically pure and identical with the product obtained as described under (a) above.

(7) H-Orn(BOC)-Pro-Val-Lys(BOC)-Val-Tyr-Pro-OtBu (a) Acetate.—A solution of 1 g. (0.83 millimol) of the protected heptapeptide ester described under (b) in 25 ml. of 80% acetic acid is hydrogenated as described under 2. On completion of the hydrogenation the catalyst is filtered off, thoroughly washed, and the filtrate is evaporated to dryness, to leave 956 mg. (=10% of theory) of pure material which cannot be distinguished from the free base (see below) by thin-layer chromatography. $[\alpha]_D^{20°}=-87°\pm1$ (c.=1.028 in methanol); $=-27°\pm1$ (c.=1.095 in 80% acetic acid).

(b) Free heptapeptide ester.—A solution of 1 g. (0.83 millimol) of the protected heptapeptide ester in methanol is hydrogenated as described under 2. The product is not obtained in crystalline form, but it no longer contains any starting material and is unitary according to its thin-layer chromatogram on silica gel plates; it reveals the following Rf values:

System 52=68
Chloroform+methanol (90:10)=0.13.

After total hydrolysis and aminoacid analysis according to Stein and Moore an aminoacid ratio Pro:Val:Tyr:Orn:Lys=204:2.00:0.98:1.06:1.08 is found.

(8) Z-Orn(BOC)-Orn(BOC)-Pro-Val-Lys(BOC)-Val-Tyr-Pro-OtBu

A solution of 2.69 g. (2.98 millimols) of the heptapeptide ester acetate obtained according to 7(a) in 5 ml. of dimethylformamide is mixed with 1.4 g. (2.86 millimols) of Z-Orn(BOC)-ONP. The mixture is kept overnight at room temperature and then concentrated under a high vacuum, to leave a brown resin which on addition of 100 ml. of warm acetonitrile yields a white precipitate. After 3 hours at 0° the latter is filtered off, and the resulting powder washed with acetonitrile and with ether. After drying, the resulting octapeptide ester weighs 3.15 g. (=93% of theory); it melts at 152 to 154° C. $[\alpha]_D^{21°}=-83.3°\pm0.5$ (c.=1.046 in methanol). The product is unitary according to its thin-layer chromatogram on silica gel and reveals the following Rf values:

Chloroform+methanol (95:5)=0.54
Benzene+acetone (1:1)=0.56.

The octapeptide ester is soluble in dimethylformamide, acetic acid, methanol and ethanol, more sparingly soluble in hot acetonitrile and insoluble in ethyl acetate and ether.

(9) H-Orn(BOC)-Orn(BOC)-Pro-Val-Lys(BOC)-Val-Tyr-Pro-OtBu (a) Acetate.—The protected octapeptide ester according to 7 is dissolved in 80% acetic acid and hydrogenated as described under 2. The catalyst is then filtered off and the filtrate evaporated at a maximum bath temperature of 30° C. According to its thin-layer chromatogram on silica gel plates the resulting product is unitary and reveals the following Rf values:

Chloroform+methanol (95:5)=0.06
Chloroform+methanol (9:1)=0.22
Chloroform+methanol (85:15)=0.26
Benzene+acetone (1:1)=0.03

$[\alpha]_D^{25°}=-49.4°\pm1$ (c.=0.942 in dimethylformamide)
$[\alpha]_D^{26°}=-85.6°\pm1$ (c.=1.266 in methanol)

(b) Free octapeptide ester.—A solution of 500 mg. of the protected octapeptide ester in methanol is hydrogenated as described under 2, to yield 441 mg. of free base (=96% of theory). The Rf values do not differ from those of the acetate described above. $[\alpha]_D^{25°}=-51.8°\pm1$ (c.=1.247 in dimethylformamide); $[\alpha]_D^{26°}=87.7°\pm1$ (c.=1.079 in methanol).

(10) Z - Lys(BOC)-Pro-Val-Gly-Lys(BOC)-Lys(BOC)-Orn(BOC) - Orn(BOC) - Pro-Val-Lys(BOC)-val-Tyr-Pro-OtBu 900 mg. (0.80 millimol) of the hexapeptide hydrazide Z - Lys(BOC) - Pro-Val-Gly-Lys(BOC)-Lys(BOC)-NH-NH₂ (prepared, e.g. according to Belgian Pat. No. 635,-

618) are dissolved in 9 ml. of pure dimethylformamide and the solution is cooled to −10° C. 1.6 ml. of 2 N hydrochloric acid and 0.18 ml. of 5 N sodium nitrite solution are added, the whole is stirred for 10 minutes at −10° C., and a solution of 900 mg. (0.67 millimol) of the octapeptide acetate described in 9(a) in 9 ml. of dimethylformamide is added. 0.53 ml. (4.0 millimol) of triethylamine are then added and the batch is kept for 18 hours in an ice box. The solution is then evaporated to dryness under a high vacuum and the residue triturated with acetonitrile. The tetradecapeptide derivative is insoluble in acetonitrile; it is filtered off and washed with 3× 25 ml. of acetonitrile.

There are obtained 1.554 g. (=98% of theory) of a faintly yellowish product which reveals in the thin-layer chromatogram only a trace of an impurity. None of the two starting materials can be identified. The Rf values (on silica gel) are:

Chloroform+methanol (95:5)=0.31
Dioxane+water (95:5)=0.76

The product is amorphous but has a sharp melting point at 192 to 194° C. $[\alpha]_D^{25°} = -37.8°\pm1$ (c.=1.050 in dimethylformamide). As revealed by elementary analysis, the peptide derivative is obtained in the form of the dihydrate.

(11) H - Lys(BOC)-Pro-Val-Gly-Lys(BOC)-Lys(BOC)-Orn(BOC) - Orn(BOC) - Pro-Val-Lys(BOC)-Val-Tyr-Pro-OtBu-tosylate 1 g. (0.42 millimol) of the protected tetradecapeptide ester are suspended in 150 ml. of methanol and agitated at 40° C. until all has dissolved. 400 mg. of 5% palladium charcoal are then added and the solution is agitated for 18 hours at 40° C. under hydrogen, filtered, and evaporated, to yield 793 mg. (=84% of theory) of the ester.

For conversion into the tosylate the product is dissolved in 5 ml. of pyridine, a solution of 70 ml. of paratoluenesulfonic acid in 1 ml. of pyridine is added, the pyridine evaporated to dryness under vacuum and the residue repeatedly washed with ether while triturating and decanting. After drying, there are obtained 721 mg. of the tetradecapeptide ester tosylate as an amorphous powder which is substantially unitary as revealed by its thin-layer chromatogram and displays the following Rf values:

System 43C=0.49
System 52=0.61

(12) BOC - D-Ser-Tyr-Ser-Met-Glu(OtBu)-His-Phe-Arg-Try - Gly - Lys(BOC) - Pro-Val-Gly-Lys(BOC)-Lys (BOC) - Orn(BOC) - Orn(BOC)-Pro-Val-Lys(BOC)-Val-Tyr-Pro-OtBu

A suspension of 400 mg. of the tetradecapeptide ester tosylate and 350 mg. of BOC-D-Ser-Tyr-Ser-Met-Glut-(OtBu)-His-Phe-Arg-Try-Gly-OH (cf. Example 1) in 5 ml. of pyridine is stirred under nitrogen at 50° C. until both components have dissolved (2 hours). The batch is then cooled to 40° C., 500 mg. of dicyclohexyl carbodiimide are added and the whole is stirred for 18 hours at 40° C. under nitrogen, then further for 20 hours at 0° C., and the precipitated dicyclohexylurea is filtered off. The filtrate is evaporated to dryness, the residue freed from excess dicyclohexyl carbodiimide by being repeatedly triturated and washed with petroleum ether, and the powder, which is insoluble in petroleum ether, is purified by being washed with ethyl acetate while triturating and decanting.

The resulting crude product melts unsharply at about 165 to 195° C. and is further processed without first having been purified.

(13) H - D - Ser - Tyr - Ser - Met - Glu - His - Phe - Arg-Try - Gly - Lys - Pro - Val - Gly - Lys - Orn - Orn-Pro - Val - Lys - Val - Tyr - Pro - OH hexaacetate 100 mg. of the crude protected tetracosapeptide derivative are dissolved in 5 ml. of trifluoroacetic acid (containing 5% of water) and the solution is kept for 1 hour at 25° C., then evaporated to dryness under vacuum and the residue is immediately washed several times with anhydrous, peroxide-free ether with trituration and decantation. The resulting powder is mixed with 10 ml. of N-acetic acid, with some dicyclohexylurea remaining undissolved. The solution is filtered and the filtrate freed from trifluoroacetate and para-toluenesulfonate ions by being run through a column of a weakly basic ion exchange resin (Merck II; acetate form). The column is rinsed with 10 ml. of N-acetic acid, and the eluates are combined and lyophilized. According to its paper-electrophoresis (pH 6.2; 1000 volts; 2 hours) the lyophilizate is not yet unitary; apart from a spot corresponding to free D-Ser$^1$,Orn$^{17}$,Orn$^{18}$-$\beta^{1-24}$ corticotropin (travelling distance 14 cm.) two further, weaker side-spots are visible (travelling distance 2.5 and 18 cm.).

The crude product is purified by chromatography on carboxymethyl cellulose (makers Messrs. Serva, Heidelberg; size of column: 0.9 x 14 cm.). The solvent used— in which the carboxymethyl cellulose is suspended for preparing the column—is 0.05 ml. of ammonium acetate solution, pH=5.2. The above lyophilizate is dissolved in 2 ml. of this buffer solution, poured over the column and allowed to penetrate it. Elution is then performed with a linear buffer gradient prepared from 50 ml. of 0.05-molar ammonium acetate solution pH 5.2 and 50 ml. of 1.0-molar ammonium acetate solution pH 5.2. The elution is observed by means of an ultraviolet percolation absorption recorder. The main fractions are combined, lyophilized to remove the ammonium acetate and the dry residue is dried at 40° C. under 0.01 mm. Hg pressure.

The free D-Ser$^1$-Orn$^{17}$,Orn$^{18}$-$\beta^{1-24}$-corticotropin displays an extremely strong and prolonged corticotropical activity: it has about 1000 I.U./mg. in the Sayers test; in the test acording to Desaulles and Rittel, Memoirs of the Soc. for Endocrinology No. 17 (Cambridge, at the University Press, 1968), pg. 124 to 137, in which test the secretion of corticosterone from the adrenals of hypophysectomized rats after subcutaneous injection of the adrenocorticotropic peptide is measured, D-Ser$^1$-Orn$^{17,18}$-$\beta^{1-24}$-corticotropin shows an adrenocorticotropic activity about 10 times greater than $\beta^{1-24}$-corticotropin.

EXAMPLE 5

(1) H-Lys(BOC)-Pro-Val-Gly-Lys(BOC)-Lys(BOC)-NH$_2$ 5.0 g. of Z-Lys(BOC)-Pro-Val-Gly-Lys(BOC)-Lys (BOC)-OCH$_3$ (prepared, e.g., according to the aforementioned Belgian Pat. No. 635,618) are dissolved with heating in 30 ml. of methanol, and 400 ml. of 6 N-ammonia in methanol are added to the solution. After 3 days at room temperature the batch is evaporated and the residue recrystallized from aqueous tertiary butanol, to yield 4.8 g. of hexapeptide amide melting at 197 to 198° C. $[\alpha]_D^{22} = -48°\pm1°$ (c.=1.05 in methanol).

2.04 g. of the above hexapeptide derivative are hydrogenated in 60 ml. of methanol in the presence of 200 mg. of 10% palladium carbon. The absorption of hydrogen is complete after 10 hours. Suctioning off the catalyst and evaporation furnishes H-Lys(BOC)-Pro-Val-Gly-Lys (BOC)-Lys(BOC)-NH$_2$ as a colorless resin which in thin-layer chromatography on silica gel is found to be free from unhydrogenated starting material; Rf$_{110}$=0.15.

(2) BOC - D - Ser - Tyr - Ser - Met - Glu(OtBu) - His-Pre - Arg - Try - Gly - Lys(BOC) - Pro - Val - Gly-Lys(BOC) - Lys(BOC) - NH$_2$

A mixture of 150 mg. of BOC-D-Ser-Tyr-Ser-Met-Glu (OtBu)-His-Phen-Arg-Try-Gly-OH (see Example 1), 200 mg. of the above hexapeptide amide, 4 ml. of pyridine and 12 mg. of pyridine hydrochloride is stirred for 2 hours at 24° C. under nitrogen. 120 mg. of dicyclohexyl carbodiimide are then added and the batch is stirred on for 24 hours at 24° C. under nitrogen. After this time, the fine, gelatinous precipitate is removed on the centrifuge, and the supernatant pyridine solution is decanted and evaporated. The residue is triturated with ether and the ether-insoluble powder dried and dreed from the hexapeptide amide by being triturated and washed with dilute acetic acid. Yield: 135 mg. of crude protected hexadecapeptide derivative in the form of a powder that is insoluble in acetic acid. For purification it is suspended with stirring in 10 ml. of aqueous methanol; a trace of by-product (acylurea, formed from the decapeptide and dicyclohexylurea) remains undissolved and is filtered off. The solution in aqueous methanol is evaporated to dryness and the residue taken up in dimethylformamide; a second portion of acylurea remains undissolved and is filtered off. Evaporation of the dimethylformamide solution furnishes the substantially pure protected hexadecapeptide derivative.

Thin-layer chromatogram on silica gel plates:

$Rf_{101} = 0.80$ (3) H-D-Ser-Tyr-Ser-Met-Glu-His-Phe-Arg-Try-Gly-Lys-Pro-Val-Gly-Lys-Lys-NH$_2$ acetate A solution of 20 mg. of the purified hexadecapeptide derivative in 1 ml. of 95% trifluoroacetic acid is kept for one hour at 24° C., then evaporated to dryness, and the residue is dissolved in dilute acetic acid. By elution on a column of a weakly basic ion exchange resin (Merck II) in the acetate form the trifluoroacetate ions are exchanged for acetate ions. The eluate yields on lyophilization 15 mg. of the free hexadecapeptide amide as a colorless powder whose thin-layer chromatogram on alumina plates reveals an Rf value of 0.6 in system 101. In the Sayer test D-Ser$^1$-$\beta^{1,6}$-corticotropin amide displays 20 I.U./mg., whereas the corresponding L-Ser$^1$-$\beta_5$—$^{16}$-corticotropin amide has an activity of about 1 I.U./mg.

EXAMPLE 6

(1) BOC - D-Ser-Tyr-Ser-Met-Glu(OtBu)-His-Phe-Arg-Try - Gly - Lys(BOC) - Pro-Val-Gly-Lys(BOC)-Lys(BOC)-Arg - Arg - Pro-Val-Lys(BOC)-Val-Tyr-Pro-Asp(OtBu) - Gly - Ala - Glu(OtBu)-Asp(OtBu)-Glu(NH$_2$) - Leu - Ala-Glu(OtBu)-Ala-Phe-Pro-Leu-Glu(OtBu)-Phe-OtBu 102 mg. of BOC-D-Ser-Tyr-Ser-Met-Glu(OtBu)-His-Phe-Arg-Try-Gly-OH (see Example 1) are dissolved in 1.2 ml. of 90% pyridine at 50° C. and mixed successively with 0.035 ml. of N-hydrochloric acid and a solution of 150 mg. of H-Lys-(BOC)-Pro-Val-Gly-Lys(BOC)-Lys (BOC) - Arg-Arg-Pro-Val-Lys(BOC)-Val-Tyr-Pro-Asp-(OtBu) - Gly - Ala-Glu(OtBu)-Asp(OtBu)-Glu(NH$_2$)-Leu - Ala - Glu(OtBu)-Ala-Phe-Pro-Leu-Glu(OtBu)-Phe-OtBu. 1½ H$_2$SO$_4$ [R. Schwyer and P. Sieber, Nature 199, page 172 (1963) in 1.2 ml. of 90% pyridine. While stirring at 50° C., an addition each of 0.15 ml. of a 10% solution of dicyclohexylcarbodiimide in pyridine is made after 30 minutes, 1½ hours and 6 hours, the whole is stirred for 25 hours and then precipitated with 100 ml. of peroxide-free ether. The resulting crude product is subjected to a 140-stage Craig distribution in a 8:8:17:7-mixture of chloroform+carbon tetrachloride+methanol and 0.1-molar ammonium acetate (pH 6.5). The fractions 50 to 80 contain according to the thin-layer chromatogram the protected D-Ser$^1$-$\beta$-corticotropin; they are combined and evaporated to dryness. Another 280-stage distribution in the identical solvent system furnishes on evaporation of fractions 125 to 154 ($\lambda_{max}$=140; K=1.0) 38 mg. of pure product which reveals in the thin-layer chromatogram on alumina the $Rf_{100}$ of 0.5.

(2) H - D - Ser - Tyr-Ser-Met-Glu-His-Phe-Arg-Try-Gly-Lys - Pro - Val-Gly-Lys-Arg-Arg-Pro-Val-Lys-Val-Tyr-Pro - Asp - Gly-Ala-Glu-Asp-Glu(NH$_2$)-Leu-Ala-Glu-Ala - Phe - Pro-Leu-Glu-Phe-OH(D-Ser$^1$-$\beta$-1-39-corticotropin)

30 mg. of the protected D-Ser$^1$-$\beta^{1-39}$-corticotropin derivative are dissolved in 3 ml. of 95% trifluoroacetic acid and kept for one hour at 24° C., then evaporated to dryness and the residue is freed from trifluoroacetic acid ions by elution on a column of a weakly basic ion exchange resin (Merck II) in the acetate form. The eluate is lyophilized and yields the acetate of free D-Ser$^1$-$\beta^{1-39}$-corticotropin as a colorless powder. In the thin-layer chromatography on silica gel and in the paper-electrophoresis the product displays the same behaviour as synthetic $\beta^{1-39}$-corticotropin. $Rf_{101}$=0.4. Paper-electrophoresis (pH 6.3; 5 volts/cm., 24 hours): distance travelled 7 cm.

When D-Ser$^1$-$\beta^{1-39}$-corticotropin is tested according to Barthe et al. (Nature 202, 908–909 [1964] by determining the increase in plasma corticosterone in hypophysectionized rats, it shows, on subcutaneous injection, an activity about 10 times longer than natural $\beta^{1-39}$-corticotropin.

EXAMPLE 7

(1) BOC-Tyr-Gly-OCH$_3$ 10.12 g. of BOC-tyrosine are dissolved in 45 ml. of hot ethyl acetate and the solution after being cooled to 20° C., treated with a solution of 3.84 g. of glycine-methyl ester in 10 ml. of ethyl acetate. 10.4 g. of solid dicyclohexylcarbodiimide are added and the whole stirred for 18 hours at 25° C. The batch is then cooled to 0° C., the precipitated dicyclohexylureas filtered off after 30 minutes, and the crude dipeptide derivative isolated from the filtrate by concentration and precipitation with petroleum ether. The amorphous viscous mass is further purified by another precipitation from a mixture of ethyl acetate and petroleum ether. It can be crystallized from the same mixture of solvents. Melting point, 124–125° C.

The thin-layer chromatogram on silica gel gives the following Rf values:

Rf (43 A): 0.65
Rf (CHCl$_3$-methanol=8:2): 0.68
Rf (101): 0.77

(2) H-Tyr-Gly-OCH$_3$ hydrochloride 2 g. of BOC-Tyr-Gly-OCH$_3$ are dissolved in 20 ml. of absolute ethyl acetate while being heated, and treated with 20 ml. of 4 N-hydrochloric acid in absolute ethyl acetate at 20° C. After a few minutes a precipitate begins to form. After 30 minutes, the reaction mixture is concentrated to about 10 ml. under reduced pressure and precipitation of the dipeptideester hydrochloride completed by the addition of 50 ml. of petroleum ether. The batch is homogenized, the amorphous product filtered off, washed with petroleum ether, and dried under a high vacuum at 30° C. The dipeptide ester hydrochloride is obtained as a hygroscopic powder melting at about 110–115° C. (with decomposition). In the thin layer chromatogram it displays the following Rf values:

Rf (43A): 0.33
Rf (CHCl$_3$-methanol=8:2): 0.36
Rf (101): 0.60

(3) BOC-D-Ser-Tyr-Gly-OCH$_3$

With slight heating, 1.69 g. of H-Tyr-Gly-OCH$_3$ hydrochloride are dissolved in 10 ml. of absolute dimethyl formamide, then cooled to 0° C. There are added successively 0.84 ml. of triethylamine, 1.23 g. of BOC-D-Ser-OH, and 1.65 g. of dicyclohexylcarbodiimide, and the mixture stirred for 20 hours at 25° C., and finally for 1 hour at 0° C. The mixture of triethylammonium chloride and dicyclohexylurea which has precipitated is filtered off, and the filtrate concentrated to obtain any oily residue. Addition of 30 ml. of ethyl acetate and 100 ml. of petroleum ether precipitates the crude product as a greasy substance. For preliminary purification the latter is dissolved with heating in a small amount of ethyl acetate, and precipitated by the addition of much petroleum ether (1.8 g.). The product, which according to the thin-layer chromatogram is still impure, is for purification subjected to multiplicative distribution according to Craig in the solvent system ethyl acetate:benzene:0.05 molar aqueous ammonium acetate solution (2:1:2), the phase volumes being about 10 ml. each. After 250 stages, the chromatographically pure tripeptide derivative is isolated from stages 45–74 ($r_{max}$=60; K=0.32) by evaporating the solvent and sublimating off the ammonium acetate at 45° C. under a high vacuum. Crystals from aqueous methanol, melting point 180–182° C. The thin-layer chromatogram on silica gel reveals the following Rf values:

Rf (52): 0.76
Rf (101): 0.78
Rf (CHCl$_3$-methanol-8:2): 0.58

(4) BOC-D-Ser-Tyr-Gly-OH 685 mg. of BOC-D-Ser-Tyr-Gly-OCH$_3$ are dissolved in 5 ml. of N-sodium hydroxide solution, the solution allowed to stand at 20° C. for 10 minutes, then neutralized by the addition of 5 ml. of N-hydrochloric acid. The protected tripeptide is extracted with 50 ml. of N-butanol saturated with water, the butanol layer washed 4 times with 4 ml. of water each time and concentrated to about 3 ml. Addition of 30 ml. of petroleum ether yields a greasy precipitate which can be crystallized from ethyl acetate (melting point 168° C. (with decomposition)). The substance is unitary according to the thin layer chromatogram. On silica gel it displays the following Rf values:

Rf (101: 0.61
Rf (101): 0.61.

(5) BOC-D-Ser-Tyr-Gly-Met-OCH$_3$ 425 mg. of BOC-D-Ser-Tyr-Gly-OH and 240 mg. of H-Met-OCH$_3$ hydrochloride are dissolved in 3 ml. of absolute dimethyl formamide, after which 0.168 ml. of triethylamine is added and a solution of 288 mg. of dicyclohexyl carbodiimide (in 5 ml. of absolute ethyl acetate) added dropwise while stirring. Stirring is continued for 15 hours at 20° C. and, after another hour at 0° C., the precipitated dicyclohexylurea is filtered off. From the filtrate the crude, greasy condensation product is precipitated by adding 50 ml. of petroleum ether, and dried. It is purified by Craig distribution in the system methanol:buffer:chloroform:carbon tetrachloride (5:3:5:2) (buffer=28.5 ml. of glacial acetic acid+19.25 g. of ammonium acetate in 960 ml. of water) over 400 stages the phase volumes being about 3 ml. each. The chromatographically pure tetrapeptide derivative is isolated as a white amorphous powder from stages 103–134 ($r_{max}$=120; K=0.43) by concentration to dryness and sublimating off the ammonium acetate under a high vacuum at 45° C. In the thin layer chromatogram on silica gel it displays the following Rf values:

Rf (benzene+acetone 1:1): 0.21
Rf (chloroform+methanol 85:15): 0.62
Rf (100): 0.84

(6) BOC-D-Ser-Tyr-Gly-Met-NH-NH$_2$ 160 mg. of BOC-D-Ser-Tyr-Gly-Met-OCH$_3$ are dissolved in 1 ml. of methanol, treated with 0.1 ml. of hydrazine hydrate, and allowed to stand at 20° C. overnight. The reaction mixture which has solidified to form a crystal cake is diluted with 8 ml. of benzene and homogenized, filtered, and the filter residue washed with benzene+methanol (10:1). Drying in a high vacuum at 50° C. yields pure tetrapeptide hydrazide melting at 190° C. (with decomposition). In the thin-layer chromatogram on silica gel it displays the following Rf values:

Rf (CHCl$_3$-methanol 85:15): 0.21
Rf (100): 0.65

(7) Z - Glu(OtBu)-His-Phe-Arg-Try-Gly-Lys(BOC)-Pro-Val - Gly-Lys(BOC)-Lys(BOC)-Arg-Arg-Pro-Val-Lys(BOC)-Val-Tyr-Pro-OtBu-triacetate 625 mg. (0.273 mmol) of H-Lys(BOC)-Pro-Val-Gly-Lys-(BOC)-Lys(BOC)-Arg-Arg - Pro - Val-Lys(BOC)-Val-Tyr-Pro-OtBu 3CH$_3$COOH, prepared as described in Belgian Pat. No. 617,177 of Heini Kappeler et al. allowed Nov. 5, 1962 in 10 ml. of dry pyridine are mixed with 0.17 g. of para-toluene sulfonic acid. The solution is evaporated to dryness, the residue freed from pyridine acetate under a pressure of 0.01 mm. of Hg at 35° C., and the pyridine tosylate eliminated by trituration with acetone and filtering with suction. There are obtained 726 mg. of protected tetradecapeptide tritosylate as a colorless powder of melting point 155–162° C.

525 mg. (0.2 mmol) of the tritosylate and 245 mg. (0.24 mmol) of Z-Glu(OtBu)-His-Phe-Arg-Try-Gly-OH (obtained by condensation of Z-Arg-OH with H-Try-Gly-OCH$_3$, splitting off the carbobenzoxy group from the tripeptide derivative, condensation of the free tripeptide ester with Z-Phe-OH, splitting off the carbobenzoxy group from the tetrapeptide ester, condensation of the free tetrapeptide ester with Z-Glu(OtBu)-His-N$_3$ and saponification of the methyl ester group with N-sodium hydroxide solution in 75% dioxan) are dissolved in 4 ml. of 80% pyridine with stirring at 50° C. To the clear solution are added 52 mg. (0.25 mmol) of dicyclohexyl carbodiimide. After being allowed to stand for 20 hours at 50° C., the slightly turbid solution is cooled to 10° C., and the precipitated dicyclohexylurea filtered off. The solution is treated with much ether whereupon the tritosylate of the eicosapeptide precipitates. It is separated, dissolved in 10 ml. of 60% methanol, and chromatographed through a column of 4 ml. of Amberlite IRA–400 (acetate form). The eluate is evaporated under reduced pressure and triturated with ether. There are obtained 650 mg. of crude, protected eicosapeptide triacetate. In the thin-layer chromatogram it displays the following Rf values:

On alumina, Rf (100): 0.34
On silica gel, Rf (101): 0.76; Rf (110): 0.45

Development with Reindel-Hoppe, Pauly, and Ehrlich reagents. There are also found unchanged hexapeptide and tetrapeptide derivatives and some faster running by-products.

(8) H-Glu(OtBu)-His-Phe-Arg-Try-Gly-Lys(BOC)-Pro-Val-Gly-Lys(BOC)-Lys(BOC)-Arg-Arg-Pro-Val-Lys(BOC)-Val-Tyr-Pro-OtBu-tetraacetate 600 mg. of the crude eicosapeptide derivative are dissolved in 10 ml. of methanol and hydrogenated overnight in the presence of 0.5 ml. of glacial acetic acid and 1 g. of palladium carbon (10%). The catalyst is then filtered off, and the filtrate evaporated under reduced pressure. The resulting decarbobenzoxylated product is dissolved in 10 ml. of tertiary butanol+water (1:1) and chromatographed through a column of 6 g. of carboxymethyl cellulose using a gradient between 100 ml. of 50% tertiary butanol and 100 ml. of 50% tertiary butanol +glacial acetic acid (9:1). The fractions which contain a thin-layer chromatographically unitary eicosapeptide derivative are combined and evaporated under reduced pressure. The Rf values of the protected eicosapeptide ester-tetraacetate on silica gel are: Rf (54=0.50; Rf (101)=0.68; Rf (110)=0.12.

When all the protective groups have been split off with 90% trifluoroacetic acid, the free eicosapeptide displays the following Rf values:

Rf (101 on silicagel: 0.25
Rf (101) on alumina: 0.30

(9) BOC-D-Ser-Tyr-Gly-Met-Gly(OtBu)-His-Phe - Arg-Try-Gly-Lys(BOC)-Pro - Val - Gly-Lys(BOC)-Lys-(BOC)-Arg-Arg-Pro - Val - Lys(BOC)-Val-Tyr-Pro-OtBu 102 mg. of BOC-D-Ser-Tyr-Gly-Met-NHNH$_2$ are dissolved in 0.7 ml. of absolute dimethyl formamide and cooled to 0° C. There is then added 0.165 ml. of 4.12 N-hydrochloric acid and the batch immediately cooled to −10° C. After the addition of 0.036 ml. of 5 N-sodium nitrate solution, the batch is allowed to react for 10 minutes at −10° C., after which a solution, cooled to 0° C., of 298 mg of H-Glu(OtBu)-His-Phe-Arg-Try-Gly-Lys-(BOC)-Pro-Val - Gly - Lys(BOC)-Lys(BOC)-Arg-Arg-Pro-Val-Lys(BOC)-Val-Tyr-Pro-OtBu - tetraacetate and 0.12 ml. of triethylamine in 1 ml. of absolute dimethyl formamide is added. The solution is allowed to stand for 24 hours at 0° C., concentrated to obtain an oily residue, and treated with 10 ml. of water. The condensation product which precipitates is filtered off and dried in a high vacuum at 40° C. For purification, the product is subjected to multiplicative distribution in the solvent system methanol+buffer+chloroform+carbon tetrachloride (32:16:21:9) (buffer=28.5 ml. of glacial acetic acid+ 19.25 mg. of ammonium acetate in 960 ml. of water) over 350 stages, the phase volumes being 3 ml. each. From tubes 85–116 ($r_{max}$=100; K=0.4) there is obtained on evaporation to dryness and drying of the residue at 40° C. in a high vacuum the chromatographically pure, protected tetracosapeptide acetate as a white, amorphous powder. In the thin-layer chromatogram it displays the following R$f$ values:

On silicagel—R$f$ (43C): 0.27
—R$f$ (52): 0.18
On alumina—R$f$ (100): 0.38.

(10) H-D-Ser-Tyr-Gly-Met-Glu-His-Phe-Arg-Try - Gly-Lys-Pro-Val-Gly - Lys - Lys-Arg-Arg-Pro-Val-Lys-Val-Tyr-Pro-OH 163 mg. of protected tetracosapeptide acetate are dissolved in 3.2 ml. of 90% trifluoroacetic acid and the solution allowed to stand at 20° C. for 25 minutes. The solution is then diluted with about 15 ml. of water, concentrated to about 2 ml., and lyophilized. For conversion into the acetate, the trifluoracetate of the free tetracosapeptide is dissolved in a small amount of water and filtered through a column ($\phi$7.5 mm.; $l$=16 cm.) of a slightly basic ion exchanger (for example Merck No. II) in the acetate form. The eluate is concentrated to a small volume (about 2 ml.), lyophilized, and dried for 30 minutes at 40° C. in a high vacuum. There is obtained chromatographically and electrophoretically pure D-Ser$^1$-Gly$^3$-$\beta^{1-24}$-corticotropine acetate as a white, amorphous powder.

In the thin-layer chromatogram on alumina in system 101, its R$f$ value is 0.56 ($\beta^{1-24}$-corticotropine under identical conditions: R$f$=0.51) and in electrophoresis (16 volts/cm.) at pH 6.1 (pyridine acetate buffer) it travels in the course of 2 hours 8.6 cm. towards the cathode. The activity of D-Ser$^1$-Gly$^3$-$\beta^{1-24}$-corticotropin in the Sayers test is 750 I.U./mg.

EXAMPLE 8

(1) Z. Lys(BOC)-Lys(BOC)NHNH$_2$

A solution of 10 g. of Z. Lys(BOC)-Lys(BOC)-OCH$_3$ [prepared from Z. Lys(BOC)-OH+H. Lys(BOC)-OCH$_3$ by means of dicyclohexyl carbodiimide] in 160 ml. of methanol is mixed with 7.8 ml. of hydrazine hydrate. The clear solution is kept for 24 hours at 25° C. and then concentrated to about one third its original volume. On the addition of 200 ml. of water an oily precipitate is obtained which on cooling and trituration solidifies and can be powdered. It is suctioned off, washed with water and the crude product is dried. It is purified by one recrystallization from methane+ethyl acetate+petroleum ether and then melts at 118 to 119.5° C. On silica gel thin-layer plates it reveals the following R$f$ values:

R$f$(43A):=0.40
R$f$ (chloroform+methanol=9:1)=0.75

(2) Z. Lys(BOC)-Lys(BOC)-Pro-OH

A solution of 1.87 g. of

Z. Lys(BOC)-Lys(BOC).NHNH$_2$ in 15 ml. of freshly distilled dimethylformamide is cooled to −25° C.; 2.07 ml. of 4.35 N-hydrochloric acid and then 0.66 ml. of 5 N-sodium nitrite solution are then slowly dropped in. The batch is stirred for 10 minutes at −10° C. and a solution of 692 mg. of L-proline in 4.2 ml. of dimethylformamide+water (2:1) is added. Finally, 1.82 ml. of triethylamine are dropped in at −10° C. and the reaction solution is kept overnight at 0° C. and then for another 2 hours at room temperature, then concentrated in a high vacuum to a volume of about 4 ml., and the tacky residue is mixed with 25 ml. of water. It can be powdered after cooling to 0° C. and trituration. It is suctioned off, washed with a small amout of water and dried at 40° C. in a high vacuum. For purification the non-crystallizing crude product is subjected to a multiplicative distribution according to Craig in the solvent system methanol+buffer+chloroform+carbon tetrachloride (35:13:15:15) [buffer: 28.5 ml. of glacial acetic acid+ 19.25 g. of ammonium acetate in 960 ml. of water] with phase volumes of 10 ml. each. After 220 steps the fractions 49 to 73 ($r_{max}$=61; K=0.39) yield on evaporation to dryness and on removing the ammonium acetate by sublimation chromatographically pure, but amorphous tripeptide derivative melting at about 70 to 80° C. The thin-layer chromatogram on silica gel reveals the following R$f$ values:

R$f$ (chloroform+methanol=9:1)=0.19
R$f$ (43A)=0.29
R$f$ (45)=0.52

(3) Z. Lys(BOC)-Lys(BOC)-Pro-Val-Lys(BOC)-Val-Tyr-Pro.OtBu 2.4 grams of Z. Lys(BOC)-Lys(BOC)-Pro.OH and 3.12 g. of H.Val-Lys(BOC)-Val-Tyr-Pro-OtBu are dissolved in 30 ml. of absolute chloroform. At 0° C. 0.845 g. of dicyclohexyl carbodiimide is added; the batch is stirred for 1 hour at 0° C. and then kept for 30 hours at 25° C. The precipitated crystalline dicyclohexylurea is filtered off and washed with a small quantity of ethyl acetate. The filtrate is mixed with 150 ml. of ethyl acetate and the organic phase is extracted at 0° C. with 3×30 ml. of tartaric acid solution of 3% strength to remove the excess pentapeptide. The batch is washed several times more with water until it gives a neutral reaction and then evaporated to dryness. To remove lipophilic impurities the residue is dissolved in 10 ml. of methanol and 20 ml. of ethyl acetate and the octapeptide is precipitated, by adding 120 ml. of petroleum ether, in the form of a smeary mass which is dried at 40° C. under vacuum. The purification of the resulting crude product (3.1 g.) is finalized by a Craig distribution in the system methanol+buffer+ chloroform+carbon tetrachloride (30:10:3:30) [buffer: as under 2 above] over 225 steps with phase volumes of 10 ml. each. The chmatographically unitary octapeptide derivative is obtained by concentration of fractions 65 to 96 ($r_{max}$=78; K=0.53) to dryness and removing the ammonium acetate by sublimation in a high vacuum as a white, amorphous powder melting at about 130 to 140° C. On silica gel it reveals the following R$f$ values:

R$f$ (chloroform+methanol=9:1)=0.54
R$f$ (43A)=0.74
R$f$ (benzene+acetone=1:1)=0.33

(4) H.Lys(BOC)-Lys(BOC)-Pro-Val-Lys(BOC)-Val-Tyr-Pro-OtBu 1.46 grams of Z. Lys(BOC)-Lys(BOC)-Pro-Val-Lys(BOC)-Val-Tyr-Pro-OtBu in 40 ml. of methanol are hydrogenated in the presence of 300 mg. of palladium carbon of 10% strength in a duck-shaped hydrogenation vessel adapted for agitation, while absorbing the liberated carbon dioxide. After only 20 minutes the absorption of hydrogen ceases. One hour later the catalyst is filtered off, rinsed with methanol, and the filtrate is evaporated to dryness, to give a quantitative yield of chromatographically unitary decarbobenzoxylated octapeptide derivative in the form of a white, amorphous powder melting at about 110 to 120° C. Its thin-layer chromatogram on silica gel reveals the following $R_f$ values:

$R_f$ (chloroform+methanol=9:1)=0.34
$R_f$ (43A)=0.53

(5) Z. Lys(BOC)-Pro-Val-Gly-Lys(BOC)-Lys(BOC)-Lys(BOC) - Lys(BOC)-Pro-Val-Lys(BOC)-Val-Tyr-Pro-OtBu

A solution of 1.98 g. of Z-Lys(BOC)-Pro-Val-Gly-Lys(BOC)-Lys(BOC).NHNH$_2$ (see British Pat. No. 1,038,677) in 22 ml. of absolute dimethylformamide is cooled to −25° C. and 3.4 ml. of 2.115 N-hydrochloric acid and then 0.378 ml. of 5 N-sodium nitrite solution are stirred in dropwise. The clear solution is stirred for a further 15 minutes at −10° C. and a solution, precooled to −5° C., of 1.313 g. of the above-described octapeptide derivative in 4 ml. of dimethylformamide is added. Rinsing with 1 ml. of dimethyl-formamide is performed, whereupon at −5° C. 1.05 ml. of triethylamine are slowly dropped in. The reaction mixture is stirred on for 30 minutes and then left to itself for 15 hours at 0° C. and finally concentrated until a viscous oil has formed from which 20 ml. of water precipitates a smeary mass which is dissolved again with heating in 20 ml. of methanol, and the peptide is reprecipitated with 30 ml. of water. On cooling to 0° C. and trituration a pulverulent suspension is obtained which is filtered, washed with water and dried. This crude product is purified by a Craig distribution in the system methanol+buffer+chloroform+carbon tetrachloride (60:20:3:60) [buffer as under 2 above] with phase volumes of 20 ml. each. After 218 steps fractions 105 to 134 ($r_{max.}$=121; K=1.25) yield on evaporation to dryness and on removing the ammonium acetate by sublimation in a high vacuum chromatographically unitary, protected tetradecapeptide as a white, amorphous powder melting at about 180 to 190° C. On silica gel it reveals the following $R_f$ values:

$R_f$ (chloroform+methanol=9:1)=0.49
$R_f$ (43A)=0.80

(6) H - Lys(BOC)-Pro-Val-Gly-Lys(BOC)-Lys(BOC)-Lys(BOC) - Lys(BOC)-Pro-Val-Lys(BOC)-Val-Tyr-Pro-OtBu 1.66 grams of Z. Lys(BOC)-Pro-Val-Gly-Lys(BOC)-Lys(BOC)-Lys(BOC)-Pro - Val - Lys(BOC)-Val-Tyr-Pro-OtBu in 40 ml. of methanol are hydrogenated in the usual manner in the presence of 300 mg. of palladium carbon of 10% strength. On concentration of the filtrated hydrogenation solution to dryness there is directly obtained the chromatographically unitary product (1.49 g.) as an amorphous powder which melts unsharply at about 175 to 190° C. On silica gel it reveals the following $R_f$ values:

$R_f$ (chloroform+methanol=9:1)=0.24
$R_f$ (43A)=0.41

(7) BOC.D-Ser-Tyr-Ser - Met - Glu(OtBu)-His-Phe-Arg-Try-Gly-Lys(BOC) - Pro - Val - Gly - Lys(BOC)-Lys(BOC)-Lys(BOC)-Lys(BOC)-Pro - Val - Lys(BOC)-Val-Tyr-Pro-OtBu

A suspension of 378 mg. of BOC-D-Ser-Tyr-Ser-Met-Glu(OtBu)-His-Phe-Arg-Try-Gly-OH (see Example 1) and 451 mg. of H-Lys(BOC)-Pro-Val-Gly-Lys(BOC)-Lys(BOC)-Lys(BOC) - Pro - Val - Lys(BOC)-Val-Tyr-Pro.OtBu in 4 ml. of absolute pyridine is mixed with 0.15 ml. of water and 0.32 ml. of N-hydrochloric acid and then stirred for 10 minutes at 50° C. 145 mg. of dicyclohexyl carbodiimide are then added to the turbid suspension and this addition is repeated once more after 3 hours. The batch is stirred on for 3 hours at 50° C. and then kept overnight at 0° C. The precipitated dicyclohexylurea is filtered off and rinsed with 3× 0.8 ml. of pyridine of 90% strength. The filtrate is mixed with 45 ml. of benzene, whereupon a pulverulent crude product settles out which is filtered off and dried at 45° C. The bulk of the lipophilic impurities is removed by reprecipitation from methanol+benzene+petroleum ether, whereupon the final purification is carried out by Craig distribution in the solvent methanol+buffer+chloroform+carbon tetrachloride (10:3.17:5:4) [buffer: as under 2 above] over 300 steps with phase volumes of 10 ml. each. The fractions 51 to 85 ($r_{max.}$=67; K=0.29) yield on evaporation to dryness and removal of the ammonium acetate by sublimation in a high vacuum at 40° C. 445 mg. of chromatographically pure, protected tetracosapeptide acetate as an amorphous powder melting at about 205 to 210° C. with decomposition. On silica gel it reveals the following $R_f$ values:

$R_f$ (chloroform+methanol=75:25)=0.42
$R_f$ (43A)=0.63
$R_f$ (100)=0.60

(8) H-D-Ser-Tyr-Ser-Met-Glu-His-Phe-Arg-Try-Gly-Lys-Pro-OH (D-Ser$^1$-Lys$^{17,18}$-$\beta^{1-24}$-corticotropin)
Pro-OH (D-Ser$^1$-Lys$^{17,18}$-$\beta^{1-24}$-corticotropin)

A solution of 370 mg. of protected tetracosapeptide derivative in 7.4 ml. of trifluoroacetic acid of 90% strength is kept for 45 minutes at 25° C., then concentrated to about 2 ml., diluted with 20 ml. of water, once more concentrated and finally lyophilized, to yield the trifluoroacetate of the free tetracosapeptide which for conversion into the acetate is dissolved in a small quantity of water and then filtered through a column (of 12.5 mm. diameter and 15 cm. height) of a weakly basic ion exchange resin (for example Merck No. II) in the acetate form. The eluate is concentrated to about 3 ml., lyophilized and further dried in a high vacuum at 40° C., to yield 316 mg. of chromatographically and electrophoretically unitary acetate of D-Ser$^1$-Lys$^{17,18}$-$\beta^{1-24}$-corticotropin as a white, amorphous powder. In the test according to Schuler et al. (Schweiz. Mediz. Wochenschrift 93, 1027–1030 [1963]) in which the minimum intravenous dosis which induces a significant increase of the output of corticosterone into the cannulated adrenal vein of hypophysectomized rats is measured, that threshold dosis is 0.003γ/kg. In the same test, on subcutaneous administration, the compound is 10 times more active than $\beta^{1-24}$-corticotrophin.

The thin-layer chromatogram on alumina of the compound in the system 101 displays an $R_f$ value of 0.40 ($\beta^{1-24}$-corticotropin under identical conditions: $R_f$=0.51). In the electrophoresis (16 volt/cm.) it travels at pH 6.1 (pyridine acetate buffer) within 2 hours 8.4 cm. towards the cathode.

EXAMPLE 9

(1) Z-Lys-(BOC)-Lys(BOC)-NH$_2$

A solution of 5 g. of Z-Lys(BOC)-Lys(BOC)-OCH$_3$ in 100 ml. of absolute methanol is saturated at room temperature with ammonia gas and kept for 30 hours in a stoppered flask, then concentrated to about 25 ml. and for crystallization kept overnight in an ice box. The crystalline product is filtered off, washed with a small amount of cold methanol and dried under vacuum, to yield 3.95 g. of Z-Lys(BOC)-Lys(BOC)-NH$_2$ melting at 165° C. In the thin-layer chromatogram on silica gel the compound reveals the following Rƒ values:

Rƒ (chloroform+methanol=95:5)=0.11
Rƒ (chloroform+methanol=8:2)=0.75
Rƒ (43A)=0.76

The Z-Lys(BOC)-Lys(BOC)-OCH₃ melting at 78–84° C., used as starting material can be prepared from Z-Lys(BOC)-OH and H-Lys(BOC)-OCH₃ (see Belgian specification No. 594,338) by condensation with dicyclohexyl carbodiimide.

(2) H-Lys(BOC)-Lys(BOC)-NH₂

3 grams of Z-Lys(BOC)-Lys(BOC)-NH₂ are dissolved with slight heating in 100 ml. of methanol and hydrogenated at room temperature with 500 mg. of palladium carbon of 10% strength in a duck-shaped vessel, adapted for agitation, while absorbing the carbon dioxide formed. The absorption of hydrogen ceases after about 1 hour. One hour later the catalyst is filtered off and the filtrate evaporated to dryness. The crude product, which is obtained in a quantitative yield, is recrystallized from ethyl acetate-+petroleum ether and then melts to 110–112° C. On silica gel the following Rƒ values are obtained:

Rƒ (chloroform+methanol=8:2)=0.32
Rƒ (43A)=0.35
Rƒ (52)=0.65

(3) Z-Lys(BOC)-Pro-Val-Gly-Lys(BOC)-Lys(BOC)-Lys(BOC)-Lys(BOC)-NH₂

A solution of 5.13 g. of Z-Lys(BOC)-Pro-Val-Gly-Lys(BOC)-Lys(BOC)-NHNH₂ in 60 ml. of absolute dimethylformamide is cooled to −25° C. At this temperature 8.8 ml. of 2.115 N-hydrochloric acid are stirred in dropwise and finally also 0.973 ml. of 5 N-sodium nitrite solution. The reaction solution is stirred for 15 minutes at −10° C., whereupon a solution of 2.0 g. of H-Lys(BOC)-Lys(BOC)-NH₂ in 10 ml. of dimethylformamide, previously cooled to −10° C. is added, and then also 2.6 ml. of triethylamine are dropped in. The batch is stirred for 30 minutes at 0° C. and then kept for about 20 hours at 0° C. To isolate the crude product the batch is concentrated to about 30 ml. precipitated with 150 ml. of water, and the floccular, gelatinous precipitate is filtered off. After two recrystallizations from methanol+water (2:1) the protected octapeptide is obtained in a finely crystalline, chromatographically pure form and melts at 220 to 221° C. with decomposition. On silica gel it reveals the following Rƒ values:

Rƒ (chloroform+methanol=9:1)=0.47
Rƒ (43A)=0.75

(4) H-Lys(BOC)-Pro-Val-Gly-Lys(BOC)-Lys(BOC)-Lys(BOC)-Lys(BOC)-NH₂

A solution of 1.0 g. of the carbobenzoxy compound described above in 250 ml. of methanol is hydrogenated with 200 mg. of palladium carbon of 10% strength in a duck-shaped vessel adapted for agitation at room temperature, while absorbing the liberated carbon dioxide. After 6 hours the catalyst is filtered off, the filtrate evaporated to dryness and the residue reprecipitated twice more from aqueous methanol, to yield 738 mg. of chromatographically unitary octapeptide derivative which reveals the following Rƒ values on silica gel:

Rƒ (chloroform+methanol=9:1)=0.14
Rƒ (52)=0.63
Rƒ (43A)=0.28

(5) BOC-D-Ser-Tyr-Ser-Met-Glu(OtBu)-His - Phe - Arg-Try-Gly-Lys(BOC)-Pro-Val - Gly - Lys(BOC) - Lys (BOC)-Lys(BOC)-Lys(BOC)-NH₂

A suspension of 988 mg. of BOC-D-Ser-Tyr-Ser-Met-Glu(OtBu)-His-Phe-Arg-Try-Gly-OH and 736 mg. of H-Lys(BOC)-Pro-Val-Gly - Lys(BOC) - Lys(BOC) - Lys(BOC)-Lys(BOC)-NH₂ in 20 ml. of pyridine is mixed with 0.3 ml. of water and 0.835 ml. of N-hydrochloric acid and then stirred for 15 minutes at 50° C. Then 378 mg. of dicyclohexyl carbodiimide are added, the mixture is stirred for 3 hours at 50° C., another identical quantity of dicyclohexyl carbodiimide is added, the batch is stirred for another 3 hours at 50° C. and then evaporated until a semi-solid residue has formed. The peptides are dissolved by heating with 20 ml. of dimethylformamide and the insoluble dicyclohexylurea is filtered off. The filtrate is concentrated until a thickly liquid residue has formed and from it by addition of 50 ml. of water a smeary crude product is precipitated which is separated from the mother liquor and dried. Two reprecipitations from dimethylformamide+methanol+ethyl acetate furnish 1.29 g. of a crude product which for final purification is subjected to a Craig distribution in the solvent system methanol+buffer chloroform+carbon tetrachloride (10:3:7:4) [buffer: 28.5 ml. of glacial acetic acid+19.25 g. of ammonium acetate in 960 ml. of water] with phase volumes of 10 ml. of each. (At the outset the substance is equally distributed over the first 5 vessels.) After 171 steps there is isolated from the fractions 50 to 74 ($l_{max.}$=62; K=0.57) by evaporation to dryness and removing the ammonium acetate by sublimation at 40° C. in a high vacuum the thin-layer-chromatographically unitary, protected octadecapeptide-amide as a pure, amorphous powder melting to about 210 to 225° with decomposition; on silica gel it reveals the following Rƒ values:

Rƒ (chloroform+methanol=75:25)=0.51
Rƒ (43C)=0.62
Rƒ (52)=0.43

(6) H-D-Ser-Tyr-Ser-Met - Glu - His-Phe-Arg-Try-Gly-Lys-Pro-Val-Gly - Lys - Lys - Lys-Lys-NH₂ (D-Ser¹-Lys¹⁷,¹⁸-β¹⁻¹⁸-Corticotropin-Lys¹⁸-amid)²

A solution of 400 mg. of the protected octadecapeptide-amide in 8 ml. of trifluoroacetic acid of 90% strength is kept for 30 minutes at 25° C., then concentrated to a volume of about 3 ml., 20 ml. of water are added, the whole is once more concentrated and lyophilized. The trifluoroacetate of the octadecapeptideamide obtained in this manner is converted into the acetate by being dissolved in a small quantity of water and slowly filtered through a column (of 11 mm. diameter and 16 cm. height) of a weakly basic ion exchange resin (for example Merck No. II) in the acetate form. The eluate is concentrated to a small volume, lyophilized and further dried at 40° C. in a high vacuum, to yield 301 mg. of chromatographically and electrophoretically unitary acetate of D-Ser¹-Lys¹⁷,¹⁸-β¹⁻¹⁸-corticotropin-Lys¹⁸-amide as an amorphous, white powder. In the thin-layer chromatogram on alumina the following Rƒ values are found:

Rƒ (52A)=0.13
Rƒ (101)=0.32

In the paper-electrophoresis (16 volts/cm.) at pH 6.1 (pyridine acetate buffer) the compound travels within 2 hours 11.5 cm. towards the cathode. In the test according to Schuler et al. mentioned in Example 8, on subcutaneous administration, the octadecapeptide amide is more than 10 times as active as β¹⁻²⁴-corticotropin.

EXAMPLE 10

(1) BOC-D-Ser-Tyr-Met-Glu(OtBu)-His-Phe-Arg-Try-Gly-OH 5.7 g. (10 millimols) of BOC-D-Ser-Tyr-Gly-Met-NH-NH₂ are suspended in 50 ml. of dimethylformamide and treated with 12.5 ml. of a 2 N solution of hydrogen chloride in ethyl acetate at −15° C. with stirring, and then with 1.13 g. (11 millimols) of tertiary butyl nitrite. The reaction mixture is stirred for 10 minutes at −15° C., and 3.5 ml. (25 millimols) of triethylamine are then added to the solution of the BOC-tetrapeptidazide. The resulting solution is added dropwise to a solution, cooled to −10° C., of 7.1 g. (8 millimols) of H-Glu(OtBu)-His-Phe- Arg-Try-Gly-OH in 150 ml. of dimethylformamide and 7.5 ml. of water, the reaction is stirred for 15 hours at 0° C. and then treated with 500 ml. of water. The precipitated amorphous product is filtered with suction and washed with a mixture of dimethylformamide and water (1:5) and acetonitrile. After purification by reprecipitation from aqueous acetonitrile and equilibration with atmospheric moisture 8.62 g. (73%) of pure BOC-decapeptide tetrahydrate melting at 230–240° C. are obtained. Optical rotation: $[\alpha]_D^{20} = -15° \pm 2°$ (C=0.5 in pyridine +water 1:1). The substance is unitary according to the thin-layer chromatogram on silica gel; Rf 52=0.3; Rf 101=0.6.

(2) BOC - D-Ser-Tyr-Gly-Met-Glu(OtBu)-His-Phe-Arg-Try-Gly-Lys(BOC) - Pro - Val - Gly-Lys(BOC)-Lys-(BOC)-Lys(BOC)-Lys(BOC) - Pro - Val-Lys(BOC)-Val-Try-Pro-OtBu 326 mg. of BOC-D-Ser-Tyr-Gly-Met-Glu(OtBu)-His-Phe-Arg-Try-Gly-OH and 350 mg. of H-Lys(BOC)-Pro-Val-Gly-Lys(BOC)-Lys(BOC) - Lys(BOC) - Lys(BOC)-Pro-Val-Lys(BOC)-Val-Tyr-Pro-OtBu are suspended in a mixture of 3.2 ml. of pyridine, 0.1 ml. of water and 0.25 ml. of N-hydrochloric acid, 112 ml. of dicyclohexylcarbodiimide are added, the partially insoluble mixture is stirred for 3½ hours at 50° C., the same quantity of dicyclohexylcarbodiimide is again added and the whole stirred for 4 hours at 50° C. The reaction mixture is concentrated to a volume of about 2 ml. and the peptide precipitated by the addition of 40 ml. of water. The gelatinous, flocky precipitate is filtered off and dried and then dissolved in hot methanol and precipitated with a mixture of benzene and petroleum ether to separate off dicyclohexylurea and other lipophilic contaminants. For final purification the resulting crude product is subjected to a Craig distribution over 290 stages with phase volumes of 10 ml. each in the solvent system methanol+buffer+chloroform+carbon tetrachloride (10:3:5:4) [Buffer=28.5 ml. of glacial acetic acid+19.25 g. of ammonium acetate in 960 ml of water]. From the distribution elements Nos. 74–97 ($r_{max}$=85; K=0.42) there are obtained by concentration to dryness and sublimation of the ammonium acetate at 45° C. in a high vacuum 295 mg. of protected tetracosapeptide acetate in chromatographically unitary form as a white, amorphous powder with an unsharp decomposition point of about 205° C. On silica gel thin-layer plates it shows the following Rf values:

Rf (100)=0.61
Rf (chloroform+methanol 75:25)=0.40

(3) H-D-Ser-Tyr-Gly-Met-Glu-His - Phe - Arg-Try-Gly-Lys-Pro-Val - Gly - Lys-Lys-Lys-Lys-Pro-Val-Lys-Val-Tyr-Pro-OH (D-Ser$^1$-Gly$^3$-Lys$^{17,18}$-$\beta^{1-24}$-corticotropine)

270 mg. of BOC-D-Ser-Tyr-Gly-Met-Glu(OtBu)-His-Phe-Arg-Try-Gly-Lys(BOC)-Pro - Val - Gly-Lys(BOC)-Lys(BOC)-Lys(BOC) - Lys(BOC) - Pro-Val-Lys(BOC)-Val-Tyr-Pro-OtBu are dissolved in 13 ml. of trifluoracetic acid of 90% strength and allowed to stand for 30 minutes at 22° C. The solution is then concentrated to about 2 ml., diluted with 10 ml. of water, again concentrated to a volume of 3–4 ml. of lyophilized. The resulting trifluoracetate of the free tetracosapeptide is dissolved in 5 ml. of water for conversion into the acetate and filtered through a column ($\phi$=15 mm.; l=15 cm.) of weakly alkaline ion exchanger (Merck No. II) in the acetate form. The eluate is concentrated to about 4 ml. with the addition of a few ml. of n-butanol and lyophilized. 230 mg. of chromatographically and electrophoretically unitary acetate of D-Ser$^1$-Gly$^3$-Lys$^{17,18}$-$\beta^{1-24}$-coritcotropine are obtained as an amorphous, readily watersoluble powder. In the thin-layer chromatogram on alumina (DA) and on cellulose (DC) it displays the following Rf values:

DA: Rf (101)=0.42
Rf (52A)=0.25
DC: Rf (112A)=0.48

In paper electrophoresis (pyridine acetate buffer, pH 6.1, 16 volts/cm.) the compound travels in 2 hours 8.6 cm. towards the cathode.

In comparison with $\beta^{1-24}$-corticotropine the compound has a greatly enhanced and prolonged corticotropic effect. In the test according to Schuler et al. mentioned in Example 8, on subcutaneous administration, the compound is more than 10 times as active as $\beta^{1-24}$-corticotropin.

EXAMPLE 11

(1) BOC - D - Ser-Tyr-Gly-Met-Glu(OtBu)-His-Phe-Arg-Try - Gly - Lys(BOC) . Pro - Val - Gly-Lys(BOC)-Lys(BOC)-Lys(BOC)-Lys(BOC).NH$_2$ 2.9 g. of finely powdered BOC-D-Ser-Tyr-Gly-Met-Glu(OtBu)-His-Phe-Arg-Try-Gly-OH (prepared as described in Example 1) and 2.1 g. of H.Lys(BOC)-Pro-Val-Gly-Lys(BOC) - Lys(BOC) - Lys - (BOC)-Lys(BOC).NH$_2$ are suspended in 27 ml. of pyridine, 0.7 ml. of water and 2.38 ml. of N hydrochloric acid and, after the addition of 1.07 g. of dicyclohexylcarbodiimide, stirred at 50° C. The mixture soon becomes solid and after being allowed to stand for 3 hours at 50° C. is treated with a solution of a further 1.07 g. of dicyclohexylcarbodiimide in 1 ml. of pyridine, homogenized and then allowed to stand again for 4 hours at 50° C. Finally 300 ml. of water are added, the mixture ture is homogenized and the gelatinous flocky precipitate filtered off. It is dried and dissolved in 100 m. of dimethylformamide at 70° C., the greater part of the dicyclohexylurea formed remaining insoluble is filtered off. From the filtrate the crude condensation product is precipitated by the addition of 600 ml. of benzene and 400 ml. of petroleum ether, filtered and dried (4.65 g.). For purification 1.0 g. of this crude product is dissolved with gentle heating in 75 ml. each of upper and lower phase of the solvent system methanol+2 N acetic acid+chloroform+carbon tetrachloride (10:3:7:5) and distributed according to Craig over 135 stages with phase volumes of 25 ml. each. From the distribution elements Nos. 88–110 ($r_{max}$=100, K=2.8) there is obtained on evaporation to dryness and sublimation of the ammonium acetate at 45° C. in a high vacuum a total of 490 mg. of pure protected octadecapeptidamide acetate as a white amorphous powder. In thin-layer chromatography on silica gel the product displays the following Rf values:

Rf (52)=0.55
Rf (96)=0.68
Rf (100)=0.45

(2) H-D-Ser-Tyr-Gly-Met-Glu-His-Phe-Arg-Try-Gly-Lys-Pro-Val-Gly-Lys-Lys-Lys-Lys.NH (D-Ser$^1$-Gly$^3$-Lys$^{17,18}$-$\beta$-1-18-corticotropine-Lys$^{18}$-amide)

270 mg. of BOC-D-Ser-Tyr-Gly-Met-Glu(OtBu)-His-Phe - Arg - Try - Gly-Lys(BOC)-Pro-Val-Gly-Lys(BOC)-Lys-(BOC)-Lys(BOC)-Lys(BOC)-NH$_2$ are dissolved in 13 ml. of trifluoracetic acid of 90% strength, allowed to stand for 30 minutes at 22° C. and then evaporated to about 2 ml. The residue is diluted with 10 ml. of water, again concentrated to a volume of 3–4 ml. and lyophilized. The resulting trifluoracetate of the free octadecapeptide is dissolved in 5 ml. of water for conversion into the acetate and filtered through a column ($\phi$=15 mm.; l.=15 cm.) of weakly basic ion exchanger (Merck No. II) in the acetate form. The eluate is concentrated to about 4 ml. with the addition of a few ml. of n-butanol and then lyophilized. 241 mg. of chromatographically and electrophoretically unitary acetate of D-Ser$^1$-Gly$^3$-Lys$^{17,18}$-corticotropine-Lys$^{18}$-amide are obtained as an amorphous, water-soluble powder. In the thin-layer chromatogram on alumina (DA) and on cellulose it displays the following Rf values:

DA: Rf (52A)=0.15
Rf (101)=0.33
Rf (104)=0.17
DC: Rf (112A)=0.26

In paper electrophoresis (pyridine acetate buffer pH 6.1, 16 volts/cm.) the compound travels 11.7 cm. in two hours towards the cathode.

In comparison with β¹⁻²⁴-corticotropine the compound has a greatly enhanced and prolonged corticotropic effect. In the test according to Schuler et al. mentioned in Example 8, on subcutaneous administration, the compound is more than 10 times as active as β¹⁻²⁴-corticotropin.

EXAMPLE 12

(1) BOC - D - threonyl - L - tyrosyl-L-seryl-L-methionine methyl ester 4.98 g. (22.8 mmol) of dried BOC-D-threonine (prepared as described for the L-compound, cf. K. Hofmann et al., J. Am. Chem. Soc. 87, 611 [1965]) are dissolved in 50 ml. of absolute tetrahydrofuran and 3.5 ml. of absolute triethylamine. The solution is cooled to −10° C. and treated dropwise with 2.15 ml. of chlorocarbonic acid-ethyl ester. Triethylamine hydrochloride settles out immediately. After 10 minutes there is added at −10° C. a solution, cooled to −10° C., of 8.50 g. (20.5 mmols) of L-tyrosyl-L-seryl-L-methionin-methyl ester in 100 ml. of absolute tetrahydrofuran. The batch is kept at −10° C. for 30 minutes, and 18 hours at 0° C. The triethylamine hydrochloride is then filtered off with suction, the filtrate evaporated, the residue dissolved in ethyl acetate, and the ethyl acetate solution washed successively with water, 5% citric acid solution, water, sodium bicarbonate solution, and water. The ethyl acetate solution is then dried with sodium sulfate and evaporated. For purification, the oily residue (10.1 g.) is chromatographed over a column of 400 g. of silica gel deactivated by the addition of water. The chromatogram is developed by means of the following solvents: chloroform+2% methanol, chloroform+5% methanol. The fractions obtained with the last of these solvents are crystallized from methanol+acetone to obtain needles of BOC-D-threonyl-L-tyrosyl-L-seryl-L-methione-methyl ester melting at 107–110° C.

Chromatography on silica gel plates using the solvent system chloroform+methanol (8:2) gives an R$f$ value of 0.76.

(2) BOC-D-threonyl-L-tyrosyl-L-seryl-L-methionine hydrazide 1.40 g. of BOC-D-threonyl-L-tyrosyl-L-seryl-L-methionine methyl ester are dissolved in 20 ml. of methanol. The solution is cooled to 0° C. and treated with 2 ml. of hydrazine hydrate (100%), and allowed to stand at 0° C. for 18 hours during which time the tetrapeptide-hydrazide forms a partly jelly, partly crystalline precipitate. The precipitate is filtered off with suction, washed with cold methanol, and dried. 1.22 g. of crude product of melting point 167–172° C. are obtained. For further purification, the product is recrystallized from methanol. Melting point, 171–172° C.

According to thin-layer chromatography on silica gel plates using the solvent system chloroform+methanol (8:2), the product is unitary; R$f$ value, 0.38; the R$f$ value of the starting material is 0.76.

(3) Z-Glu(OtBu)-His - Phe-Arg-Try-Gly - Lys(BOC)-Pro-Val-Gly-Lys(BOC) - Lys(BOC) - Arg-Arg-Pro-Val-Lys(BOC)-Val-Tyr-Pro-OtBu-triacetate 625 mg. (0.273 mmol) of H-Lys(BOC)-Pro-Val-Gly-Lys(BOC)-Lys(BOC) - Arg-Arg - Pro-Val-Lys(BOC)-Val-Try-Pro-OtBu, 3CH₃COOH, prepared as described in German Pat. No. 1,196,666, in 10 ml. of dry pyridine, are mixed with 0.17 g. of para-toluene sulfonic acid. The solution is evaporated to dryness, the residue freed from pyridine acetate at 35° C. under a pressure of 0.01 mm. Hg, and the pyridine tosylate removed by trituration with acetone and filtration with suction. There are obtained 726 mg. of protected tetradecapeptide-tritosylate as a colorless powder melting at 155–162° C.

525 mg. (0.2 mmol) of the tritosylate and 245 mg. (0.24 mmol) of Z-Glu-(OtBu)-His-Phe-Arg-Try-Gly-OH (obtained by condensation of Z-Arg-OH with H-Try-Gly-OCH₃, splitting off the carbobenzoxy group from the tripeptide derivative, condensation of the free tripeptide ester with Z-Phe-OH, splitting off the carbobenzoxy group from the tetrapeptide ester, condensation of the free tetrapeptide ester with Z-Glu(OtBu)-His-N₃ and hydrolysis of the methyl ester group with N-sodium hydroxide solution in 75% dioxane) are dissolved at 50° C. in 4 ml. of 80% pyridine while stirring. To the clear solution 52 mg. (0.25 mmol) of dicyclohexyl carbodiimide are added. The slightly turbid solution is allowed to stand at 50° C. for 20 hours, and the dicyclohexyl urea that has precipitated is filtered off. The solution is then mixed with a large quantity of ether. The tritosylate of the eicosapeptide precipitates. It is separated, dissolved in 10 ml. of 60% methanol, and chromatographed over a column of 4 ml. of "Amberlite IRA–400" (acetate form) a strongly basic polystyrene anion exchanger having quaternary ammonium groups and described in U.S. Pat. No. 2,591,573. The eluate is evaporated under reduced pressure and triturated with ether. There are obtained 650 mg. of crude, protected eicosapeptide ester triacetate. In the thin-layer chromatogram, it has the following R$f$ values:

On alumina: R$f$ (100) 0.34
On silica gel: R$f$ (101) 0.76; R$f$. (110) 0.45

Development with Reindel-Hoppe, Pauly, and Ehrlich reagents. There are also found unchanged hexapeptide derivative and tetradecapeptide derivative in addition to several faster-running by-products.

(4) H-Glu(OtBu)-His-Phe - Arg - Try-Gly-Lys(BOC)-Pro-Val-Gly-Lys(BOC)-Lys(BOC) - Arg - Arg-Pro-Val-Lys(BOC)-Val-Tyr-Pro-OtBu-tetraacetate 600 mg. of the crude eicosapeptide derivative are dissolved in 10 ml. of methanol and hydrogenated overnight in the presence of 0.5 ml. of glacial acetic acid and 1 g. of 10% palladium carbon. The catalyst is filtered off and the filtrate evaporated under vacuum. The resulting decarbobenzoxylated product is dissolved in 10 ml. of aqueous tertiary butanol (1:1) and chromatographed over a column of 6 g. of carboxymethyl cellulose using a gradient between 100 ml. of 50% tertiary butanol and 100 ml. of 50% tertiary butanol+glacial acetic acid (9:1). The fractions which, according to thin-layer chromatography, contain unitary eicosapeptide derivative are combined and evaporated under reduced pressure. The R$f$ values of the protected eicosapeptide ester-tetraacetate o nsilica gel are: R$f$ (54) 0.50; R$f$ (101) 0.68; R$f$ (110) 0.12.

When all the protective groups have been split off with 90% trifluoracetic acid, the free eicosapeptide has the following R$f$ values:

R$f$ (101) on silica gel: 0.25
R$f$ (101) on alumina: 0.30

(5) BOC-D-Thr-Try-Ser - Met - Glu-(OtBu)-His-Phe-Arg-Try-Gly-Lys(BOC)-Pro - Val - Gly-Lys(BOC)-Lys(BOC)-Arg-Arg-Pro-Val - Lys(BOC) - Val-Tyr-Pro(OtBu)

74 mg. of fine powdered BOC-D-Thr-Try-Ser-Met hydrazide are added to a mixture, cooled to −20° C., of 1 ml. of freshly distilled dimethylformamide and 0.5 ml. of 1.0 N hydrochloric acid, and triturated with a glass rod until all of the hydrazide is disoslved. 0.12 ml. of 1.0 N-sodium nitrite solution is then added, and the clear solution allowed to stand at −15° C. for 20 minutes. After that, a solution of 3.3 mg. of H-Glu(OtBu)-His-Phe-Arg-Try-Gly - Lys(BOC) - Pro-Val-Gly-Lys(BOC)-Lys(BOC)-Arg-Arg-Pro - Val - Lys(BOC)-Val-Try-Pro-OtBu tetraacetate in 6 ml. of methanol and 0.4 ml. of triethylamine is then added. The batch is allowed to stand at 0° C. for 12 hours, then freed from methanol in vacuo at a bath temperature of 40° C. The residual solution is treated with 100 ml. of ethyl acetate, and a fine precipitate obtained which is filtered off with suction and dried to yield a crude product of 550 mg. which still contains triethylamine hydrochloride. For further purification, the crude product is subjected to countercurrent distribution in the system chloroform (2 liters), carbon tetrachloride (0.8 liter), methanol (3.2 liters), ammonium acetate buffer (1.6 liters; 31 g. of ammonium acetate, 46 ml. of glacial acetic acid, made up to 1.6 liters with distilled water). After 60 distribution stages ($t=26°$ C.) the pure, protected D-Threo$^1$-$\beta^{1-24}$-corticotropine is obtained in tubes 11–14 (distribution coefficient K=0.25).

In the thin-layer chromatography on alumina, the protected peptide has an R$f$ value of 0.60 in the system ethyl acetate-pyridine-glacial acetic acid-water (62:21:6:11) and R$f$ 0.55 in the system butanol-glacial acetic acid-water (67:10:23).

(6) H-D - Thr-Tyr-Ser-Met-Glu-His-Phe-Arg - Try-Gly-Lys-Pro-Val-Gly-Lys-Lys-Arg-Arg-Pro - Val - Lys-Val-Tyr-Pro-OH acetic acid salt 70 mg. of the protected D-Thr$^1$-$\beta^{1-24}$ -corticotropine ester are dissolved in 3 ml. of ice-cold trifluoracetic acid which contains 10% of water, and the solution allowed to stand at 0° C. for 45 minutes. It is then treated with 50 ml. of peroxide-free ether, and the resulting precipitate filtered with suction, washed with ether, and dried. The powder obtained is dissolved in 3 ml. of 90% trifluoracetic acid and the solution allowed to stand at 30° C. for 30 minutes. Ether is added and the resulting precipitate filtered with suction and dried. To remove trifluoracetic acid ions, the powder (trifluoracetate of the free 24-peptide) is dissolved in 3 ml. of 5% acetic acid, and the clear solution filtered through a column of 10 ml. of the slightly basic Merck ion exchanger No. II, acetate form. The batch is washed with 30 ml. of 5% acetic acid, and the combined acetic acid eluates lyophilized. There are obtained 50 mg. of D-Thr$^1$-$\beta^{1-24}$-corticotropine in the form of the acetic acid salt. Thin-layer chromatograph on an alumina plate gives an R$f$ value of 0.35 ($\beta^{1-24}$corticotropine 0.32) in the system 1-butanol-pyridine-concentrated ammonia solution-water (38:24:8:30) and an R$f$ value of 0.52 ($\beta^{1-24}$-corticotropine 0.50) in the system n-butanol+pyridine+glacial acetic acid+water (38:24:8:30). In the test according to Schuler et al. mentioned in Example 8, on intravenous administration, the compound is three times as active as $\beta^{1-24}$-corticotropin.

EXAMPLE 13

(1) Z-Val-Tyr-Pro-NH$_2$

A solution of 18.8 g. of Z-Val-Tyr-Pro-OtBu in 95 ml. of 90% trifluoroacetic acid is kept for 1 hour at room temperature, then evaporated to dryness and the oily residue is powdered by addition of 100 ml. of water and trituration at 0° C., then filtered off and dried over potassium hydroxide until its weight remains constant, then it is reprecipitated from ethyl acetate+petroleum ether. The amorphous powder (17.01 g.), together with 5.15 ml. of triethylamine, is dissolved in 170 ml. of absolute tetrahydrofuran, cooled to −15° C. and during 5 minutes mixed with a solution of 4.44 ml. of isobutylchlorocarbonate in 2.5 ml. of absolute tetrahydrofuran. The mixture is stirred for 15 minutes at −10° C., then 107 ml. of 0.64 N-ammonia in absolute ethyl acetate are slowly added and the whole is stirred for 1 hour at 0° C. and then for 6 hours at 20° C. The mixture is considerably concentrated, the tacky residue dissolved in ½ liter of ethyl acetate, washed with water, then with 2 N-soda solution and once more with water and evaporated to dryness. After having twice reprecipitated the residue from ethyl acetate+petroleum ether and dried it under a high vacuum, there are obtained 14.4 g. of an amorphous powder which proves to be unitary in the thin-layer chromatographic examination. On silica gel plates the following R$f$-values are found:

R$f$ in the system chloroform+methanol (9:1)=0.35
R$f$ in the system 43A=0.63

(2) H-Val-Tyr-Pro-NH$_2$

A solution of 14.4 g. of Z-Val-Pro-NH$_2$ in 150 ml. of methanol is hydrogenated in the presence of 15 g. of palladium carbon of 10% strength under atmospheric pressure with CO$_2$ absorption until saturation has been reached (for about 2 hours). The catalyst is filtered off and the filtrate evaporated to dryness; the residue is dissolved in 15 ml. of methanol and 40 ml. of ethyl acetate, precipitated by adding 120 ml. of petroleum ether, filtered off and dried under a high vacuum at 40° C., to yield 9.52 g. of an amorphous powder which is revealed by thin-layer chromatograph on cellulose plates to be unitary:

R$f$ (40)=0.73
R$f$ (45)=0.72
R$f$ (54)=0.70

(3) Z-Lys(BOC)-Val-Tyr-Pro-NH$_2$

A solution of 9.74 g. of Z-Lys(BOC)-OH and 9.52 g. of H-Val-Tyr-Pro-NH$_2$ in 40 ml. of absolute dimethylformamide is mixed with a solution of 5.76 g. of dicyclohexyl carbodiimide in 100 ml. of acetonitrile. The whole is stirred for 12 hours at room temperature, then the precipitate dicyclohexylurea is filtered off and the solution concentrated to dryness. The solid, foamy residue is reprecipitated twice from ethyl acetate+petroleum ether and yields 16.02 g. of amorphous tetrapeptide derivative which reveals the following R$f$-values on silica gel thin-layer plates:

R$f$ in the system chloroform+methanol (9:1)=0.29
R$f$ in the system 43A=0.68

(4) H-Lys(BOC)-Val-Tyr-Pro-NH$_2$

A solution of 15.5 g. of the protected tetrapeptide amide in 100 ml. of methanol is hydrogenated in the presence of 1.5 g. of palladium carbon of 10% strength under atmospheric pressure until saturation has been reached (for about 4 hours). The catalyst is filtered off and the filtrate evaporated to dryness, and the resulting crude product is dissolved in 10 ml. of methanol and 120 ml. of ethyl acetate, precipitated with 120 ml. of petroleum ether and dried under a high vacuum at 40° C., to yield 11.9 g. of an amorphous powder which reveals the following R$f$-values in the thin-layer chromatogram on silica gel:

R$f$ in the system chloroform+methanol (9:1)=0.08
R$f$ in the system 43A=0.27

(5) Z-Val-Lys(BOC)-Val-Tyr-Pro-NH$_2$

A solution of 5.28 g. of Z-Val-OH and 3.07 ml. of triethylamine in 50 ml. of absolute ethyl acetate is cooled to −10° C. and mixed with a solution of 4.57 ml. of isobutylchlorocarbonate in 5 ml. of ethyl acetate. The batch is stirred for 15 minutes longer at −10° C., and then a solution of 11.87 g. of H-Lys(BOC)-Val-Tyr-Pro-NH$_2$ in 10 ml. of dimethylformamide is added at −5° C. The mixture is stirred for 30 minutes at 0° C. and then for 5 hours at room temperature, and then 100 ml. of water and 200 ml. of n-butanol are added. The aqueous phase is separated and the organic phase washed successively with 10% tartaric acid solution (at 0° C.), saturated sodium bicarbonate solution and saturated sodium sulphate solution, dried over sodium sulphate and evaporated to dryness. For a first purification the foamy residue is reprecipitated once from methanol+ethyl acetate petroleum ether and once from methanol+acetonitrile and yields 12.15 g. of an amorphous powder which is subjected to a multiplicative distribution over 250 steps (phase volume 25 ml. each) in the solvent system methanol+0.1 molar ammonium acetate solution+chloroform+carbon tetrachloride (9:3:4:4). The elements 81 to 115 ($r_{max.}$=91;

K=0.57) are evaporated to dryness and the ammonium acetate is removed by sublimation under a high vacuum at 45° C., to yield a total of 7.94 g. of chromatographically pure, protected pentapeptide as a white, amorphous powder which reveals the following R/-values in the thin-layer chromatogram on silica gel:

Rf in the system chloroform+methanol (9:1)=0.42
Rf in the system 43A=0.68

(6) H-Val-Lys(BOC)-Val-Tyr-Pro-NH₂

A solution of 5.72 g. of Z-Val-Lys(BOC)-Val-Tyr-Pro-NH₂ in 75 ml. of methanol is hydrogenated in the presence of 600 mg. of palladium carbon of 10% strength at room temperature while absorbing the $CO_2$ released. The absorption of hydrogen ceases after about 5 hours; the catalyst is filtered off and the solution evaporated to dryness, to yield 4.74 g. of pentapeptide amide as an amorphous, chromatographically unitary powder which reveals the following Rf-values in the thin-layer chromatogram on silica gel:

Rf (52)=0.40
Rf (100)=0.35

(7) Z-Lys(BOC)-Lys(BOC)-Pro-Val-Lys(BOC)-Val-Tyr-Pro-NH₂

A solution of 3.35 g. of Z-Lys(BOC)-Lys(BOC)-Pro-OH [prepared as described in Example 1] in 20 ml. of absolute dimethylformamide is mixed with 0.65 ml. of triethylamine and cooled to −15° C. Then, at −15° C., 0.58 ml. of pivaloylchloride are dropped in. After 6 minutes a precooled solution of 3.34 g. of H-Val-Lys(BOC)-Val-Tyr-Pro-NH₂ in 10 ml. of absolute dimethylformamide is added and the whole is stirred for 20 minutes at −10° C., then for 5 hours at 0° C. and for 2 hours at 20° C. For working up 70 ml. of ethyl acetate and 50 ml. of water are added and the organic phase is extracted successively with 0.1 molar citric acid, 2% ammonia solution and water, dried over sodium sulphate and evaporated. The powdery, amorphous residue (5.74 g.) reveals in the thin-layer chromatogram on silica only minor impurities and is further reacted without purification.

Rf in the system chloroform+methanol (9:1)=0.23

(8) H-Lys(BOC)-Lys(BOC)-Pro-Val-Lys(BOC)-Val-Tyr-Pro-NH₂

A solution of 5.7 g. of the octapeptide derivative described above in 100 ml. of methanol is hydrogenated to saturation under atmospheric pressure in the presence of 550 mg. of palladium carbon of 10% strength. The catalyst is filtered off, rinsed with methanol, and the filtrate evaporated to dryness. The white, foamy residue is dissolved in 100 ml. of chloroform, extracted with 20 ml. of 2 N-acetic acid, the chloroform phase is concentrated to 20 ml., and the peptide is precipitated from it by adding 60 ml. of petroleum ether, and dried under a high vacuum at 50° C. After equilibration with atmospheric moisture there are obtained 5.21 g. of an amorphous, thin-layer chromatographically pure powder which, according to titration and elementary analyses, contains per mol of octapeptide amide 0.63 mol of acetic acid and 13 mols of water. On silica gel the following Rf-values are obtained:

Rf in the system chloroform+methanol (9:1)=0.08
Rf in the system 100=0.46

(9) Z-Lys(BOC)-Pro-Val-Gly-Lys(BOC)-Lys(BOC)-Lys(BOC)-Pro-Val-Lys(BOC)-Val-Tyr-Pro-NH₂

3.91 grams of Z-Lys(BOC)-Pro-Val-Gly-Lys(BOC)-Lys(BOC)-NHNH₂ (cf. German Pat. 1,214,242) are dissolved with slight heating in 40 ml. of absolute dimethylformamide, cooled to −20° C., and at this temperature 6.58 ml. of 2.15 N-hydrochloric acid and then 0.74 ml. of 5 N-sodium nitrite solution are slowly stirred in. Finally, the batch is stirred for another 15 minutes at −10° C., and then a precooled solution of 4.07 g. of H-Lys(BOC)-Lys(BOC)-Pro-Val-Lys(BOC)-Val-Tyr-Pro - NH₂ (containing 2.5% of acetic acid and 15.3% of water) in 11 ml. of dimethylformamide and 1.98 ml. of triethylamide are added. The mixture is stirred for 1 hour at 0° C., and the pH-value is then adjusted to 7.5 with triethylamine, and the whole is kept overnight at 0° C. The reaction mixture is then concentrated to a volume of about 20 ml. under a high vacuum and 100 ml. of water are added, whereupon the crude product settles out in gelatinous form: it is filtered off, washed with water and reprecipitated 3 times from aqueous methanol and twice from methanol+benzene+petroleum ether. The material prepurified in this manner (4.72 g.) is subjected to a Craig distribution over 160 steps (phase volumes 20 ml. each) in the solvent system methanol+buffer+chloroform+carbon tetrachloride (12:4:9:3) [buffer=28.5 ml. of glacial acetic acid+19.25 g. of ammonium acetate in 960 ml. of water]. The elements 45 to 74 ($r_{max}$=57; K=0.55) are evaporated to dryness and the ammonium acetate is removed by sublimation under a high vacuum at 45° C., to yield a total of 3.3 g. of chromatographically pure, protected tetradecapeptide as a white, amorphous powder which decomposes at about 210° C. In the thin-layer chromatogram on silica gel it reveals the following Rf-values:

Rf in the system chloroform+methanol (9:1)=0.17
Rf (43A)=0.62
Rf (100)=0.87

(100 H. Lys(BOC) - Pro - Val - Gly -Lys(BOC) - Lys(BOC) - Lys(BOC) - Lys(BOC) - Pro - Val - Lys - Val-Tyr - Pro - NH₂

A solution of 4.97 g. of the protected tetradecapeptide amide in 100 ml. of warm methanol is hydrogenated to saturation in the presence of 1 g. of palladium carbon of 10% strength at room temperature under atmospheric pressure, while absorbing the carbon dioxide formed. The catalyst is filtered off, the filtrate concentrated to about 15 ml. and from it the hydrated tetradecapeptide is precipitated with 50 ml. of benzene and 150 ml. of petroleum ether; it is filtered off and dried under a high vacuum at 45° C., to yield 4.25 g. of an amorphous powder which is found to be unitary in the thin-layer chromatogram on silica gel and reveals the following Rf values:

Rf (43A)=0.18
Rf (52)=0.41
Rf (100)=0.33

(11) BOC - D - Ser - Tyr - Gly - Met - Glu(OtBu) - His-Phe - Arg - Try - Gly - Lys(BOC) - Pro - Val - Gly-Lys(BOC) - Lys(BOC) - Lys(BOC) - Lys(BOC) - Pro-Val-Lys(BOC)-Val-Tyr-Pro-NH₂

355 mg. of BOC-D-Ser-Tyr-Gly-Met-Glu(OtBu)-His-Phe-Arg-Try-Gly-OH and 400 mg. of H-Lys(BOC)-Pro-Val - Gly - Lys(BOC)-Lys(BOC)-Lys(BOC)-Lys(BOC)-Pro-Val-Lys(BOC)-Val-Tyr-Pro-NH₂ are homogenized with heating at 50° C. in a mixture of 3.7 ml. of pyridine and 0.273 ml. of N-hydrochloric acid. The resulting gel is mixed with a solution of 131 ml. of dicyclohexyl carbodiimide in 0.2 ml. of pyridine, scavenged with nitrogen, once more thoroughly homogenized and then left to itself for 3 hours at 50° C. After this time another portion of 131 mg. of dicyclohexyl carbodiimide in 0.2 ml. of pyridine is added, the whole is once more scavenged with nitrogen, homogenized and kept for another 3 hours at 50° C. Finally, 50 ml. of water are added, the whole is homogenized, the finely granular gelatinous precipitate is filtered off and dried under a high vacuum at 45° C. To remove the dicyclohexylurea and other lipophilic impurities it is twice suspended in hot methanol, precipitated with benzene and petroleum ether, filtered off, and dried. The product prepurified in this manner is subjected to a multiplicative distribution over 185 steps (phase volumes 10 ml. each) in the solvent system methnol+buffer+chloroform+carbon tetrachloride (10:3:6:4) [buffer=28.5 ml. of glacial acetic acid+19.25 g. of ammonium acetate in 960 ml. of water]. The elements 67 to 86 ($r_{max.}$=77; K=0.71) are evaporated to dryness and the ammonium acetate is removed by sublimation under a high vacuum at 45° C., to furnish the pure, protected tetracosapeptide amide as a white, amorphous powder. In the thin-layer chromatogram on silica gel it reveals the following $Rf$-values:

$Rf$ (chloroform+methanol=7:3)=0.42
$Rf$ (52)=0.41
$Rf$ (100)=0.38

(12) H - D - Ser - Tyr - Gly - Met - Glu - His - Phe - Arg- Try - Gly - Lys - Pro - Val - Gly - Lys - Lys - Lys - Lys- Pro - Val - Lys - Val - Tyr - Pro - $NH_2$ (D-Ser$^1$ - Gly$^3$- Lys$^{17,18}$-$\beta^{1-24}$-corticotropin-Pro$^{24}$-amide)

A solution of 293 mg. of protected tetracosapeptide amide in 14 ml. of 90% trifluoroacetic acid is kept for 30 minutes at room temperature, then concentrated in a rotary evaporator at a bath temperature of 30° C. to a volume of about 3 ml., mixed with 15 ml. of water, once more concentrated and lyophilized. This procedure furnishes the trifluoroacetate of the free tetracosapeptide which is converted into the acetate by being dissolved in about 4 ml. of water and filtered through a column (diameter 12 mm., height 22 cm.) of a weakly basic ion exchange resin (for example Merck N° II) in the acetate form. The eluate is concentrated to about 5 ml., lyophilized, after-dried under a high vacuum at 40° C. and then equilibrated with atmospheric moisture, to yield 279 mg. of the acetate D-Ser$^1$-Gly$^3$-Lys$^{17,18}$-$\beta^{1-24}$-corticotropin- Pro$^{24}$-amide as a white, amorphous powder which is readily soluble in water and decomposes unsharply at about 180° C. In the thin-layer chromatogram on alumina (DA) and on cellulose (DC) it reveals the following $Rf$- values:

DA: $Rf$ (52A)=0.27
    $Rf$ (101)=0.66
DC: $Rf$ (101E)=0.36
    $Rf$ (112E)=0.15

In the test according to Desaulles and Rittel mentioned in Example 4 the compound is 10 times as active as $\beta^{1-24}$- corticotropin.

EXAMPLE 14

(1) $N^\alpha$-Z-$N^\epsilon$-BOC-L-lysyl-L-valine amide

A solution of 5.0 g. of $N^\alpha$-Z-$N^\epsilon$-BOC-L-lysine-p-nitrophenyl ester and 1.8 g. of L-valine amide in 100 ml. of freshly distilled dimethylformamide is kept for 5 days at 27° C. The dimethylformamide is then distilled off under 0.01 mm. Hg pressure at 40° C., and the residue is triturated with ethyl acetate and suctioned, to yield 4.44 g. of the dipeptide derivative melting at 201–202° C. $Rf$ value=0.13 in chloroform+methanol (19:1) in thin-layer chromatography on silica gel plates.

(2) $N^\epsilon$-BOC-L-lysyl-L-valine amide 4.4 grams of the dipeptide derivative obtained sub. 1 are suspended in 300 ml. of methanol and hydrogenated in the presence of 500 mg. of palladium carbon, the carbon dioxide formed being absorbed in a second hydrogenating vessel filled with sodium hydroxide solution. After about 2 hours no more hydrogen is being absorbed and the initially undissolved dipeptide derivative has dissolved completely. The solution is freed from the catalyst by filtration and evaporated to dryness. The evaporation residue, $N^\epsilon$-BOC-L-lysyl-L-valine amide, is sufficiently pure for the further reaction.

(3) $N^\alpha$-Z-$N^\epsilon$-BOC-L-lysyl-($N^\epsilon$-BOC)-L-lysyl-L- valine amide 3.1 grams of the $N^\epsilon$-BOC-L-lysyl-L-valine amide obtained sub. 2 are dissolved in 600 ml. of freshly distilled dimethylformamide and the solution is mixed with 4.65 g. of $N^\alpha$-Z-$N^\epsilon$-BOC-L-lysine-p-nitrophenyl ester. The clear solution is kept for 24 hours at 28° C. and then the dimethylformamide is distilled off at 40° C. under 0.01 mm. Hg pressure and the residue purified by being triturated with much ethyl acetate, suctioned off and dried, to yield the tripeptide derivative $N^\alpha$-Z-$N^\epsilon$-BOC-L-lysyl-($N^\epsilon$-BOC)- L-lysyl-L-valine amide as a gelatinous powder melting at 192–195° C. The $Rf$ value is 0.36 in the system chloroform+methanol (9:1) and 0.14 in the system chloroform+methanol (19:1) in the thin-layer chromatograms on silica gel plates.

(4) $N^\epsilon$-BOC-L-lysyl-($N^\epsilon$-BOC)-L-lysyl-L-valine amide

A solution of 1.0 g. of the tripeptide derivative obtained sub. 3 in 120 ml. of methanol is hydrogenated in the presence of 100 mg. of palladium carbon (10% Pd), and the carbon dioxide formed is absorbed in a second hydrogenating vessel filled with sodium hydroxide solution. On cessation of the hydrogen absorption the catalyst is suctioned off and the filtrate evaporated, to yield the tripeptide derivative $N^\epsilon$-BOC-L-lysyl-($N^\epsilon$-BOC)-L-lysyl-L- valine amide as a colorless resin. In thin-layer chromatography on silica gel plates it reveals an $Rf$ value of 0.09 in the system chloroform+methanol (9:1) and proves to be free from unhydrogenated tripeptide derivative.

(5) $N^\alpha$-Z-$N^\epsilon$-BOC-L-lysyl-L-prolyl-L-valyl - glycyl - ($N^\epsilon$- BOC)-L-lysyl-($N^\epsilon$-BOC)-L-lysyl-($N^\epsilon$-BOC) - L - lysyl- ($N^\epsilon$-BOC)-L-lysyl-L-valine-amide 1.71 grams of $N^\alpha$-Z-$N^\epsilon$-BOC-L-lysyl-L-prolyl-L-valyl- glycyl-($N^\epsilon$-BOC)-L-lysyl-($N^\epsilon$-BOC)-L-lysine hydrazide is dissolved with stirring at −20° C. in 30 ml. of freshly distilled dimethylformamide containing 3.1 ml. of 2.5 N- aqueous hydrochloric acid. Then 1.55 ml. of molar sodium nitrite solution is dropped in, the batch allowed to heat up to −10° C., kept for 20 minutes at this temperature. Then a solution, precooled to −10° C., of 805 mg. of N-BOC-L-lysyl-($N^\epsilon$-BOC)-L-lysyl-L-valine amide and 625 mg. of triethylamine in 5 ml. of dimethylformamide is added and the whole is kept overnight at 2° C., then concentrated to a small volume under a high vacuum at 40° C. bath temperature and the crude nonapeptide derivative is precipitated by adding 200 ml. of water. After trituration, suctioning and washing with water there are obtained 2.3 g. of crude product. or purification the crude nonapeptide derivative is subjected to a counter-current distribution in the solvent system chloroform:toluene: methanol:water (5:5:8:2) over 120 steps. After having checked the individual fractions by way of thin-layer chromatography on silica gel plates ($Rf$ value=0.26 in the system chloroform+methanol (9:1)) the unitary fractions of the protected nonapeptide derivative are combined.

(6) $N^\epsilon$-BOC-L-lysyl-L-prolyl-L-valyl-glycyl-($N^\epsilon$ - BOC)- L-lysyl-($N^\epsilon$-BOC)-L-lysyl-($N^\epsilon$-BOC) - L - lysyl - ($N^\epsilon$- BOC)-L-lysyl-L-valine amide 500 mg. of the nonapeptide derivative obtained sub. 5 are suspended in 50 ml. of methanol and hydrogenated, with intense stirring, in the presence of 200 mg. of palladium carbon (10% Pd). The carbon dioxide formed is absorbed in a second hydrogenating vessel. On cessation of the hydrogen absorption the whole is heated to 50° C. and the catalyst suctioned off. The filtrate is evaporated to dryness and yields the nonapeptide derivative $N^\epsilon$-BOC- L-lysyl-L-prolyl-L-valyl-glycyl-($N^\epsilon$-BOC) - L - lysyl - ($N^\epsilon$- BOC)-L-lysyl-($N^\epsilon$-BOC)-L-lysyl - ($N^\epsilon$ - BOC) - L - lysyl- L-valine amide as a colorless resin. In the thin layer chromatogram on silica gel plates (system chloroform +methanol 85:15) the product is found to be free from unhydrogenated starting material.

(7) Nα-BOC-D-seryl-L-tyrosyl-L-seryl-L-methionyl - (γ-t-butyl)-L-glutamyl-L - histidyl - L - phenylalanyl - L-arginyl-L-tryptophyl-glycyl((Nε - BOC) - L - lysyl - L-prolyl-L-valyl-glycyl-(Nε-BOC)-L-lysyl - (Nε-BOC)-L-lysyl-(Nε-BOC)-L-lysyl-(Nε-BOC)-L-lysyl - L - valine amide A mixture of 165 mg. of BOC-D-Ser-L-Tyr-L-Ser-L-Met-L-Glu(OtBu)-L-His-L-Phe-L-Arg-L-Try - Gly - OH and 150 mg. of H-L-Lys(BOC)-L-Pro-L-Val-Gly-L-Lys-(BOC)-L-Lys(BOC)-L - Lys(BOC) - L - Lys(BOC) - L-Val—NH$_2$ is mixed with 4 ml. of freshly distilled dimethylformamide and 0.018 ml. of 6 N-aqueous hydrochloric acid. The batch is stirred for 1 hour at 50° C., then 23 mg. of N-hydroxy-succinimide and 34 mg. of dicyclohexylcarbodiimide are added and the whole is stirred for another 3 hours at 50° C. Then another 34 mg. of dicyclohexylcarbodiimide are added and the mixture is stirred on for 15 hours at 50° C. The undissolved matter is then suctioned off and the filtrate poured into 100 ml. of peroxide-free ether. The crude, protected nonadecapeptide derivative which settles out in the form of a fine floccular precipitate is suctioned off, washed with ether and dried. For purification 150 mg. of the product are subjected to counter-current distribution in the solvent system chloroform+carbontetrachloride+methanol +buffer (14:8:20:6) [buffer: 29 ml. of glacial acetic acid and 20 g. of ammonium acetate dissolved in 1 liter of water, pH=4.5]. The material is dissolved in 50 ml. each of each of the upper and lower phases of the solvent mixture and 10 ml. of each of these solutions is poured into the first 5 tubes of the distributing apparatus (phase volume: 10 ml. each), and then the Craig distribution is performed over 120 steps. The uniformity of the material contained in the individual tubes is tested by way of thin-layer chromatography on silica gel plates in the solvent system chloroform+methanol (75:25), and the uniform fractions of the protected nonadecapeptide derivative are combined.

(8) H-D-Ser-L-Tyr-L-Ser-L-Met-L-Glu-L - His - L - Phe-L-Arg-L-Try-Gly-L-Lys-L-Pro-L-Val - Gly - L - Lys-L-Lys-L-Lys-L-Lys-L-Val-NH$_2$ 100 mg. of the protected nonadecapeptide derivative obtained sub. 7 are dissolved in 3 ml. of 90% trifluoroacetic acid and the solution is kept for 1 hour at 26° C., then poured into 100 ml. of peroxide-free ether. The finely floccular precipitate is suctioned off, washed with ether and dried in a desiccator over caustic soda. For conversion into the acetate the product is dissolved in 3 ml. of 5% acetic acid and filtered through a column of 10 ml. of Merck ion exchange resin N°II (weakly basic; acetate form). The column is then rinsed with 5% acetic acid until the eluate no longer displays an absorption at 280 mμ in the ultraviolet spectrum, and the washing liquor is then lyophilized, to yield the acetate of the nonadecapeptide H-D-Ser-Tyr-Ser-Met-Glu-His - Phe - Arg - Try-Gly-Lys-Pro-Val-Gly-Lys-Lys-Lys - Lys - Val - NH$_2$ as a faintly yellowish, light powder. Its total hydrolysis with 6 N-hydrochloric acid (24 hours at 110° C.) and quantitative aminoacid anlysis reveal the expected molar aminoacid ratio.

In the test according to Desaulles and Rittel mentioned in Example 4, the compound is three times as active as β$^{1-24}$-corticotropin.

EXAMPLE 15

(1) BOC-D-Ser - L - Tyr-L-Ser-L-Nle-L-Glu(OtBu)-L-His-L-Phe-L-Arg - L - Try-Gly-L-Lys(BOC)-L-Pro-L-Val-Gly - L - Lys(BOC)-L-Lys(BOC)-L-Lys(BOC)-L-Lys(BOC)-L-Val-NH$_2$

A suspension of 500 mg. of BOC-D-Ser-L-Tyr-L-Ser-L-Nle - L - Glu(OtBu)-L-His-L-Phe-L-Arg-L-Try-Gly-OH and 420 mg. of H-L-Lys(BOC)-L-Pro-L-Val-Gly-L-Lys(BOC)-L-Lys(BOC) - L - Lys(BOC)-L-Lys(BOC)-Val-NH$_2$ in 20 ml. of freshly distilled dimethylformamide is mixed with 0.3 ml. of N-aqueous hydrochloric acid while being stirred. After 1 hour's stirring at room temperature 75 mg. of N-hydroxysuccinimide and 100 mg. of dicyclohexylcarbodiimide are added, the batch is heated to 45° C. and stirred for 2½ hours. Then another 50 mg. of dicyclohexylcarbodiimide are added and the batch is stirred for another 12 hours at 45° C. The insoluble matter is then filtered off, the filtrate concentrated to a small volume under a high vacuum at 40° C. bath temperature and the protected nonadecapeptide derivative is precipitated by adding much ether. The pulverulent precipitate is triturated, suctioned and dried. Yield: 950 mg. of crude product which contains some residual dicyclohexylurea. The product is further reacted as it is.

(2) H-D-Ser-L-Tyr - L - Ser-L-Nle-L-Glu-L-His-L-Phe-L-Arg-L-Try-Gly - L - Lys-L-Pro-L-Val-Gly-L-Lys-L-Lys-L-Lys-L-Lys-L-Val-NH$_2$

A solution of 500 mg. of the crude protected nondecapeptide obtained sub. 1 in 10 ml. of ice-cooled 90% trifluoroacetic acid is kept for 1 hour at room temperature. The faintly violet-bluish solution is then poured into 200 ml. of ether, the floccular precipitate triturated, suctioned, washed with ether and dried in a desiccator over caustic soda, to yield 460 mg. of crude trifluoroacetate of the nonadecapeptide. To remove the trifluoroacetic acid ions the material is mixed with 10 ml. of 5% aqueous acetic acid solution, a little undissolved matter is filtered off and the clear solution is filtered through a column of 20 ml. of Merck ion exchange resin N°II (weakly basic; acetate form). The column is rinsed with 5% aqueous acetic acid (40 ml.). The combined eluates are evaporated to dryness at a bath temperature of 40° C. under vacuum. The residue is dissolved in a little water and lyophilized. For purification the material is dissolved in 10 ml. of ammonium acetate solution (0.3 molar, pH=6.5) and poured over a column (2.5×40 cm.) of "CM Sephadex C 25" [product of Messrs. Pharmacia, Uppsala] prepared in the same solvent. Elution is then performed with a linear gradient of 500 ml. each of 0.3 molar and 5.0 molar ammonium acetate solutions pH 6.5). The progress of the elution of the material is checked with a recording percolation U.V. Spectrophotometer (Uvicord of Messrs. LKB, Stockholm). Fractions of 5 ml. of solution each are collected. The fractions of the main band eluted at an ammonium acetate concentration of about 3 molar are separately evaporated and the ammonium acetate present therein is removed by sublimation at a bath temperature of 40° C. under 0.01 mm. Hg pressure. The purity of the peptide residue is checked by way of thin-layer chromatography on alumina plates [makers Messrs. Camag] in the system 101; the unitary fractions are dissolved in a little water, combined and lyophilized, to yield the acetate of the nonadecapeptide H-D-Ser-Tyr-Ser-Nle-Glu-His - Phe - Arg-Try-Gly-Lys-Pro-Val - Gly - Lys-Lys-Lys-Lys-Val-NH$_2$ as a very faintly yellowish, light powder. In the test according to Desaulles and Rittel mentioned in Example 4, the compound is 3 to 5 times as active as β$^{1-24}$-corticotropin.

EXAMPLE 16

(1) N-Nle-OCH$_3$ 18.4 g. of L-norleucine are suspended in 57 ml. of methanol, and 11 ml. of thionyl chloride are added with stirring in the course of 30 minutes at −15° C. Stirring is continued for another 30 minutes at −15° C., then for 90 minutes at 0° C. and another 90 minutes at room temperature. The solution is allowed to stand for 3 hours at 40° C., then evaporated to dryness at 35° C. and the residue crystallized from a mixture of acetone and hexane (2:1). Melting point: 140–141° C. 18.1 g. of the hydrochloride are dissolved in 20 ml. of water, covered with 200 ml. of ether and treated with 40 ml. of saturated potassium carbonate solution at 0° C. The aqueous phase is extracted several times with ether, the ethereal solutions are combined, dried over sodium sulphate and evaporated at 0° C. in a high vacuum. The free ester is obtained as a clear oil.

(2) BOC-Ser-Nle-OCH$_3$

A solution of 22.3 g. of BOC-L-serine hydrate in 270 ml. of acetonitrile is treated with a solution of 14.3 g. of L-norleucine methyl ester in 65 ml. of acetonitrile. The solution is cooled to −5° C., 22.7 g. of dicyclohexyl carbodiimide in 35 ml. of acetonitrile are added, the batch is stirred for 1 hour at −5° C., then overnight at 0° C., freed from dicyclohexyl urea and the solution evaporated at 35° C. The residue is taken up in ethyl acetate, the solution washed with N-hydrochloric acid, N-sodium bicarbonate and saturated sodium chloride solution and evaporated. The crystalline dipeptide ester melts at 69–71° C.

(3) H-Ser-Nle-OCH$_3$ 28.0 g. of BOC-Ser-Nle-OCH$_3$ are dissolved in 320 ml. of trifluoroacetic acid of 90% strength and allowed to stand at room temperature for 2 hours. After concentrating the solution to half its volume, 500 ml. of ether are added, the trifluoroacetate crystallizing out. The latter (24.2 g.) is dissolved in 35 ml. of water, 700 ml. of chloroform are introduced in the form of a layer beneath the solution and the whole is treated with stirring at 0° C. with 210 ml. of saturated potassium carbonate solution. From the chloroform phase 16.1 g. of crystalline dipeptide ester melting at 84–85° C. are obtained.

(4) BOC-Tyr-Ser-Nle-OCH$_3$ 19.6 g. of BOC-Tyr-OH and 16.1 g. of H-Ser-Nle-OCH$_3$ are dissolved in a mixture of 350 ml. of acetonitrile and 17.5 ml., of dimethylformamide, treated at −5° C. with a solution of 15.9 g. of dicyclohexylcarbodiimide in 175 ml. of acetonitrile and then stirred for 1 hour at −5° C. and overnight at 0° C. The batch is freed from dicyclohexylurea, washed as described above and the solution evaporated. The protected tripeptide ester melts after recrystallization at 143–145° C.

(5) H-Tyr-Ser-Nle-OCH$_3$ 27.3 g. of the protected tripeptide ester are dissolved in 82.5 ml. of N-hydrochloric acid in methanol, allowed to stand for 2 hours at room temperature and then treated with 1.5 litres of ether. The hydrochloride of the free tripeptide ester is obtained which after recrystallization melts at 218–220° C. (with decomposition).

14.2 g. of the hydrochloride are dissolved in 20 ml. of water, 400 ml. of chloroform are introduced in the form of a layer beneath the solution and the batch then treated at 0° C. with 100 ml. of saturated potassium carbonate solution. The free base melts at 84–86° C. after recrystallization.

(6) BOC-D-Ser-Tyr-Ser-Nle-OCH$_3$ 13.4 g. of H-Tyr-Ser-Nle-OCH$_3$ are dissolved in 250 ml. of acetonitrile and after the addition of 15 ml. of dimethylformamide the batch is treated with 7.35 g. of BOC-D-serine. At −5° C. a solution of 7.45 g. of dicyclohexylcarbodiimide in 30 ml. of acetonitrile is added and the batch then stirred for 1 hour at −5° C. and overnight at 0° C. The batch is freed from dicyclohexylurea, the solution evaporated. The protected tetrapeptide ester melts at 149–151° C. (with decomposition) after recrystallization.

(7) BOC-D-Ser-Tyr-Ser-Nle-NH-NH$_2$ 11.65 g. of tetrapeptide ester are dissolved in 50 ml. of methanol, 4.8 ml. of hydrazine hydrate are added to the solution and the mixture allowed to stand for 24 hours at room temperature. 50 ml. of water are added and the batch stirred until the gelatinous product is crystalline throughout. It melts at 205–207° C.

(8) BOC-D-Ser-Tyr-Ser-Nle-Glu(OtBu)-His-Phe-Arg-Try-Gly-OH 8.75 g. of BOC-D-Ser-Tyr-Ser-Nle-NH-NH$_2$ are dissolved in 75 ml. of dimethylformamide and then treated while stirring at −15° C. with 20 ml. of a 2 N solution of hydrogen chloride in glacial acetic acid. After the addition of 1.65 g. of tertiary butyl nitrile, the solution is stirred for 10 minutes at −15° C. and then treated with 5.5 ml. of triethylamine. The resulting solution of the BOC tetrapeptide azide is added dropwise to a solution, cooled to −10° C., of 10 g. of H-(Glu(OtBu)-His-Phe-Arg-Try-Gly-OH in 225 ml. of dimethylformamide and 12 ml. of water; the reaction mixture is stirred for 20 hours at 0° C. and then treated with 900 ml. of water. The amorphous decapeptide is filtered with suction and washed with a mixture of dimethylformamide and water (1:5). After reprecipitation from aqueous acetonitrile and equilibration with atmospheric moisture there are obtained 12.9 g. pure protected decapeptide tetrahydrate melting at 215–218° C. (with decomposition); optical rotation $[\alpha]_D = 18° \pm 2°$ (c.=0.5 in pyridine+water 1:1). The compound is unitary in a thin-layer chromatogram on silica gel, $Rf$ (52)=0.3.

(9) BOC - D - Ser-Tyr-Ser-Nle-Glu(OtBu)-His-Phe-Arg-Try-Gly-Lys(BOC) - Pro - Val - Gly-Lys(BOC)-Lys(BOC)-Lys(BOC)-NH$_2$ 1 gram of BOC-D-Ser-Tyr-Ser-Nle-Glu(OtBu)-His-Phe-Arg-Try-Gly-OH and 0.7 g. of H-Lys(BOC)-Pro-Val-Gly-Lys(BOC)-Lys(BOC)-Lys(BOC)-Lys(BOC)-NH$_2$ are suspended in a mixture of 20 ml. of pyridine and 0.83 ml. of N-hydrochloric acid. The mixture is stirred for 15 minutes at 50° C., then 0.4 g. of dicyclohexyl-carbodiimide is added and the whole is stirred on for 3 hours at 50° C. The same quantity of carbodiimide is once more added and the mixture stirred for 3 hours at 50° C. The bulk of the pyridine is then expelled under vacuum, and the residue is mixed with 30 ml. of warm dimethylformamide, triturated and the insoluble matter is filtered off. The filtrate is concentrated under a high vacuum at 40° C. to a volume of about 5 ml. and much water is added to it. The crude product, which has settled out, is thoroughly triturated, suctioned off, washed with water and dried. For further purification the product is reprecipitated from dimethylformamide+ethyl acetate and then submitted to a countercurrent distribution in the solvent system methanol+buffer+chloroform+carbon tetrachloride (10:3:7:4) [buffer=28.5 ml. of glacial acetic acid and 19.3 g. of ammonium acetate in 960 ml. of water].

After 120 distribution stages the pure, protected octadecapeptide-amide derivative is obtained from tubes Nos. 38–54 (maximum weight in tube No. 44, distribution number K=0.58). In thin-layer chromatography on silica gel plates, the product exhibits the following $Rf$ values:

$Rf$ in the system chloroform+methanol (75:25)=0.22
$Rf$ (43A)=0.46

(10) H-D-Ser-Tyr-Ser-Nle-Glu-His-Phe-Arg-Try-Gly-Lys-Pro-Val-Gly-Lys-Lys-Lys-Lys-NH$_2$ 0.5 gram of the protected octadecapeptide amide, purified by counter-current distribution, is dissolved in 10 ml. of ice-cold trifluoroacetic acid of 90% strength; the solution is kept for 1 hour at 25° C., then evaporated under vacuum to a small volume, and the trifluoroacetate of the free octadecapeptide amide is precipitated by adding a large quantity of peroxide-free ether. The hygroscopic product is suctioned off, washed with ether and dried; for conversion into the acetate it is dissolved in acetic acid solution of 1% strength, filtered through a column of weakly basic ion exchange resin (Merck N°II) in the acetate form and the column is rinsed with 1% acetic acid. The eluate is mixed with n-octanol and evaporated at 40° C. in vacuo; to free it from octanol it is washed with petroleum ether and dried. The product is then dissolved in a small quantity of water and lyophilized, to yield the acetate of the octadecapeptide amide, D-Ser¹-Nle⁴-Lys¹⁷,¹⁸-β-1–¹⁸-corticotropin-Lys¹⁸-amide in the form of a dry, almost white powder.

When subjected to paper electrophoresis, the octadecapeptide, at a pH of 6.3, travels 10 cm. towards the cathode. (Paper: Schleicher & Schüll 204/b mgl.; pyridine acetate buffer; 1 hour; 2000 v.). In thin-layer chromatography on alumina plates it gives the following R*f* values:

R*f* (52A)=0.18;
R*f* (101)=0.25

In the test according to Desaulles and Rittel mentioned in Example 4, the compound is 10 times as active as β¹⁻²⁴-corticotropin.

EXAMPLE 17

(1) BOC - D - Ser - Tyr - Ser - Nle - Glu(OtBu) - His- Phe - Arg - Try - Gly - Lys(BOC) - Pro - Val - Gly- Lys(BOC) - Lys(BOC) - Lys(BOC) - Lys(BOC)-Pro-Val-Lys(BOC)-Val-Tyr-Pro-OtBu 1 gram of BOC-D-Ser-Tyr-Ser-Nle-Glu(OtBu)-His-Phe-Arg-Try-Gly-OH and 1.05 g. of H-Lys(BOC)-Pro-Val - Gly - Lys(BOC) - Lys(BOC) - Lys(BOC) - Lys-(BOC) - Pro - Val - Lys(BOC) - Val - Tyr - Pro - OtBu (obtained by condensing Z-Lys(BOC)-OH with H-Lys-(BOC)-OCH₃ in the presence of dicyclohexyl-carbodiimide; conversion of the protected dipeptide ester into the hydrazide; condensation with L-proline by the azide method to furnish the Z-Lys(BOC)-Lys(BOC)-Pro-OH; condensation of this derivative with H-Val-Lys(BOC)-Val-Tyr-Pro-OtBu in the presence of dicyclohexylcarbodiimide; elimination of the carbobenzoxy group from the resulting octapeptide derivative with hydrogen in the presence of palladium carbon and condensation of the resulting H-Lys(BOC)-Lys(BOC)-Pro-Val-Lys(BOC)-Val-Tyr-Pro-OtBu with the Z-Lys(BOC)-Pro-Val-Gly-Lys(BOC)-NH-NH₂ described in German specification 1,214,242 by the azide method are mixed with 15 ml. of pyridine, 1 ml. of water and 0.47 ml. of N-hydrochloric acid. Then 300 mg. of dicyclohexyl-carbodiimide are added, the batch is stirred for 3 hours at 50° C., another 300 mg. of dicyclohexyl-carbodiimide are added and the whole is stirred for another 6 hours at 50° C. The mixture is then concentrated to a volume of about 5 ml. and precipitated by the addition of much ether. The powder, which is insoluble in ether, is triturated with water, suctioned off and dried. The resulting crude product is suspended for a first purification in 50 ml. each of the upper and lower phase of the solvent system methanol+buffer+chloroform+carbon tetrachloride (10:3:5:4) [buffer: 28.5 ml. of glacial acetic acid+19.25 g. of ammonium acetate in 960 ml. of water], the suspension is agitated for several hours and the insoluble matter is filtered off. The soluble material is further purified by a Craig distribution in the same solvent system. The degree of purity of the individual fractions is determined by thin-layer chromatography on silica gel plates in the systems 100 and chloroform+methanol (75:25). The chromatographically unitary fractions are combined and evaporated. The ammonium acetate left in the residue is removed by sublimation under a high vacuum at 40° C.

(2) H - D - Ser - Tyr - Ser - Nle - Glu - His - Phe - Arg- Try - Gly - Lys - Pro - Val - Gly Lys - Lys - Lys - Lys- Pro-Val-Lys-Val-Tyr-Pro-OH (acetate)

100 mg. of BOC-D-Ser-Tyr-Ser-Nle-Glu(OtBu)-His-Phe - Arg - Try - Gly - Lys(BOC) - Pro - Val - Gly- Lys(BOC) - Lys(BOC) - Lys(BOC) - Lys(BOC) - Pro-Val-Lys(BOC)-Val-Tyr-Pro-OtBu are dissolved in 3 ml. of 90% trifluoroacetic acid and kept for 1½ hours at 25° C., then precipitated with much ether, suctioned, and the filter residue is washed with ether and dried. The resulting trifluoroacetate of the tetracosapeptide is converted into the acetate by being dissolved in 5 ml. of water and filtered through a column (diameter 18 mm., height 20 cm.) of a weakly basic ion exchange resin (Merck N°II) in the acetate form. Lyophilization of the eluate furnishes the acetate of the free tetracosapeptide as an almost colourless, light powder.

In the test according to Desaulles and Rittel mentioned in Example 4, the compound is 10 times as active as β¹⁻²⁴-corticotropin.

EXAMPLE 18

(1) BOC - D - Ser - Tyr - Ser - Nle - Glu(OtBu) - His- Phe - Arg - Try - Gly - Lys(BOC) - Pro - Val - Gly- Lys(BOC) - Lys(BOC) - Lys(BOC) - Lys(BOC)-Pro-Val-Lys(BOC)-Cal-Tyr-Pro-NH₂

600 milligrams of BOC-D-Ser-Tyr-Ser-Nle-Glu(OtBu)-His-Phe-Arg-Try-Gly-OH and 630 mg. of H-Lys(BOC)-Pro - Val - Gly - Lys(BOC) - Lys(BOC) - Lys(BOC)- Lys(BOC) - Pro - Val - Lys(BOC) - Val - Tyr - Pro-NH₂ are mixed with 12 ml. of pyridine, 1 ml. of water and 0.3 ml. of N-hydrochloric acid, then a solution of 200 mg. of dicyclohexyl-carbodiimide in 1.5 ml. of pyridine is added and the whole is stirred for 5 hours at 45 to 50° C. Then another 150 mg. of dicyclohexyl-carbodiimide are added and the whole is stirred overnight at 45° C. The whole mixture of condensation product+dicyclohexylurea is precipitated by adding 160 ml. of water, filtered off and dried and, to isolate the dicyclohexylurea, it is twice suspended with heating in ethanol, or partially dissolved therein, and reprecipitated by adding benzene and petroleum ether. The material prepurified in this manner is finally purified by counter-current distribution as described in Example 17.

After 120 distribution stages in the solvent system methanol+buffer+chloroform+carbon tetrachloride (10:3:5:4) [buffer: 28.5 ml. of glacial acetic acid+19.25 g. of ammonium acetate in 960 ml. of water], the pure, protected tetracosapeptide amide is obtained from the fractions 46–58 (distribution number, K=0.82). In thin-layer chromatography on silica gel plates, the protected peptide derivative shows the following R*f* values:

R*f* (52)=0.54
R*f* (100)=0.35
R*f* in the system chloroform methanol (7:3)=0.4

(2) H - D - Ser - Tyr - Ser - Nle - Glu - His - Phe - Arg- Try - Gly - Lys - Pro - Val - Gly - Lys - Lys - Lys - Lys- Pro-Val-Lys-Val-Tyr-Pro-NH₂ (acetate)

The elimination of the protective groups from the protected peptide and the conversion of the trifluoroacetate into the acetate are carried out as described in Example 17.

When subjected to paper-electrophoresis (paper Schleicher & Schüll, 2043/b mgl.; pyridine-acetate buffer, pH=6.35; running period 1 hour; 2000 v.), the free tetracosapeptide-amide travels 8 cms. towards the cathode. In thin-layer chromatography it exhibits the following R*f* values:

R*f* (101) on alumina plate=0.58
R*f* (52A) on alumina plate=0.44
R*f* (101E) on cellulose plate=0.46

In the test according to Desaulles and Rittel mentioned in Example 4, the compound is more than 10 times as active as β¹⁻²⁴-corticotropin.

EXAMPLE 19

(1) BOC-TYR-Gly-OCH₃

10.12 g. of BOC-tyrosine are dissolved in 45 ml. of hot ethyl acetate and the solution, after being cooled to 20° C., treated with a solution of 3.84 g. of glycine-methyl ester in 10 ml. of ethyl acetate. 10.4 g. of solid dicyclohexylcarbodiimide are added and the whole stirred for 18 hours at 25° C. The batch is then cooled to 0° C., the precipitated dicyclohexylurea filtered off after 30 minutes, and the crude dipeptide derivative isolated from the filtrade by concentration and precipitation with petroleum ether. The amorphous viscous mass is further purified by another precipitation from a mixture of ethyl acetate and petroleum ether. It can be crystallized from the same mixture of solvents. Melting point, 124–125° C.

The thin-layer chromatogram on silica gel gives the following R$f$ values:

R$f$ (43 A): 0.65
R$f$ (CHCl$_3$-methanol=8:2): 0.68
R$f$ (101): 0.77

(2) H-Tyr-Gly-OCH$_3$, hydrochloride 2 g. of BOC-Tyr-Gly-OCH$_3$ are dissolved in 20 ml. of absolute ethyl acetate while being heated, and treated with 20 ml. of 4 N-hydrochloric acid in absolute ethyl acetate at 20° C. After a few minutes a precipitate begins to form. After 30 minutes, the reaction mixture is concentrated to about 10 ml. under reduced pressure and precipitation of the dipeptideester hydrochloride completed by the addition of 50 ml. of petroleum ether. The batch is homogenized, the amorphous product filtered off, washed with petroleum ether, and dried under a high vacuum at 30° C. The dipeptide ester hydrochloride is obtained as a hydroscopic powder melting at about 110–115° C. (with decomposition). In the thin layer chromatogram it displays the following R$f$ values:

R$f$ (43 A): 0.33
R$f$ (CHCl$_3$-methanol=8:2): 0.36
R$f$ (101): 0.60

(3) BOC-D-Ser-Tyr-Gly-OCH$_3$

With slight heating, 1.69 g. of H-Tyr-Gly-OCH$_3$ hydrochloride are dissolved in 10 ml. of absolute dimethyl formamide, then cooled to 0° C. There are added successively 0.84 ml. of triethylamine, 1.23 g. of BOC-D-Ser-OH, and 1.65 g. of dicyclohexylcarbodiimide, and the mixture stirred for 20 hours at 25° C., and finally for 1 hour at 0° C. The mixture of triethylammonium chloride and dicyclohexylurea which has precipitated is filtered off, and the filtrate concentrated to obtain an oily residue. Addition of 30 ml. of ethyl acetate and 100 ml. of petroleum ether precipitates the crude product as a greasy substance. For preliminary purification the latter is dissolved with heating in a small amount of ethyl acetate, and precipitated by the addition of much petroleum ether (1.8 g.). The product, which according to the thin-layer chromatogram is still impure, is for purification subjected to multiplicative distribution according to Craig in the solvent system ethyl acetate:benzene:0.05 molar aqueous ammonium acetate solution (2:1:2), the phase volumes being about 10 ml. each. After 250 stages, the chromatographically pure tripeptide derivative is isolated from stages 45–74 (r$_{max.}$=60; K=0.32) by evaporating the solvent and sublimating off the ammonium acetate at 45° C. under a high vacuum. Crystals from aqueous methanol, melting point 175–176° C. The thin-layer chromatogram on silica gel reveals the following R$f$ values:

R$f$ (52): 0.76
R$f$ (101): 0.78
R$f$ (CHCl$_3$-methanol-8:2): 0.58

(4) BOC-D-Ser-Tyr-Gly-OH 685 mg. of BOC-D-Ser-Tyr-Gly-OCH$_3$ are dissolved in 5 ml. of N-sodium hydroxide solution, the solution allowed to stand at 20° C. for 10 minutes, then neutralized by the addition of 5 ml. of N-hydrochloric acid. The protected tripeptide is extracted with 50 ml. of N-butanol saturated with water, the butanol layer washed 4 times with 4 ml. of water each time and concentrated to about 3 ml. Addition of 30 ml. of petroleum ether yields a greasy precipitate which can be crystallized from ethyl acetate (melting point 168° C. (with decomposition)). The substance is unitary according to the thin layer chromatogram. On silica gel it displays the following R$f$ values:

R$f$ (52): 0.60
R$f$ (101): 0.61

(5) BOC-D-Ser-Tyr-Gly-Nle-OCH$_3$ 3.09 g. of BOC-D-Ser-Tyr-Gly-OH are dissolved in a mixture of 5 ml. of absolute dimethyl formamide and in 15 ml. of acetonitrile while heating slightly. After having been cooled to 10° C. the batch is treated with a solution of 1.23 g. of freshly prepared norleucine methyl ester in 15 ml. acetonitrile. After that, 2.04 g. of solid dicyclohexyl carbodiimide are added. The solution is stirred at 10° C. for an hour and at room temperature for 16 hours. Excess dicyclohexyl carbodiimide is destroyed by the addition of 1.4 ml. of glacial acetic acid and stirring for 1 hour. The precipitated dicyclohexylurea is filtered off and the filtrate evaporated to dryness under reduced pressure at a bath temperature of 50° C. The residue, a yellowish oil, is dissolved in 200 ml. of ethyl acetate, the solution is extracted with 70 ml. of N-citric acid solution, 2×70 ml. of 2 N-sodium bicarbonate solution, and 2×70 ml. of saturated sodium chloride solution, then dried over solid sodium sulfate, and evaporated. The white, foamy, crude product is crystallized from ethyl acetate+petroleum ether, and dried at 50° C. under a high vacuum. 3.50 g.; melting point 138–142° C., after recrystallization, melting point 143–146° C.

Thin-layer chromatography over silica gel reveals the following R$f$ value:

R$f$ (benzene+acetone=1:1)=0.18

(6) BOC-D-Ser-Tyr-Gly-Nle-NH-NH$_2$ 3.30 g. of BOC-D-Ser-Tyr-Gly-Nle-OMe are dissolved in 18 ml. of absolute ethanol. The resulting clear, yellow solution is treated with 1.8 ml. of hydrazine hydrate, and the slightly turbid solution allowed to stand at room temperature for 24 hours. The product which crystallizes out is filtered off and washed with cold, absolute ethanol. It is dried at room temperature over concentrated sulfuric acid and then dried under a high vacuum: 1.4 g.; melting point =152–161° C. (decomposition).

From the mother liquor, another 0.5 g. can be obtained by concentration, filtration and drying, melting point 134:5–139° C. (decomposition).

After recrystallization from methanol+ethanol 1:1, the melting point is at 172–177° C. (decomposition).

The substance crystallizes from aqueous solvents with 1 mol of crystal water. It is unitary according to chromatography. The thin-layer chromatogram reveals the following R$f$ values on silica gel:

R$f$ (chloroform+methanol=1:1)=0.64
R$f$ (chloroform+methanol=8:2)=0.28

(7) BOC-D-Ser-Tyr-Gly-Nle-Glu(OtBu)-His-Phe-Arg-Try-Gly-OH 1.14 g. (2mmols) of BOC-D-Ser-Tyr-Gly-Nle-NHNH$_2$ are suspended in 10 ml. of dimethyl formamide, and while the suspension is stirred at 15° C. it is treated with 4 ml. of a 2 N-solution of hydrogen chloride in ethyl acetate and also with 0.23 g. (2.2 mmols) of tertiary butylnitrite. The reaction solution is stirred for another 10 minutes at −15° C. and then rendered slightly basic by the addition of 1 ml. of triethylamine. The solution of BOC-tetrapeptide-azide so obtained is added dropwise to a solution, cooled to −10° C., of 1.42 g. (1.6 mmols) of H-Glu(OtBu)-His-Phe-Arg-Try-Gly-OH in 30 ml. of dimethyl formamide and 1.5 ml. of water. The reaction mixture is stirred for 22 hours at 0° C., then treated with 100 ml. of water, and the precipitated amorphous product filtered off with suction, washed with dimethylformamide+water (1:5), water and acetonitrile, and then dried. After purification by recrystallization from aqueous acetonitrile, and equilibration with moist air, 1.44 g. (89) of pure BOC-decapeptide-tetrahydrate of melting point 235–240° C. are obtained: $[\alpha]_D^{20}=-22°$ (c.=1 in pyridine+water 1:1). The thin-layer chromatogram reveals the following Rf values of the substance:

Rf (52A)=0.35 (on alumina)
Rf (101)=0.65 (on silica gel)

(8) BOC-D-Ser-Tyr-Gly-Nle-Glu(OtBu)-His - Phe - Arg-Ary-Gly-Lys(BOC) - Pro - Val-Gly-Lys(BOC)-Lys-(BOC) - Lys(BOC) - Lys(BOC)-Pro-Val-Lys(BOC)-Val-Tyr-Pro-OtBu

A mixture of 400 milligrams of BOC-D-Ser-Tyr-Gly-Nle-Glu(OtBu)-His-Phe-Arg-Try-Gly-OH, 480 mg. of H-Lys(BOC) - Pro - Val - Gly-Lys(BOC)-Lys(BOC)-Lys-(BOC) - Lys(BOC)-Pro-Val-Lys(BOC)-Val-Tyr-Pro-OtBu, 100 mg. of N-hydroxysuccinimide, 20 ml. of dimethylformamide, 0.25 ml. of N-hydrochloric acid and 150 mg. of dicyclohexyl-carbodiimide is stirred for 2 hours at 50° C. Then another 50 mg. of N-hydroxysuccinimide and 100 mg. of dicyclohexyl-carbodiimide are added and the whole is stirred for 3 hours at 50° C. The whole mixture is poured into 300 ml. of ether, left to itself for 3 hours, the fine flaky precipitate filtered off and dried. For purification the product (926 mg.) is subjected to counter-current distribution. After 120 distribution stages in the solvent system methanol+buffer+chloroform+carbon tetrachloride (10:3:7:4) [buffer: 28.5 ml. of glacial acetic acid+ 19.25 g. of ammonium acetate in 960 ml. of water], the pure, protected tetracosapeptide is obtained from the fractions 36–42 (distribution number K=0.5). In thin-layer chromatography on silica gel plates, the protected peptide derivative shows the following Rf values:

Rf (43A)=0.60
Rf in the system chloroform+methanol (75.25)=0.33

(9) H-D-Ser-Tyr-Gly-Nle-Glu-His-Phe-Arg-Try-Gly-Lys-Pro - Val - Gly-Lys-Lys-Lys-Pro-Val-Lys-Val-Tyr-Pro-OH (acetate)

410 milligrams of BOC-D-Ser-Tyr-Gly-Nle-Glu(OtBu)-His - Phe - Arg - Try - Gly - Lys(BOC)-Pro-Val-Gly-Lys (BOC)-Lys(BOC)-Lys(BOC)-Lys(BOC)-Pro - Val - Lys-(BOC)-Val-Tyr-Pro(OtBu) are dissolved in 15 ml. of ice-cold trifluoracetic acid of 90% strength. The solution is heated to 28° C. and allowed to stand for 90 minutes. Then it is poured into ice-cold ether, the precipitate filtered off with suction, washed with ether, dried over sodium hydroxide, and the powder thus obtained (210 mg.) dissolved in acetic acid of 5% strength. The solution is poured on a weakly basic ion exchanger (acetate form, for instance Merck No. II) and the eluate lyophilized. The D-Ser$^1$-Gly$^3$-Nle$^4$-Lys$^{17,18}$-$\beta^{1-24}$-corticotropin shows in thin-layer chromatography on alumina plate the Rf values: Rf (52A)=0.32; Rf (101)=0.58.

In the test according to Desaulles and Rittel mentioned in Example 4, the compound is 5 to 10 times as active as $\beta^{1-24}$-corticotropin.

EXAMPLE 20

(1) BOC-D-Ser-Tyr-Gly-Nle-Glu(OtBu)-His-Phe - Arg-Try - Gly - Lys(BOC)-Pro-Val-Gly-Lys(BOC) - Lys-(BOC)-Lys(BOC)-Lys(BOC)-NH$_2$

A mixture of 375 mg. of BOC-D-Ser-Tyr-Gly-Nle-Glu (OtBu)-His-Phe-Arg-Try-Gly-OH, 20 ml. of dimethylformamide, 0.5 ml. of N-hydrochloric acid and 400 mg. of H-Lys(BOC)-Pro - Val - Gly-Lys(BOC)-Lys(BOC)-Lys(BOC)-Lys(BOC)-NH$_2$ is stirred at 50° C. until the whole is dissolved (30 minutes). Then 100 mg. of N-hydroxysuccinimide and 150 mg. of dicyclohexyl-carbodiimide is added, stirred for 2 hours at 50° C., another 50 mg. of N-hydroxysuccinimide and 100 mg. of dicyclohexyl-carbodiimide added and stirred for a further 3 hours at 50° C., thereafter cooled to 0° C., the precipitate separated off by centrifugation and the solution poured into 300 ml. of ether. A fine, flaky precipitate is formed which is filtered off with suction, washed with ether and dried under reduced pressure at 35° C.

For purification it is subjected to counter-current distribution as described in Example 19. The pure protected octadecapeptide amide is obtained from Fractions 54–60 (K=0.9). It exhibits in thin-layer chromatography on silica gel plates an Rf value of 0.25 in the system chloroform+methanol (75:25), and an Rf (43A) value of 0.50.

(2) H-D-Ser-Tyr-Gly-Nle-Glu-His-Phe-Arg-Try-Gly-Lys-Pro-Val-Gly-Lys-Lys-Lys-Lys-NH$_2$ 260 mg. of BOC-D-Ser-Tyr-Gly-Nle-Glu(OtBu)-His-Phe-Arg-Try-Gly-Lys(BOC)-Pro-Val - Gly - Lys(BOC)-Lys(BOC)-Lys(BOC)-NH$_2$ are dissolved in 10 ml. of trifluoracetic acid of 90% strength. The solution is warmed to 26° C., allowed to stand for two hours and then poured into 320 ml. of ice-cold ether. The flaky precipitate is filtered with suction, washed with ice-cold ether and dried under reduced pressure at 30° C. The residue is dissolved in acetic acid of 5% strength and the solution poured on a weakly basic ion exchanger, acetate form (for instance Merck No. II). After complete elution the eluate is lyophilized. The D-Ser$^1$-Gly$^3$-Nle$^4$-Lys$^{17,18}$-$\beta^{1-18}$-corticotropin-Lys$^{18}$-amide shows in thin-layer chromatography on alumina an Rf (52A) value of 0.15 and Rf=0.12 in the system n-butanol-pyridine-glacial acetic acid-water (42:24:4:30).

In the test according to Desaulles and Rittle mentioned in Example 4, the compound is 3 to 5 times as active as $\beta^{1-24}$-corticotropin.

EXAMPLE 21

A dry ampoule is prepared from the following ingredients:

| | Mg. |
|---|---|
| D-Ser$^1$-$\beta^{1-24}$-corticotropin hexaacetate | 0.5 |
| ZnSO$_4$.7H$_2$O | 1.23 |
| Na$_3$PO$_4$.12H$_2$O | 1.38 |
| Mannitol | 40.0 |

Before use, the contents of the dry vial are mixed with 1 ml. of distilled water in a solution ampoule, to form a suspension having a pH of 7.6.

EXAMPLE 22

A dry ampoule is prepared from the following ingredients:

| | Mg. |
|---|---|
| D-Ser$^1$-$\beta^{1-24}$-corticotropin hexaacetate | 0.5 |
| ZnSO$_4$.7H$_2$O | 1.23 |
| Mannitol | 40.0 | and a solution ampoule containing a solution of

| | Mg. |
|---|---|
| Na$_3$PO$_4$.12H$_2$O | 1.38 |
| Versene—Fe—3 | 0.1 |

In distilled water to make 1.0 ml.

Before use the contents of the two ampoules are mixed; the resulting suspension has a pH of 7.6.

EXAMPLE 23

A solution ampoule is prepared from the following ingredients:

| | Mg. |
|---|---|
| D-Ser$^1$-$\beta^{1-24}$-corticotropin hexaacetate | 0.5 |
| Gelatin | 280.0 |
| Phenol | 5.0 |

Distilled water to make 1.0 ml.

EXAMPLE 24

An aqueous solution of D-Ser$^1$-$\beta^{1-24}$-corticotropin hexaacetate is filtered sterile and mixed under aseptic conditions with sodium polyphloretin phosphate and sodium chloride, filled into vials and lyophilized, so that a dry vial is obtained which contains

| | Mg. |
|---|---|
| D-Ser$^1$-β$^{1-24}$-corticotropin hexaacetate | 0.5 |
| Sodium polyphloretin phosphate (86.5% strength) | 23.20 |
| Sodium chloride | 12.28 |

Before use the content of the dry vial is mixed with 2 ml. of distilled water contained in a solution ampoule.

EXAMPLE 25

A suspension is prepared from the following components:

| | Mg. |
|---|---|
| D-Ser$^1$-β$^{1-24}$-corticotropin hexaacetate | 1.0 |
| ZnCl$_2$ | 10.5 |
| Na$_2$HPO$_4$ | 1.7 |
| Benzyl alcohol | 17.0 |
| NaCl | 2.5 |

NaOH to attain a pH value of 8.0.
Distilled water to make up 2 ml.

EXAMPLE 26

2.0 g. of poly-L-glutamic acid having an average molecular weight of about 11000 are dissolved in about 5.7 ml. of 10% sodium hydroxide solution so that the pH of the solution amounts of 7.4. In this solution are dissolved 5.0 mg. of D-Seryl-L-tyrosyl-L-seryl-L-methionyl-L-glutamyl-L-histidyl - L - phenylalanyl-L-arginyl-L-tryptophyl - glycyl-L-lysyl-L-prolyl-L-valyl-glycyl-L-lysyl-L-lysyl-L-arginyl-L-arginyl - L - pyrolyl-L-valyl-L-lysyl-L-valyl-L-tyrosyl-L-proline-hexaacetate (D-Ser$^1$-β$^{1-24}$-corticotropine hexaacetate) and 0.2 mg. of merthiolate and the solution made up to 10 ml. with distilled water. The solution is filtered under sterile conditions. It contains per ml.:

| | Mg. |
|---|---|
| D-Ser-$^1$-β$^{1-24}$corticotropin | 0.5 |
| Poly-L-glutamic acid | 200.0 |
| Merthiolate | 0.02 |

Sodium hydroxide solution up to pH 7.4.
Distilled water to make up 1.0 ml.

EXAMPLE 27

2.0 g. of poly-L-glutamic acid are dissolved in 5.7 ml. of 10% sodium hydroxide solution so that the pH of the solution is 7.4. In the resulting solution are dissolved 5.0 mg. of D-Ser$^1$-β$^{1-24}$-corticotropin hexaacetate and 0.2 mg. of merthiolate. 1 ml. of a hydrochloric acid-zinc chloride solution (pH 2.8) containing 5.2 mg. of zinc chloride per ml. is added. The pH is adjusted to 7.8 with sodium hydroxide solution and made up to a volume of 10 ml. with distilled water.

EXAMPLE 28

2.0 g. of poly-L-glutamic acid are dissolved in about 5.7 ml. of a 10% sodium hydroxide solution so that the pH of the solution is 7.4. In this solution are dissolved 5.0 mg. of D-Ser$^1$-β$^{1-24}$-corticotropin hexaacetate and 0.2 mg. of merthiolate. There are then added 1 ml. of a hydrochloric acid solution (pH 2.8) containing 5.2 mg. of zinc chloride, and 0.85 mg. of (anhydrous) disodium phosphate. The pH is adjusted to 7.8 with sodium hydroxide solution. The volume is made up to 10 ml. with water.

EXAMPLE 29

A suspension is prepared with the following ingredients:

| | Mg. |
|---|---|
| D-Ser$^1$-β$^{1-24}$-corticotropin hexaacetate | 1.0 |
| ZnCl$_2$ | 5.25 |
| Na$_2$HPO$_4$·2H$_2$O | 1.05 |
| NaCl | 2.0 |
| Benzyl alcohol | 10.0 |

NaOH ad PH 8.3.
Distilled water to make up 1.0 ml.

EXAMPLE 30

A suspension is prepared with the following ingredients:

| | Mg. |
|---|---|
| D-Ser$^1$-β$^{1-24}$-corticotropine hexaacetate | 1.0 |
| ZnCl$_2$ | 6.30 |
| Na$_2$HPO$_4$·2H$_2$O | 1.26 |
| NaCl | 1.5 |
| Benzyl alcohol | 10.0 |

NaOH ad PH 8.3.
Distilled water to make up 1.0 ml.

EXAMPLE 31

A hydrochloric acid solution of 0.5 mg. of D-Ser$^1$-β$^{1-24}$-corticotropine hexaacetate, 5.25 mg. of ZnCl$_2$, 1.05 mg. of Na$_2$HPO$_4$·2H$_2$O and 2.0 mg. of NaCl having a pH value of 3.0 is prepared; the solution is added to 0.5 ml. of an aqueous solution of 10 mg. of benzyl alcohol containing sufficient sodium hydroxide solution to give a solution having a pH value of 8.3.

EXAMPLE 32

5 mg. of poly-L-glutamic acid of average molecular weight 39600 are dissolved in 5 ml. of 0.1 N sodium hydroxide solution. The solution is filtered, a solution of 2.5 mg. of D-Ser$^1$-β$^{1-24}$-corticotropine hexaacetate is added, the reaction mixture acidified with acetic acid or hydrochloric acid to pH 4 and then made up to 10 ml. with water. A poly-L-glutamic acid D-Ser$^1$-β$^{1-24}$-corticotropine complex precipitates in a finely divided form. The suspension contains per ml. 0.5 mg. of poly-L-glutamic acid and 0.25 mg. of D-Ser$^1$-β$^{1-24}$-corticotropine as complex compound.

EXAMPLE 33

20 g. of poly-L-glutamic acid with an average molecular weight of about 39600 are dissolved in about 5.7 ml. of sodium hydroxide solution of 10% strength, so that the pH of the solution is 7.4. 4.0 mg. of D-Ser$^1$-β$^{1-24}$-corticotropine hexaacetate and 0.2 mg. of merthiolate are then dissolved in the above solution and made up to 100 ml. with distilled water. The solution is filtered under sterile conditions. It contains per mil.:

| | Mg. |
|---|---|
| D-Ser$^1$-β$^{1-24}$-corticotropine hexaacetate | 4.0 |
| Poly-L-glutamic acid | 200.0 |
| Merthiolate | 0.02 |

Sodium hydroxide solution to pH 7.4.
Distilled water to make up 1.0 ml.

EXAMPLE 34

A suspension is prepared with the following ingredients:

| | Mg. |
|---|---|
| D-Ser$^1$ - Lys$^{17,18}$-β$^{1-18}$ - corticortropin-Lys$^{18}$-amide hexaacetate | 0.10 |
| ZnCl$_2$ | 5.25 |
| Na$_2$HPO$_4$·2H$_2$O | 1.05 |
| NaCl | 2.00 |
| Benzyl alcohol | 10.0 |

0.6 N NaOH ad pH 8.4.
Distilled water to make up 1.0 ml.

EXAMPLE 35

In the same manner as that described in Examples 21 to 34 preparations are prepared that contain as adrenocorticotropically active peptide:

D-Ser$^1$-β$^{1-16}$-corticotropine-Lys$^{16}$-amide,
D-Ser$^1$-Gly$^3$-Nle$^4$-Lys$^{17,18}$-corticotropine-Lys$^{18}$-amide,
D-Ser$^1$-Orn$^{17,18}$-β$^{1-18}$-corticotropine-Orn$^{18}$-amide,
D-Ser$^1$-β$^{1-18}$-corticotropine-Arg$^{18}$-amide,
D-Ser$^1$-Lys$^{17,18}$-β$^{1-18}$-corticotropine-Lys$^{18}$-amide,
D-Ser$^1$-Gly$^3$-Lys$^{17,18}$-β$^{1-18}$-corticotropine-Lys$^{18}$-amide,
D-Ser$^1$-Nle$^4$-Lys$^{17,18}$-β$^{1-18}$-corticotropine-Lys-$^{18}$-amide,
D-Ser$^1$-Lys$^{17,18}$-β$^{1-19}$-corticotropine-Pro$^{19}$-amide, D-Ser¹-β¹⁻¹⁹-corticotropine,
D-Ser¹-β¹⁻¹⁹-corticotropine-Pro¹⁹-amide,
D-Ser¹-Nle⁴-Lys¹⁷,¹⁸-Val¹⁹-β¹⁻¹⁹-corticotropine-Val¹⁹-amide,
D-Ser¹-β¹⁻²⁰-corticotropine-Val²⁰-amide,
D-Ser¹-α-aminobutyryl⁴-Glu(NH₂)⁵-β¹⁻²⁰-corticotropine-Val²⁰-amide,
D-Ser¹-α-aminobutyryl-β¹⁻²⁰-corticotropine-Val²⁰-amide,
D-Ser¹-β¹⁻²¹-corticotropine,
D-Ser¹-Lys¹⁷,¹⁸-β¹⁻²²-corticotropine-Val²²-amide,
D-Ser¹-β¹⁻²³-corticotropine,
D-Ser¹-β¹⁻²³-corticotropine-Tyr²³-amide,
D-Ser¹-Phe²-β¹⁻²³-corticotropine-Tyr²³-amide,
D-Ser¹-Ala³-β¹⁻²³-corticotropine-Tyr²³-amide,
D-Ser¹-Glu(NH₂)⁵-β¹⁻²⁴-corticotropine,
D-Ser¹-Gly³-β¹⁻²⁴-corticotropine-Pro²⁴-amide,
D-Ser¹-Orn¹⁷,¹⁸-β¹⁻²⁴-corticotropine,
D-Ser¹-Lys¹⁷,¹⁸-β¹⁻²⁴-corticotropine,
D-Ser¹-Lys¹⁷,¹⁸-β¹⁻²⁴-corticotropine-Pro²⁴-amide,
D-Ser¹-Nle⁴-Orn¹⁷,¹⁸-β¹⁻²⁴-corticotropine-Pro²⁴-amide,
D-Thre¹-β¹⁻²⁴-corticotropine,
D-Ala¹-β¹⁻²⁴-corticotropine,
D-Ser¹-Gly³-Lys¹⁷,¹⁸-β¹⁻²⁴-corticotropine,
D-Ser¹-Gly³-Orn¹⁷,¹⁸-β¹⁻²⁴-corticotropine,
D-Ser¹-Gly³-Lys¹⁷,¹⁸-β¹⁻²⁴-corticotropine-Pro²⁴-amide,
D-Ser¹-Nle⁴-Lys¹⁷,¹⁸-β¹⁻²⁴-corticotropine-Pro²⁴-amide,
D-Ser¹-Nle⁴-Lys¹⁷,¹⁸-β¹⁻²⁴-corticotropine,
D-Ser¹-Gly³-β¹⁻²⁴-corticotropine,
D-Ser¹-Gly³-Nle⁴-Lys¹⁷,¹⁸-β¹⁻²⁴-corticotropine,
D-Ser¹-Nle⁴-β¹⁻²⁵-corticotropine-Asp²⁵-amide,
D-Ser¹-Gly³-Nle⁴-Lys¹⁷,¹⁸-Val²⁵-β¹⁻²⁵-corticotropine-Val²⁵-amide,
D-Ser¹-β¹⁻²⁶-corticotropine,
D-Ser¹-β¹⁻²⁸-corticotropine,
D-Ser¹-β¹⁻³⁰-corticotropine,
D-Ser¹-β¹⁻³¹-corticotropine,
D-Ser¹-β¹⁻³⁹-corticotropine or
D-Ser¹-Lys¹⁷,¹⁸-β¹⁻³⁹-corticotropine.

What is claimed is:

1. A member selected from the group consisting of (1) ACTH-active peptides having towards the N-terminus a complete ACTH sequence and (2) said ACTH-active peptides in which at least one member selected from the group consisting of typrosyl², seryl³, methionyl⁴, glutamyl⁵, arginyl¹⁷,¹⁸, prolyl¹⁹ and asparagyl²⁵-radicals is replaced by phenylalanyl², glycyl³, a-lower alkyl-a-amino-acetyl⁴ or α-aminobutyryl⁴, gluaminyl⁵, ornithyl¹⁷,¹⁸ or lysyl¹⁷,¹⁸, valyl¹⁹ and valyl²⁵-radicals, each of said ACTH-active peptides, containing as the first aminoacid a member selected from the group consisting of D-serine, D-alanine, D-proline and D-threonine with all of the remaining optically active amino acid moieties being of the L-configuration, and their N-unsubstituted C-terminal amides and therapeutically acceptable acid addition salts and therapeutically acceptable complexes of these compounds.

2. A compound as claimed in claim 1 and selected from the group consisting of (1) ACTH-active peptides having a chain length of 16-39 aminoacids and having towards the N-terminus a complete ACTH sequence and (2) said ACTH-active peptides in which at least one member selected from the group consisting of tyrosyl², seryl³, methionyl⁴, glutamyl⁵, arginyl¹⁷,¹⁸, prolyl¹⁹ and asparginyl²⁵-radicals is replaced by phenylalanyl², glycyl³, a lower alkyl-a-amino-actyl¹⁴ or α-aminobutyryl⁴, glutaminyl⁵, ornithyl¹⁷,¹⁸ or lysyl¹⁷,¹⁸, valyl¹⁹ and valyl²⁵-radicals, each of said ACTH-active peptides, containing as the first aminoacid D-serine with all of the remaining optically active amino acid moieties being of the L-configuration, and their N-unsubstituted C-terminal amides and therapeutically acceptable acid addition salts and therapeutically acceptable complexes of these compounds.

3. A compound as claimed in claim 1 and selected from the group consisting of peptides having a chain length of 18-25 aminoacids which differ from the first 18-25 aminoacids of ACTH only in that the first aminoacid is D-serine, their N-unsubstituted C-terminal amides and therapeutically acceptable acid addition salts and therapeutically acceptable complexes of these compounds.

4. A compound as claimed in Claim 1 and selected from the group consisting of peptides having a chain length of 18-25 aminoacids which differ from the sequence of the first 18-25 aminoacids of β-corticotropin only in that the first aminoacid is D-serine and that at least one member selected from the group consisting of the seryl³, methionyl⁴, glutamyl⁵, arginyl¹⁷,¹⁸, prolyl¹⁹ and asparagyl²⁵-radicals is replaced by glycyl³, a lower alkyl-a-amino-acetyl⁴ or α-aminobutyryl⁴, glutaminyl⁵, ornithyl¹⁷,¹⁸ or lysyl¹⁷,¹⁸, valyl¹⁹ and valyl²⁵-radicals and their N-unsubstituted C-terminal amides and therapeutically acceptable acid addition salts and therepeutically acceptable complexes of these compounds.

5. A compound as claimed in claim 1 and selected from the group consisting of peptides having a chain length of 18-25 aminoacids which differ from the sequence of the first 18-25 aminoacids of β-corticotropin only in that the first aminoacid is D-serine and that the arginyl¹⁷,¹⁸-radicals are replaced by lysyl radicals, and their N-unsubstituted C-terminal amides and therapeutically acceptable acid addition salts and therapeutically acceptable complexes of these compounds.

6. A compound as claimed in claim 1 and selected from the group consisting of peptides having a chain length of 18-25 aminoacids which differ from the sequence of the first 18-25 aminoacids of β-corticotropin only in that the first aminoacid is D-serine and that the seryl³-radical is replaced by glycyl and the arginyl¹⁷,¹⁸-radicals are replaced by lysyl radicals, and their N-unsubstituted C-terminal amides and therapeutically acceptable acid addition salts and therapeutically acceptable complexes of these compounds.

7. A compound as claimed in claim 1 and selected from the group consisting of peptides having a chain length of 18-25 aminoacids which differ from the sequence of β-corticotropin only in that the first aminoacid is D-serine and that the seryl³-radical is replaced by the glycyl radical, and their N-unsubstituted C-terminal amides and therapeutically acceptable acid addition salts and therapeutically acceptable complexes of these compounds.

8. A compound as claimed in claim 1 and selected from the group consisting of the tetracosapeptide of the formula D-seryl-L-tyrosyl-glycyl-L-methionyl-L-glutamyl-L-histidyl-L-phenylalanyl-L-arginyl-L - tryptophyl-glycyl-L-lysyl-L-prolyl-L-valyl - glycyl-L-lysyl-L-lysyl-L-arginyl-L - arginyl - L-prolyl-L-valyl-L-lysyl-L-valyl-L-tyrosyl-L-proline and the corresponding compound containing the glutamine radical instead of the glutamyl radical, their N-unsubstituted C-terminal amides and therapeutically acceptable acid addition salts of these compounds, and therapeutically acceptable complexes of these compounds having a protracted activity and being selected from the group consisting of complexes with complex-forming metals; with polyphosphates; with gelatine; with polyphloretin phosphate; with polyglutamic acid.

9. A compound as claimed in claim 1 and selected from the group consisting of the nonadecapeptide amide D-seryl-L-tyrosyl - L-seryl - L-methionyl-L-glutamyl-L-histidyl-L-phenylalanyl - L-arginyl-L - tryptophyl-glycyl - L-lysyl-L-prolyl-L-valyl - glycyl-L-lysyl-L-lysyl-L-lysyl-L - lysyl-L-valine-amide and the corresponding compound containing the norleucyl radical instead of the methionyl radical, their therapeutically acceptable acid addition salts and therapeutically acceptable complexes of these compounds having a protracted activity and being selected from the group consisting of complexes with complex-forming metals; with polyphosphates; with polyphloretin phosphate; with gelatine; with polyglutamic acid.

10. A compound as claimed in claim 1 and selected from the group consisting of the tetracosapeptide of the formula D-seryl-L-tyrosyl-glycyl-L-methionyl-L-glutamyl-L-histidyl - L-phenylalanyl-L-arginyl-L-tryptophyl-glycyl- L-lysyl - L-prolyl-L-valyl-glycyl-L-lysyl-L-lysyl-L-lysyl-L-lysyl-L-prolyl-L-valyl-L-lysyl-L-valyl-L - tyrosyl-L-proline and the corresponding compound containing the glutamine radical instead of the glutamyl radical, their N-unsubstituted C-terminal amides and therapeutically acceptable acid addition salts of these compounds and therapeutically acceptable complexes of these compounds having a protracted activity and being selected from the group consisting of complexes with complex-forming metals; with polyphosphates; with gelatine; with polyphloretin phosphate; with polyglutamic acid.

11. A compound as claimed in claim 1 and selected from the group consisting of the tetracosapeptide of the formula D-seryl-L-tyrosyl-L-seryl-L-norleucyl-L-glutamyl-L-histidyl-L-phenylalanyl-L-arginyl-L - tryptophyl-glycyl-L-lysyl-L-prolyl-L-valyl-glycyl-L-lysyl-L-lysyl-L - lysyl-L-lysyl-L-prolyl-L-valyl - lysyl-L-valyl-L-tyrosyl-L-proline and the corresponding compound containing the glutamine radical instead of the glutamyl radical, and their N-unsubstituted C-terminal amides and therapeutically acceptable acid addition salts of these compounds and therapeutically acceptable complexes of these compounds having a protracted activity and being selected from the group consisting of complexes with complex-forming metals; with polyphosphates; with gelatine; with polyphloretin phosphate; with polyglutamic acid.

12. A compound as claimed in claim 1 and selected from the group consisting of the tetracosapeptide of the formula D - seryl - L-tyrosyl-L-seryl-L-methionyl-L-glutamyl - L-histidyl - L-phenylalanyl-L-arginyl-L-tryptophyl-glycyl - L - lysyl-L-prolyl-L-valyl-glycyl-L-lysyl-L-lysyl-L-ornithyl - L-ornithyl - L-prolyl-L-valyl-L - lysyl-valyl-L-tyrosyl-L-proline and the corresponding compound containing the glutamine radical instead of the glutamyl radical, and their N-unsubstituted C-terminal amides and therapeutically acceptable acid addition salts of these compounds and therapeutically acceptable complexes of these compounds having a protracted activity and being selected from the group consisting of complexes with complex-forming metals; with polyphosphates; with gelatine; with polyphloretin phosphate, with polyglutamic acid.

13. A compound as claimed in claim 1 and selected from the group consisting of the tetracosapeptide of the formula D-seryl - L-tyrosyl-glycyl-L-norleucyl-L-glutamyl-L-histidyl-L-phenylalanyl - L-arginyl-L-tryptophyl-glycyl-L-lysyl-L-prolyl-L-valyl-glycyl-L-lysyl-L - lysyl-L-lysyl-L-lysyl - L-prolyl-L-valyl-L-lysyl-L-valyl-L-tyrosyl-L-proline and the corresponding compound containing the glutamine radical instead of the glutamyl radical, and the N-unsubstituted C-terminal amides and therapeutically acceptable acid addition salts of these compounds and therapeutically acceptable complexes of these compounds having a protracted activity and being selected from the group consisting of complexes with complex-forming metals; with polyphosphates; with gelatine; with polyphloretin phosphate, with polyglutamic acid.

14. A compound as claimed in claim 1 and selected from the group consisting of the octadecapeptide amide of the formula D-seryl-L-tyrosyl-L-seryl-L-norleucyl-L-glutamyl-L-histidyl - L-phenylalanyl-L-arginyl-L - tryptophyl-glycyl-L-lysyl - L-prolyl-L-valyl-glycyl-L-lysyl - L-lysyl-L-lysyl-L-lysine amide and the corresponding compound containing the glutamine radical instead of the glutamyl radical, and their therapeutically acceptable acid addition salts and therapeutically acceptable complexes of these compounds having a protracted activity and being selected from the group consisting of complexes with complex-forming metals; with polyphosphates; with gelatine; with polyphloretin phosphate; with polyglutamic acid.

15. A compound as claimed in claim 1 and selected from the group consisting of the octadecapeptide amide of the formula D-seryl-L-tyrosyl-glycyl-L-norleucyl - L-glutamyl - L-histidyl-L-phenylalanyl-L-arginyl-L - tryptophyl-glycyl-L - lysyl-L-prolyl-L-valyl-glycyl - L-lysyl-L-lysyl-L-lysyl-L-lysine amide and the corresponding compound containing the glutamine radical instead of the glutamyl radical, and therapeutically acceptable acid addition salts and therapeutically acceptable complexes of these compounds having a protracted activity and being selected from the group consisting of complexes with complex-forming metals; with polyphosphates; with gelatine; with polyphloretin phosphate; with polyglutamic acid.

16. A compound as claimed in claim 1 and selected from the group consisting of D-Ser$^1$-$\beta^{1-39}$-cortocotropine and the corresponding compound containing the glutamine radical instead of the glutamyl$^5$-radical, and their N-unsubstituted C-terminal amides and therapeutically acceptable acid addition salts of these compounds and therapeutically acceptable complexes of these compounds having a protracted activity and being selected from the group consisting of complexes with complex-forming metals; with polyphosphates; with gelatine; with polyphloretin phosphate; with polyglutamic acid.

17. A compound as claimed in claim 1 and selected from the group consisting of D-seryl-L-tyrosyl-L-seryl-L-methionyl - L-glutamyl-L-histidyl-L-phenylalanyl-L-arginyl - L - tryptophylglycyl-L-lysyl-L-prolyl-L-valyl-glycyl-L-lysyl - L - lysyl-L-lysyl-L-prolyl-L-valyl-L-lysyl-L-valyl-L-tyrosyl-L-proline and the corresponding compound containing the glutamine radical instead of the glutamyl radical, their N-unsubstituted C-terminal amides and therapeutically acceptable acid addition salts of these compounds and therapeutically acceptable complexes of these compounds having a protracted activity and being selected from the group consisting of complexes with complex-forming metals; with polyphosphates; with gelatine; with polyphloretin phosphate; with polyglutamic acid.

18. A compound as claimed in claim 1 and selected from the group consisting of D-seryl-L-tyrosyl-L-seryl-L-methionyl - L-glutamyl-L-histidyl-L-phenylalanyl-L-arginyl - L - tryptophylglycyl-L-lysyl-L-prolyl-L-valyl-glycyl-L-lysyl-L-lysyl-L-lysyl-L-lysine-amide and the corresponding compound containing the glutamine radical instead of the glutamyl radical, and therapeutically acceptable acid addition salts of these compounds and therapeutically acceptable complexes of these compounds having a protracted activity and being selected from the group consisting of complexes with complex-forming metals; with polyphosphates; with gelatine; with polyphloretin phosphate; with polyglutamic acid.

19. A compound as claimed in claim 1 and selected from the group consisting of D-seryl-L-tyrosyl-glycyl-L-methionyl - L-glutamyl-L-histidyl-L-phenylalanyl-L-arginyl - L - tryptophylglycyl-L-lysyl-L-prolyl-L-valyl-glycyl-L-lysyl-L-lysyl-L-lysyl-L-lysine-amide and the corresponding compound containing the glutamine radical instead of the glutamyl radical, their therapeutically acceptable acid addition salts, and therapeutically acceptable complexes of these compounds having a protracted activity and being selected from the group consisting of complexes with complex-forming metals; with polyphosphates; with gelatine; with polyphloretin phosphate; with polyglutamic acid.

20. Complexes of peptides as claimed in claim 1 with a member selected from the group consisting of zinc phosphate, zinc pyrophosphate and zinc hydroxide.

21. Complexes of the tetracosapeptide as claimed in claim 9 with a member selected from the group consisting of zinc phosphate, zinc pyrophosphate and zinc hydroxide.

22. Complexes of the tetracosapeptide as claimed in claim 11 with a member selected from the group consisting of zinc phosphate, zinc pyrophosphate and zinc hydroxide.

23. Complexes of the tetracosapeptide as claimed in claim 12 with a member selected from the group consisting of zinc phosphate, zinc pyrophosphate and zinc hydroxide.

24. Complexes of the peptide as claimed in claim 14 with a member selected from the group consisting of zinc phosphate, zinc pyrophosphate and zinc hydroxide.

25. Complexes of the tetracosapeptide as claimed in claim 17 with a member selected from the group consisting of zinc phosphate, zinc pyrophosphate and zinc hydroxide.

26. Complexes of the peptide as claimed in claim 18 with a member selected from the group consisting of zinc phosphate, zinc pyrophosphate and zinc hydroxide.

27. Complexes of the peptide as claimed in claim 19 with a member selected from the group consisting of zinc phosphate, zinc pyrophosphate and zinc hydroxide.

28. An A.C.T.H. active peptide having D-Serine in the N-terminal position selected from the group consisting of D - Seryl-L-Tyrosyl-L-Seryl-L-W-L-X-L-Histidyl-L-Phenylalanyl - L - Arginyl - L-Tryptophanyl-Glycyl-L-Lysyl-L-Prolyl - L-Valyl-Glycyl-L-Lysyl-L-Lysyl-L-Y-L-Y-L-Prolyl-L-Valyl-L-Lysyl-L-Valyl-L-Tyrosyl (-L-Prolyl)$_m$ (-L-Z)$_n$-OH and its C-terminal unsubstituted amide, wherein W is Methionyl or $\alpha$-lower alkyl-$\alpha$-aminoacetyl, X is Glutamyl or Glutaminyl, Y is Arginyl or Lysyl, Z is naturally occurring L-$\alpha$-amino acid and $m$ and $n$ are independently 0 or 1 with the proviso that when $m$ is 0, $n$ must be 0.

29. A compound as claimed in claim 1, which is D-seryl - L - tyrosyl-L-seryl-L-methionyl-L-glutamyl-L-histidyl-L - phenylalanyl-L-arginyl-L-tryptophyl-glycyl-L-lysyl-L-propyl - L-valyl-glycyl-L-lysyl-L-lysyl-L-lysyl-L-lysine-amide, and its therapeutically acceptable acid addition salts.

References Cited

FOREIGN PATENTS 872,332   7/1961   England _____ 260—112.5

OTHER REFERENCES

Experientia No. 22 (1966), pp. 526-530 by Boissonnas et al. II.

J.A.C.S. 83 (1961), 2286-89.

ELBERT L. ROBERTS, Primary Examiner

U.S. Cl. X.R.

424—177

PO-1050
(5/69)

CASE 5503/1-3/5805/5806/6013/
6028/6086/6099/
6225/Cip/2

UNITED STATES PATENT OFFICE
CERTIFICATE OF CORRECTION

Patent No. 3,792,033                   Dated February 12, 1974

Inventor(s) BEAT ISELIN ET AL

It is certified that error appears in the above-identified patent and that said Letters Patent are hereby corrected as shown below:

Column 1, line 32, before "ACTH" delete "to" and substitute --- of ---;  line 67, after "3,228,926]" insert --- ) ---.

Column 2, line 13, delete "Biphys," and substitute --- Biophys. ---;  line 20, before the second "aminoacid" delete "in" and substitute --- an ---;  line 65, after "$\beta^{1-16}$-" insert --- corticotropin, $\beta^{1-17}$-corticotropin, $\beta^{1-17}$-corticotropin- ---;  line 69, after "$Val^{20}$-" delete "amile" and substitute --- amide ---.

Column 4, line 4, delete "ntramuscular" and substitute --- intramuscular";  same line, before "D" insert --- of ---;  line 71, delete "1-22" and substitute --- 11-22 ---.

Column 6, line 8, delete "hydroxbenzoic" and substitute --- hydroxybenzoic ---;  lines 8-9, delete "salicyclic" and substitute --- salicylic ---.

Column 11, line 12, delete "for" and substitute --- at ---;  line 29, delete "(=9600)" and substitute --- ($\varepsilon$ = 9600) ---.

Column 12, line 66, delete "Glue" and substitute --- Glu ---.

Column 15, line 51, delete "40" and substitute --- 48 ---.

Column 16, line 5, delete "10%" and substitute --- 100% ---;  line 26, delete "2.98" and substitute --- 2.38 ---.

Column 17, line 37, after "70" delete "ml" and substitute --- mg ---;  line 53, delete "Glut" and substitute --- Glu ---;  line 72, before "Orn" (first occurrence) insert --- Lys- ---.

Column 18, line 72, delete "Pre" and substitute --- Phe ---;  last line, delete "Phen" and substitute --- Phe ---.

Page 1 of 4

CASE 5503/1-3/5805/5806/6013/6028/6086/6099/6225/Cip/2

PO-1050 (5/69)

UNITED STATES PATENT OFFICE
CERTIFICATE OF CORRECTION

Patent No. 3,792,033      Dated February 12, 1974

Inventor(s) BEAT ISELIN ET AL

It is certified that error appears in the above-identified patent and that said Letters Patent are hereby corrected as shown below:

Column 19, line 39, delete "$\beta^{1,6}$" and substitute --- $\beta^{1\text{-}16}$ ---; line 40, delete "$\beta_5\text{-}6$" and substitute --- $\beta^{1\text{-}16}$ ---.

Column 20, line 2, before "Arg" (first occurrence) insert --- Lys ---; last line, delete "any" and substitute --- an ---.

Column 21, line 36, delete "(101:0.61" and substitute --- (52) 0.60 ---.

Column 23, line 9, delete "nitrate" and substitute --- nitrite ---.

Column 24, line 66, delete "chmatographically" and substitute --- chromatographically ---.

Column 25, line 62, delete "filtrated" and substitute --- filtered ---.

Column 26, line 2, before "Pro" insert --- Lys(BOC)- ---; line 17, after "solvent" insert --- system ---; delete lines 32-34 and substitute ---

(8) H-D-Ser-Tyr-Ser-Met-Glu-His-Phe-Arg-Try-Gly-Lys-Pro-Val-Gly-Lys-Lys-Lys-Lys-Pro-Val Lys-Val-Tyr-Pro-OH (D-Ser$^1$-Lys$^{17,18}$-$\beta^{1\text{-}24}$-corticotropin) ---.

Column 27, line 22, delete "to" and substitute --- at ---.

Column 28, line 16, after "buffer" insert --- + ---; line 19, before "each" delete "of"; line 22, delete "$\ell_{max}$" and substitute --- $r_{max}$ ---; line 26, before "about" delete "to" and substitute --- at ---; line 63, before "Met" insert --- Gly- ---.

Column 29, line 61, after "ml" delete "of" and substitute --- and ---.

PO-1050
(5/69)

CASE 5503/1-3/5805/5806/6013/
6028/6086/6099/
6225/Cip/2

UNITED STATES PATENT OFFICE
CERTIFICATE OF CORRECTION

Patent No. 3,792,033  Dated February 12, 1974

Inventor(s) BEAT ISELIN ET AL

It is certified that error appears in the above-identified patent and that said Letters Patent are hereby corrected as shown below:

Column 30, line 28, after "100" delete "m" and substitute --- ml ---.

Column 32, line 59, delete "Try" and substitute --- Tyr ---; line 64, delete "Try" and substitute --- Tyr ---; line 73, delete "Try" and substitute --- Tyr ---.

Column 34, line 9, delete "15" and substitute --- 1.5 ---; line 27, delete "earbodiimide" and substitute --- carbodiimide ---.

Column 36, line 30, delete "(100" and substitute --- (10) ---.

Column 37, last line, delete "600" and substitute --- 60 ---.

Column 38, line 47, delete "or" and substitute --- For ---.

Column 42, line 11, before "Glu" delete "(".

Column 43, line 3, delete "β-1-18" and substitute --- $\beta^{1-18}$ ---; line 40, before "NH" insert --- Lys(BOC)- ---.

Column 44, line 16, delete "Cal" and substitute --- Val ---.

Column 46, line 11, before "15" delete "in"; line 47, delete "134:5" and substitute --- 134.5 ---.

Column 47, line 11, delete "Ary" and substitute --- Try ---.

Column 49, line 26, before "7.4" delete "of" and substitute --- to ---; line 30, delete "pyrolyl" and substitute --- prolyl ---.

Column 50, line 36, delete "20" and substitute --- 2.0 ---; line 41, delete "100" and substitute --- 10 ---.

PO-1050
(5/69)

CASE 5503/1-3/5805/5806/6013/
6028/6086/6099/
6225/Cip/2

UNITED STATES PATENT OFFICE
CERTIFICATE OF CORRECTION

Patent No. 3,792,033          Dated February 12, 1974

Inventor(s) BEAT ISELIN ET AL

It is certified that error appears in the above-identified patent and that said Letters Patent are hereby corrected as shown below:

Column 51, line 8, delete "aminobutyryl" and substitute --- aminobutyryl$^4$ ---; line 44, delete "typrosyl$^2$" and substitute --- tyrosyl$^2$ ---; line 46, delete "a" (both occurrences) and substitute for each --- $\alpha$ ---; line 47, delete "gluaminyl$^5$" and substitute --- glutaminyl$^5$ ---; line 64, delete "a lower alkyl-a-amino-actyl$^{14}$" and substitute --- $\alpha$-lower alkyl-$\alpha$-amino-acetyl$^4$ ---.

Column 52, line 11, delete "a" (both occurrences) and substitute for each --- $\alpha$ ---; line 66, delete "hav-" and substitute --- having ---.

Column 54, line 23, before "prolyl" insert --- lysyl L- ---.

Signed and sealed this 22nd day of October 1974.

(SEAL)
Attest:

McCOY M. GIBSON JR.
Attesting Officer

C. MARSHALL DANN
Commissioner of Patents